US012584548B2

(12) United States Patent

Burgett et al.

(10) Patent No.: US 12,584,548 B2

(45) Date of Patent: Mar. 24, 2026

(54) CONTINUOUSLY VARIABLE TRANSMISSION

(71) Applicant: Polaris Industries Inc., Medina, MN (US)

(72) Inventors: Morgan I. Burgett, Fair Oaks Ranch, TX (US); Jonathon P. Graus, Stacy, MN (US); Matthew L. Gross, Lino Lakes, MN (US); Zacharey J. Hussong, Roseville, MN (US); Hans-Rudolf Jenni, Grasswil (CH); Maverick J. Klotz, Omro, WI (US); Beat R. Kohler, Kirchberg (CH); Amery D. Kuhl, North Branch, MN (US); Stephen L. Nelson, Osceola, WI (US); Jeffrey I. Peterman, Stacy, MN (US); Andrew C. Schleif, Stacy, MN (US); Dylan T. Truskolaski, Stacy, MN (US); Evan R. Wozniak, Coon Rapids, MN (US); Ronald Zurbruegg, Spiez (CH)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/130,604

(22) Filed: Apr. 4, 2023

(65) Prior Publication Data

US 2023/0313872 A1 Oct. 5, 2023

Related U.S. Application Data

(60) Provisional application No. 63/327,072, filed on Apr. 4, 2022.

(51) Int. Cl.
*F16H 37/08* (2006.01)
*F16H 61/66* (2006.01)
*F16H 61/662* (2006.01)

(52) U.S. Cl.
CPC ... *F16H 37/0846* (2013.01); *F16H 61/66254* (2013.01); *F16H 2037/0886* (2013.01); *F16H 2061/6607* (2013.01); *F16H 2061/661* (2013.01)

(58) Field of Classification Search
CPC B60W 2510/0208; F16H 9/18; F16H 37/021; F16H 61/66259; F16H 55/56;
(Continued)

(56) References Cited

U.S. PATENT DOCUMENTS 4,560,369 A * 12/1985 Hattori ................. F16H 37/021
474/28
4,871,343 A * 10/1989 Hattori ............. F16H 61/66263
477/45
(Continued)

OTHER PUBLICATIONS

International Search Report and Written Opinion issued by the International Searching Authority, dated Sep. 14, 2023, for International Patent Application No. PCT/US2023/065307; 14 pages.
(Continued)

*Primary Examiner* — Henry Y Liu

(74) *Attorney, Agent, or Firm* — Merchant & Gould P.C.

(57) ABSTRACT

Aspects of the present disclosure relate to a powertrain assembly including a continuously variable transmission and, in some examples, a clutch. The clutch may be operably coupled between a prime mover and the continuously variable transmission. Additionally, or alternatively, a clutch may be operable coupled after or downstream of the continuously variable transmission. Aspects of the powertrain assembly may be controlled to provide starting-clutch functionality, to provide torque-limiting functionality, and/or to adapt operation of the powertrain for any of a variety of conditions.

33 Claims, 32 Drawing Sheets

(58) Field of Classification Search
CPC .......... F16H 61/662; F16H 2061/6618; F16H
57/035; F16H 59/06; F16H 37/0846;
F16H 57/0489; F16H 2061/6607; F16H
2061/661; F16H 2037/0886
USPC ...................................................... 474/8, 19
See application file for complete search history.

(56) References Cited

U.S. PATENT DOCUMENTS

| | | | | |
|---|---|---|---|---|
| 4,881,925 A * | 11/1989 | Hattori | .............. | F16H 61/66263 474/18 |
| 4,904,229 A * | 2/1990 | Hattori | .............. | F16H 61/66263 474/18 |
| 4,913,686 A * | 4/1990 | Hattori | .............. | F16H 61/66263 474/18 |
| 5,010,989 A * | 4/1991 | Huntley | ................ | B60W 10/06 477/44 |
| 5,049,112 A * | 9/1991 | Gunsing | .............. | F16D 43/284 474/18 |
| 5,609,543 A * | 3/1997 | Aoki | .............. | B60W 30/18063 477/45 |
| 5,766,105 A * | 6/1998 | Fellows | .............. | F16H 61/6625 474/18 |
| 6,269,895 B1 * | 8/2001 | Tanuguchi | ............ | B60W 20/00 903/910 |
| 6,454,040 B1 * | 9/2002 | Fukuda | ................ | B60K 11/08 180/230 |
| 6,569,043 B2 * | 5/2003 | Younggren | ............ | F16H 55/56 474/19 |
| 6,595,896 B1 * | 7/2003 | Gierling | .............. | F16H 61/0021 477/45 |
| 6,709,364 B2 * | 3/2004 | Eguchi | ................ | B60W 10/02 477/166 |
| 7,037,225 B2 * | 5/2006 | Takagi | ................ | F16H 55/563 474/8 |
| 7,235,035 B2 * | 6/2007 | Korenjak | .............. | B60W 30/18 477/44 |
| 7,243,564 B2 * | 7/2007 | Chonan | ................ | F16H 37/021 474/14 |
| 7,281,603 B2 * | 10/2007 | Fukuda | ................... | F02B 75/16 474/46 |
| 7,303,504 B2 * | 12/2007 | Uchisasai | ............. | B60W 10/08 477/77 |
| 7,311,623 B2 * | 12/2007 | Masuda | ................... | F16H 9/18 474/8 |
| 7,316,630 B2 * | 1/2008 | Tsukada | ............ | F16H 61/66259 192/105 CD |
| 7,351,265 B2 * | 4/2008 | Vitale | ................. | B60L 15/2054 903/903 |
| 7,490,685 B2 * | 2/2009 | Aoki | ...................... | B60K 17/10 180/65.28 |
| 7,534,194 B2 * | 5/2009 | Eguchi | ............. | F16H 61/66272 477/121 |
| 7,540,348 B2 * | 6/2009 | Ishida | ................... | B62K 11/06 280/291 |
| 7,819,212 B2 * | 10/2010 | Kawasaki | ........... | B60W 10/107 477/3 |
| 7,867,132 B2 * | 1/2011 | Ishii | ...................... | F16H 37/021 475/296 |
| 7,905,803 B2 * | 3/2011 | Mochizuki | ................ | F16H 9/18 474/18 |
| 7,980,348 B2 * | 7/2011 | Oishi | ...................... | B62J 25/06 180/230 |
| 8,002,653 B2 * | 8/2011 | Shiozaki | ................ | F02B 61/02 180/199 |
| 8,075,432 B2 * | 12/2011 | Oishi | ...................... | F16H 57/021 474/70 |
| 8,118,707 B2 * | 2/2012 | Brandsma | ........... | B60W 10/107 477/44 |
| 8,182,393 B2 * | 5/2012 | Gillingham | ............. | B60L 53/18 477/10 |
| 8,269,457 B2 * | 9/2012 | Wenger | ................... | F16D 1/076 320/109 |
| 8,302,724 B2 * | 11/2012 | Gillingham | ............. | B60L 50/62 180/242 |
| 8,323,147 B2 * | 12/2012 | Wenger | ................. | B60W 10/26 477/3 |
| 8,387,594 B2 * | 3/2013 | Wenger | ................... | F16D 1/076 123/196 R |
| 8,480,538 B2 * | 7/2013 | Gillingham | ............. | B60L 58/20 477/10 |
| 8,496,079 B2 * | 7/2013 | Wenger | ................... | F16D 1/076 180/65.22 |
| 8,534,413 B2 * | 9/2013 | Nelson | .............. | B60W 30/1882 474/8 |
| 8,555,851 B2 * | 10/2013 | Wenger | ................... | B60W 10/06 123/196 R |
| 8,567,541 B2 * | 10/2013 | Wenger | ................. | B60W 10/26 180/65.265 |
| 8,634,998 B2 * | 1/2014 | Kuras | ................... | B60W 10/06 701/67 |
| 8,682,550 B2 * | 3/2014 | Nelson | ................... | F16H 63/50 701/25 |
| 8,684,887 B2 * | 4/2014 | Krosschell | ........ | F16H 61/66259 477/44 |
| 8,714,289 B2 * | 5/2014 | Olsen | ...................... | B60L 58/20 180/65.29 |
| 8,775,043 B2 * | 7/2014 | Imaseki | ................ | B60W 10/08 701/67 |
| 9,151,384 B2 * | 10/2015 | Kohler | ................... | F16H 63/067 |
| 9,162,558 B2 * | 10/2015 | Stenberg | ............... | B60L 58/21 |
| 9,187,083 B2 * | 11/2015 | Wenger | ................... | B60K 6/405 |
| 9,429,235 B2 * | 8/2016 | Krosschell | ........... | B60G 17/015 |
| 9,500,264 B2 * | 11/2016 | Aitcin | ................... | B62M 27/02 |
| 9,802,605 B2 * | 10/2017 | Wenger | ................. | B60W 20/13 |
| 10,118,477 B2 * | 11/2018 | Borud | ................... | B60K 6/26 |
| 10,137,899 B2 * | 11/2018 | Fukao | .................... | B60W 10/06 |
| 10,196,061 B2 * | 2/2019 | Kimura | ................. | B60K 6/543 |
| 10,328,929 B2 * | 6/2019 | Yagasaki | ................ | B60K 6/26 |
| 10,465,777 B2 * | 11/2019 | Chida | ................... | F16D 25/0638 |
| 10,780,770 B2 * | 9/2020 | Kohler | ................... | F16H 37/021 |
| 10,989,287 B2 * | 4/2021 | Fukai | .................... | F16D 41/14 |
| 11,162,560 B2 * | 11/2021 | Doi | ......................... | F16H 7/023 |
| 11,198,354 B2 * | 12/2021 | Zhang | ................... | B60K 6/387 |
| 11,307,214 B2 * | 4/2022 | Wang | ..................... | B62M 11/06 |
| 11,370,266 B2 * | 6/2022 | Borud | ............... | B60H 1/00278 |
| 11,421,771 B2 * | 8/2022 | Aitcin | ................... | B62M 27/02 |
| 11,760,338 B2 * | 9/2023 | Inoue | ................... | B60W 10/06 701/22 |
| 11,808,350 B2 | 11/2023 | Kitano | | |
| 2002/0065156 A1 * | 5/2002 | Younggren | ............ | F16H 55/56 474/8 |
| 2003/0078136 A1 * | 4/2003 | Yamaguchi | ..... | B60W 30/18063 477/45 |
| 2003/0109359 A1 * | 6/2003 | Eguchi | ................. | B60W 10/04 903/903 |
| 2004/0018903 A1 * | 1/2004 | Takagi | ................... | F16H 9/125 474/8 |
| 2004/0089494 A1 * | 5/2004 | Fukuda | ................... | F02B 61/06 180/377 |
| 2004/0214685 A1 * | 10/2004 | Korenjak | ............. | B60W 10/02 477/44 |
| 2006/0030449 A1 * | 2/2006 | Tsukada | ............ | F16H 61/66259 477/44 |
| 2006/0030454 A1 * | 2/2006 | Uchisasai | ............. | B60W 10/06 477/77 |
| 2006/0063638 A1 * | 3/2006 | Vitale | ................. | B60L 50/16 477/5 |
| 2006/0122017 A1 * | 6/2006 | Masuda | ................... | B62M 9/04 474/144 |
| 2006/0124372 A1 * | 6/2006 | Ishida | ................... | B62K 11/06 180/218 |
| 2006/0128510 A1 * | 6/2006 | Masuda | ................... | F16H 9/18 474/8 |
| 2006/0137920 A1 * | 6/2006 | Aoki | ..................... | B60K 6/44 180/65.225 |
| 2007/0054764 A1 * | 3/2007 | Mochizuki | ............... | B62K 5/01 474/18 |

(56) References Cited

U.S. PATENT DOCUMENTS

| | | | | |
|---|---|---|---|---|
| 2007/0082782 A1* | 4/2007 | Eguchi | .................... | F16H 59/14 |
| | | | | 477/77 |
| 2007/0295550 A1* | 12/2007 | Oishi | ........................ | F16H 9/18 |
| | | | | 180/292 |
| 2008/0121454 A1* | 5/2008 | Oishi | ........................ | F01M 9/06 |
| | | | | 180/219 |
| 2008/0161142 A1* | 7/2008 | Shiozaki | ................. | F02B 61/02 |
| | | | | 184/26 |
| 2008/0179127 A1* | 7/2008 | Oishi | ........................ | B62J 25/06 |
| | | | | 180/230 |
| 2008/0234092 A1* | 9/2008 | Ishii | ...................... | F16H 37/021 |
| | | | | 475/275 |
| 2009/0124455 A1* | 5/2009 | Brandsma | ........... | B60W 10/107 |
| | | | | 477/39 |
| 2009/0200095 A1* | 8/2009 | Kawasaki | ........... | B60W 10/107 |
| | | | | 180/65.265 |
| 2010/0324762 A1* | 12/2010 | Imaseki | .............. | B60W 10/107 |
| | | | | 180/65.265 |
| 2012/0201657 A1* | 8/2012 | Donnelly | ................... | F02C 6/20 |
| | | | | 415/123 |
| 2013/0005522 A1* | 1/2013 | Raasch | ................... | F02D 29/06 |
| | | | | 474/19 |
| 2013/0092468 A1* | 4/2013 | Nelson | .............. | F16H 61/66259 |
| | | | | 474/43 |
| 2013/0096785 A1* | 4/2013 | Kohler | ................. | B60G 17/016 |
| | | | | 701/52 |
| 2013/0096793 A1* | 4/2013 | Krosschell | ........... | F16H 63/067 |
| | | | | 701/68 |
| 2013/0253790 A1* | 9/2013 | Kuras | ................. | B60W 10/101 |
| | | | | 701/67 |

| | | | | |
|---|---|---|---|---|
| 2016/0069434 A1* | 3/2016 | Aitcin | ................... | F16H 55/563 |
| | | | | 180/54.1 |
| 2016/0347165 A1* | 12/2016 | Walter | .................... | F16H 61/04 |
| 2016/0347317 A1* | 12/2016 | Fukao | ................ | F16H 61/0213 |
| 2016/0356379 A1* | 12/2016 | Roland | ...................... | F16H 9/14 |
| 2016/0368499 A1* | 12/2016 | Kimura | ................ | B60W 30/20 |
| 2017/0023121 A1* | 1/2017 | Aitcin | ....................... | F16H 9/14 |
| 2017/0030454 A1* | 2/2017 | Aitcin | .................. | F16H 55/563 |
| 2017/0313302 A1* | 11/2017 | Yagasaki | .................. | B60K 6/40 |
| 2018/0180147 A1* | 6/2018 | Chida | ..................... | F16D 25/10 |
| 2018/0180163 A1* | 6/2018 | Schleif | ............... | F16H 57/0415 |
| 2019/0063582 A1* | 2/2019 | Aitcin | .................. | B62M 27/02 |
| 2019/0211880 A1* | 7/2019 | Takagi | .................... | F16D 1/033 |
| 2019/0285159 A1* | 9/2019 | Nelson | ............... | F16H 57/0416 |
| 2019/0383390 A1* | 12/2019 | Matsuda | .......... | F16H 61/66236 |
| 2020/0109766 A1* | 4/2020 | Doi | ........................... | F16H 9/16 |
| 2020/0116243 A1* | 4/2020 | Fukai | ................... | F16D 41/125 |
| 2020/0122562 A1* | 4/2020 | Zhang | .................... | B60K 6/387 |
| 2020/0408293 A1* | 12/2020 | Sugimoto | ............... | B60K 6/40 |
| 2021/0156880 A1* | 5/2021 | Wang | .................. | F16H 37/021 |
| 2021/0213822 A1* | 7/2021 | Ripley | ................. | B60K 17/344 |
| 2021/0347243 A1* | 11/2021 | Kohler | .................... | B60K 6/48 |
| 2022/0097681 A1* | 3/2022 | Inoue | .................... | B60K 6/448 |
| 2022/0243810 A1* | 8/2022 | Truskolaski | .......... | F16H 63/062 |

OTHER PUBLICATIONS

Invitation to Pay Additional Fees issued by the International Searching Authority, dated Jun. 27, 2023, for International Patent Application No. PCT/US2023/065307; 3 pages.
International Search Report and Written Opinion as issued by the International Search Report, mailed Sep. 14, 2023, for International Patent Application No. PCT/US2023/065307; 12 pages.

* cited by examiner

1000

1300

1302 — DETERMINE VEHICLE OPERATING MODE

1304 — DETERMINE VEHICLE STATE

1306 — DETERMINE INCREASING RATE LIMIT METRIC

1308 — DETERMINE DECREASING RATE LIMIT METRIC

1310 — ADAPT DECREASING RATE LIMIT METRIC ACCORDING TO ACCELERATION MODIFIER

1312 — GENERATE RATIO TARGET

1314 — RATIO TARGET EXCEEDS RATIO LIMIT ?

YES

NO

1316 — CONFIGURE CVT ACCORDING TO RATIO TARGET

1318 — SET RATIO TARGET BASED ON RATIO LIMIT

CONTINUOUSLY VARIABLE TRANSMISSION

RELATED APPLICATIONS

The present disclosure claims the benefit of U.S. Provisional Patent Application No. 63/327,072, filed Apr. 4, 2022, titled CONTINUOUSLY VARIABLE TRANSMISSION, the entire disclosure of which is expressly incorporated by reference herein.

TECHNICAL FIELD

The present application relates to continuously variable transmissions and, more particularly, to associated control techniques and various powertrain configurations that include a continuously variable transmission.

BACKGROUND

Some vehicles such as utility vehicles, all-terrain vehicles, tractors, and others include a continuously variable transmission ("CVT"). The CVT includes a drive clutch, a driven clutch, and a belt configured to rotate between the drive and driven clutches. The position of the drive and driven clutches may be moved between a plurality of positions when the vehicle is operating.

Such transmissions may be electronically controlled. However, positioning the CVT and other associated components on a compact, off-road vehicle may be challenging. Additionally, different control strategies may be needed as a result of the resulting hardware configuration and/or varying environments in which the vehicle may be operated.

It is with respect to these and other general considerations that embodiments have been described. Also, although relatively specific problems have been discussed, it should be understood that the embodiments should not be limited to solving the specific problems identified in the background.

SUMMARY

In an example of the present disclosure, a vehicle comprises: a frame; a plurality of ground-engaging members supporting the frame; and a powertrain supported by the frame and operably coupled to the plurality of ground-engaging members, the powertrain comprising: a prime mover; a continuously variable transmission operably coupled to the prime mover; and a clutch operably coupled between the continuously variable transmission and the plurality of ground-engaging members.

In another example of the present disclosure, a powertrain assembly comprises: a prime mover, comprising a crankshaft and a crankcase; and a clutch, comprising: a housing coupled to the crankcase and including an opening defined about an axis of rotation of the crankshaft; an input subassembly coupled to a flange of the crankshaft, wherein a second bearing is disposed within the input subassembly about the axis of rotation; and an output subassembly comprising an output shaft that extends through the opening, wherein the output assembly is supported by the first bearing of the housing and the second bearing of the input subassembly.

In a further example, a method for controlling a continuously variable transmission of a vehicle is provided. The method comprises: determining an increasing rate limit metric and a decreasing rate limit metric, wherein the increasing rate limit metric and the decreasing rate limit metric each define a rate of change for a ratio of the continuously variable transmission; processing the decreasing rate limit metric based on an acceleration modifier associated with a tractive effort of a powertrain of the vehicle to generate an adapted decreasing rate limit metric; generating a ratio target for the continuously variable transmission based on the increasing rate limit metric and the adapted decreasing rate limit metric; and configuring the continuously variable transmission using the generated ratio target.

In yet another example, a powertrain assembly comprises: a prime mover; and a geartrain, the geartrain comprising: an input shaft operably coupled to an output shaft of the prime mover; a second shaft operably coupled to the input shaft of the geartrain; a front output operably coupled to the second shaft; a rear output switchably coupled to the second shaft by a first gearset and a second gearset, wherein the first gearset is configured to provide a first front to rear ratio between the front output and the rear output and the second gearset is configured to provide a second front to rear ratio between the front output and the rear output.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. The following detailed description is therefore not to be taken in a limiting sense, and the scope of the present disclosure is defined by the appended claims and their equivalents.

Figure 1:
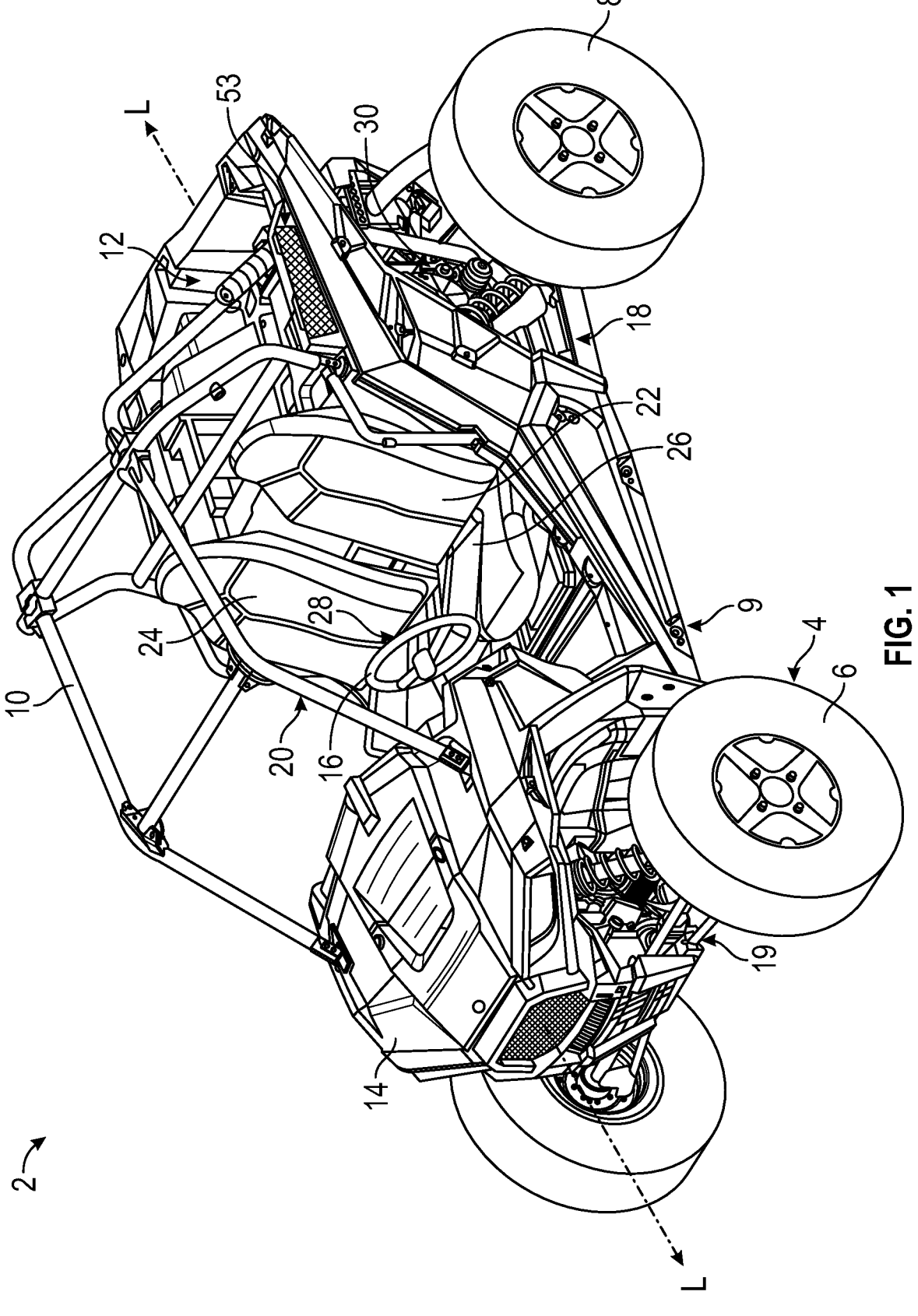
FIG. 1 is a front left perspective view of a utility vehicle of the present disclosure.

Referring to FIG. 1, an illustrative embodiment of a utility vehicle 2 is shown. Vehicle 2 is configured for off-road operation. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, Minnesota 55340 or non-pneumatic tires, such as those shown in U.S. Pat. Nos. 8,176,957 and 8,104,524, the complete disclosures of which are expressly incorporated herein by reference.

Vehicle 2 further includes a lower frame assembly supported by ground-engaging members 4, which extends along a longitudinal axis L of vehicle 2. Additionally, in one embodiment, vehicle 2 may include an upper frame assembly 10 extending vertically above the lower frame assembly, however, alternative embodiments of vehicle 2 may not include upper frame assembly 10. The lower frame assembly supports a rear cargo area 12 and a vehicle body 14, which includes a plurality of body panels.

Vehicle 2 also includes an open-air operator area 20 which, illustratively, includes seating 22 for one or more passengers. As such, operator area 20 is exposed to ambient air and is not fully enclosed. Alternatively, vehicle 2 may include a cab assembly (not shown), such as a roof, front windshield, rear windshield, and doors, to enclose operator area 20. Upper frame assembly 10 may be positioned generally around operator area 20 such that seating 22 is at least partially surrounded by upper frame assembly 10. Illustratively, seating 22 includes an operator seat and a passenger seat, however, seating 22 may also include rear seats for additional passengers or may include only a single seat for carrying the operator. Seating 22 may include a seat back 24 and a seat bottom 26.

Operator area 20 further includes a plurality of operator controls 28, such as a steering wheel 16, by which an operator may provide inputs for operating vehicle 2. Various operator controls, including the steering assembly, may be further described in International Patent Application No. PCT/US13/64516, filed on Oct. 11, 2013, the complete disclosure of which is expressly incorporated by reference herein.

Referring still to FIG. 1, vehicle 2 includes a rear suspension assembly 18 and a front suspension assembly 19, both supported by the lower frame assembly. Suspension assemblies 18, 19 include shock absorbers, for example shock absorbers 312 of rear suspension assembly 18. Additional details of rear and front suspension assemblies 18, 19 may be disclosed in U.S. Pat. No. 9,566,858, issued on Feb. 14, 2017 and U.S. patent application Ser. No. 16/226,797, filed Dec. 20, 2018, the complete disclosures of which are expressly incorporated by reference herein.

Figure 2:
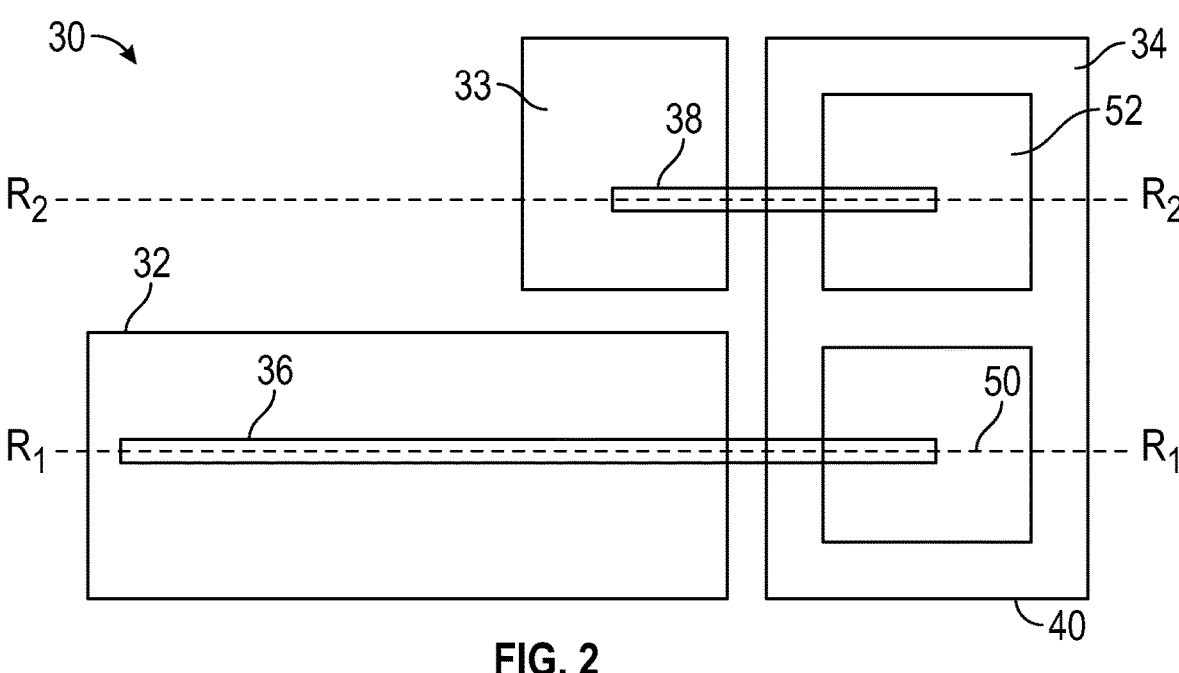
FIG. 2 illustrates a conceptual diagram of a powertrain assembly of the vehicle of FIG. 1.

With reference to FIGS. 1 and 2, vehicle 2 further includes a powertrain assembly 30 which is supported by the lower frame assembly and includes at least a prime mover, illustratively an engine 32, a geartrain which may be configured as or include a shiftable transmission 33, and a continuously variable transmission ("CVT") 34. Powertrain assembly 30 further includes final drives or differentials, for example a front drive and a rear drive. The rear drive is operably coupled to rear ground-engaging members 8 through half shafts and, similarly, the front drive/differential is operably coupled to front ground-engaging members 6 through half shafts.

In the present example, engine 32 is positioned rearward of operator area 20. While the prime mover is disclosed as engine 32, the prime mover may be any type of device configured to provide power to vehicle 2, such as an electric motor, a fuel-based engine, a hybrid engine, a generator, etc. Engine 32 may be any size and include any number of cylinders, for example one cylinder, two cylinders, three cylinders, four cylinders, six cylinders, or eight cylinders.

In one embodiment, CVT 34 also is positioned at least partially rearward of operator area 20. As shown in FIG. 2, CVT 34 is positioned laterally outward from or to the side of engine 32 in a direction generally perpendicular to a longitudinal axis L of vehicle 2 (FIG. 1) and extends generally parallel to longitudinal axis L. More particularly, CVT 34 is positioned along the left side of vehicle 2. In alternative embodiments, CVT 34 may extend in a generally perpendicular direction relative to longitudinal axis L or may be configured in any orientation relative to longitudinal axis L, engine 32, and geartrain 33. For example, in one embodiment, CVT 34 may be positioned longitudinally forward of engine 32 and configured to extend laterally in a direction generally perpendicular to longitudinal axis L.

As shown in FIG. 2, CVT 34 is operably coupled to both engine 32 and geartrain 33. More particularly, CVT 34 is operably coupled to engine 32 through a crankshaft 36 of engine 32 and is operably coupled to geartrain 33 through an input shaft 38 of geartrain 33.

Figure 3:
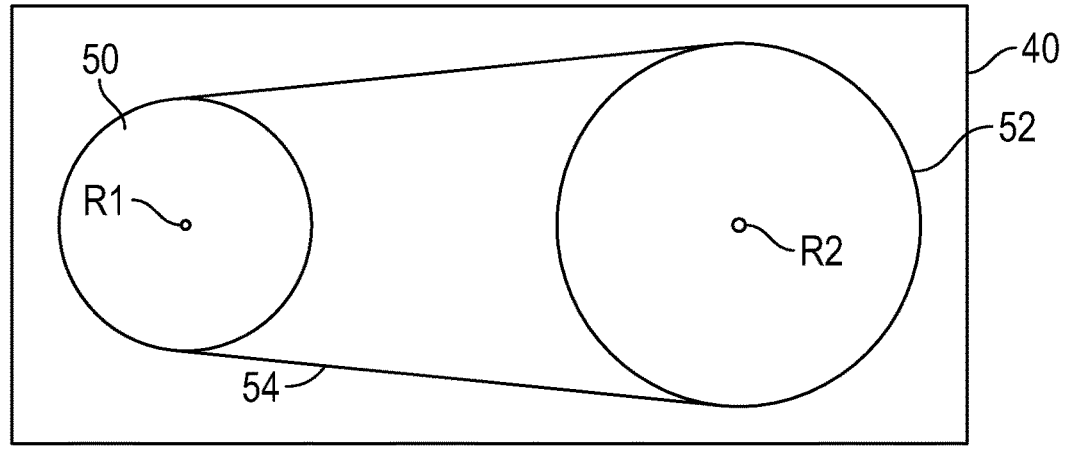
FIG. 3 illustrates a conceptual diagram of a continuously variable transmission ("CVT") of the powertrain assembly of FIG. 2.

With respect to FIGS. 2 and 3, CVT 34 includes a housing 40 having an inner portion or cover and an outer portion or cover removably coupled together. In one embodiment, the inner cover is a metallic material, such as aluminum, and/or a polymeric material. Additionally, the outer cover may be a metallic material and/or a polymeric material, such as an injection-moldable plastic. CVT housing 40 may further include a single air intake or inlet port for receiving air to cool CVT 34 and a single air outlet port to exhaust warm or hot air from CVT 34.

Referring still to FIGS. 2 and 3, CVT 34 includes a primary or drive clutch or pulley 50, a secondary or driven clutch or pulley 52, and a belt 54 extending therebetween. An input shaft (e.g., as may be coupled to crankshaft 36 of engine 32) of drive clutch 50 is operably coupled to crankshaft 36 such that engine 32 drives rotation of the input shaft. The rotation of belt 54 caused by drive clutch 50 drives driven clutch 52. Drive clutch 50 is rotatably coupled to crankshaft 36 of engine 32 along a rotational axis $R_1$. Driven clutch 52 is rotatably coupled to an input shaft 38 of geartrain 33 along a rotational axis $R_2$ and is rotatably coupled to drive clutch 50 through belt 54. Belt 54 may be a polymeric material, for example rubber, and may also include reinforcing members, such as metal cords or other reinforcing material. In one embodiment, belt 54 may be a metallic material, for example, belt 54 may be a chain. In cross-section, belt 54 may generally define a "V" shape. Belt 54 is configured to contact drive clutch 50 and, in one embodiment, expand in diameter in order to contact driven clutch 52.

Additional aspects relating to continually variable transmissions may be disclosed in U.S. patent application Ser. No. 17/147,937, filed Jan. 13, 2021 and U.S. patent application Ser. No. 17/587,486, filed Jan. 28, 2022, the complete disclosures of which are expressly incorporated by reference herein.

It will be appreciated that the above aspects are provided as an example configuration of a powertrain of vehicle 2 and that, in other examples, any of a variety of alternative configurations may be used.

Clutch Downstream of Continuously Variable Transmission

For example, FIGS. 4A, 4B, 4C, 4D, 4E, 4G, and 4I illustrate conceptual diagrams 400, 420, 430, 440, 450, 470, and 490, respectively, of example powertrain assemblies for a vehicle (e.g., vehicle 2) according to aspects described herein. As illustrated, each conceptual diagram includes prime mover 402, CVT 404, clutch 406, and geartrain 408. Aspects of prime mover 402, CVT 404, and geartrain 408 may be similar to those discussed above with respect to engine 32, CVT 34, and geartrain 33, respectively, and are therefore not redescribed below in detail. Geartrain 408 may be coupled to a set of ground-engaging members (e.g., ground-engaging members 4 discussed above with respect to FIG. 1).

Figure 4A:
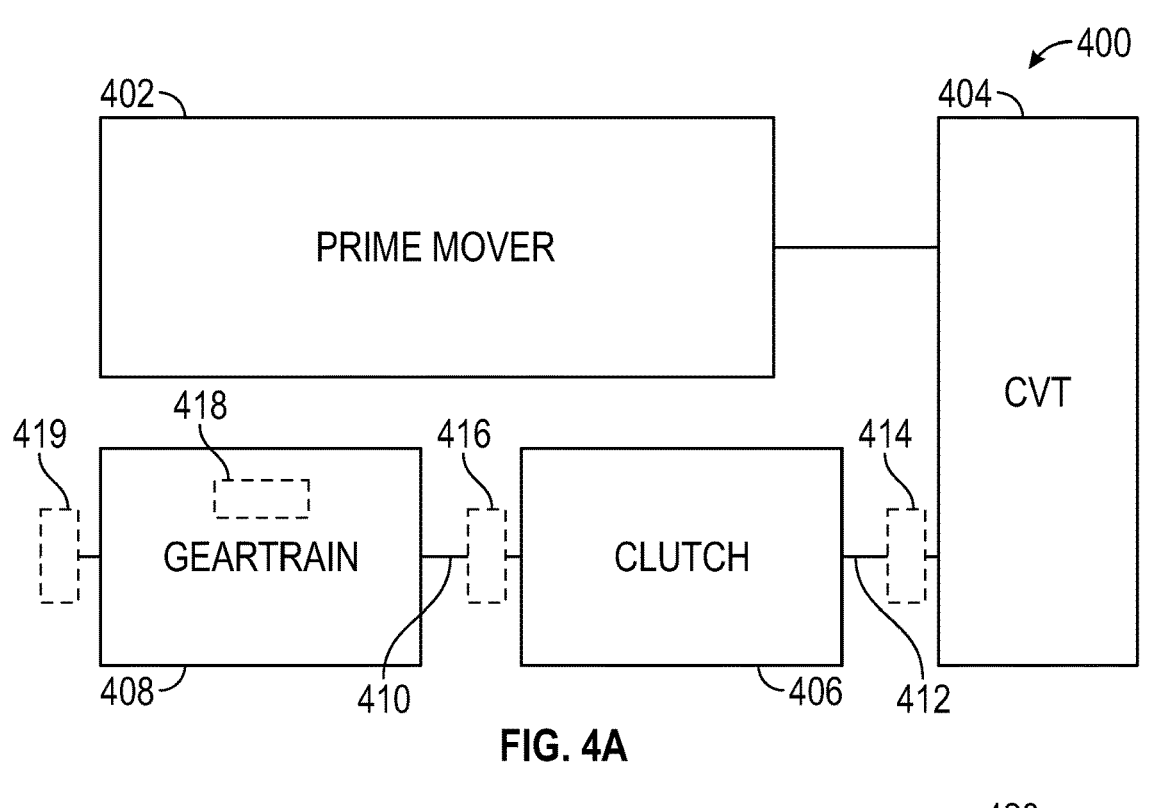
FIGS. 4A-4D each illustrate a conceptual diagram of another example powertrain assembly for use by a vehicle according to aspects described herein.
Figure 4B:
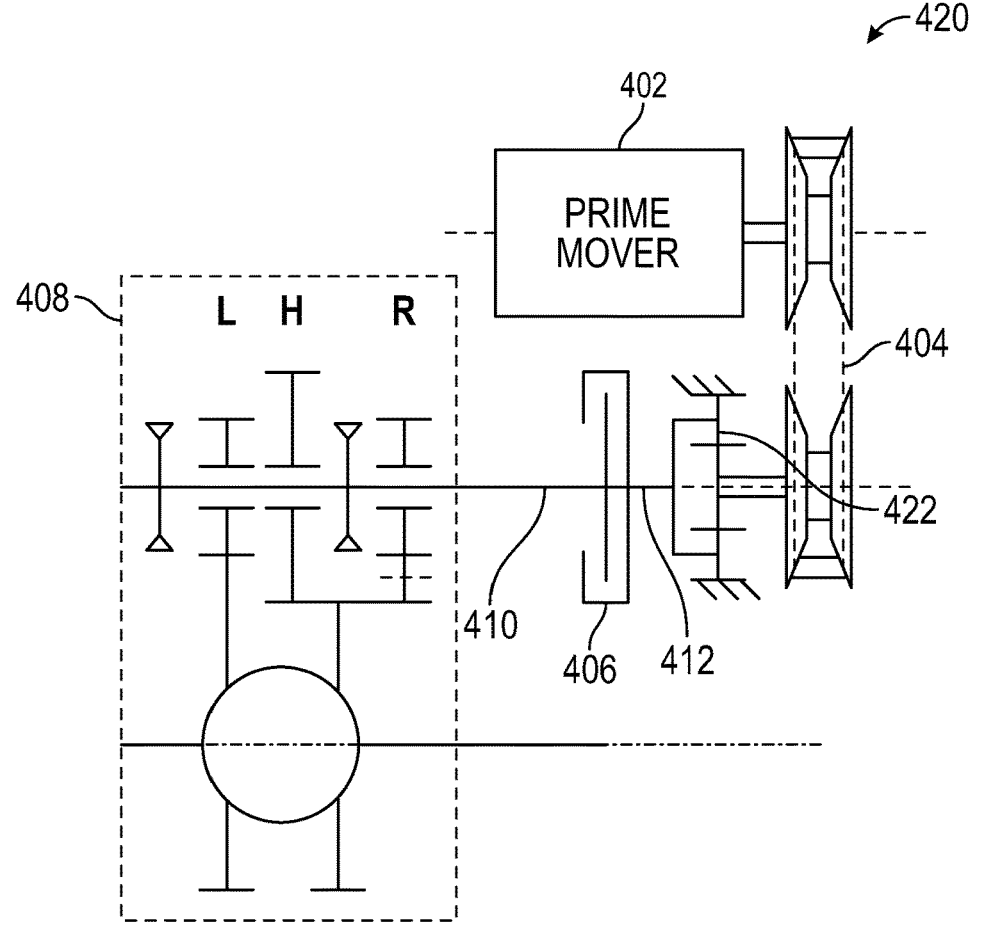

With reference to FIGS. 4A and 4B, clutch 406 is operably coupled between geartrain 408 and CVT 404. For example, clutch 406 is coupled to the driven clutch of CVT 404, aspects of which may be similar to driven clutch 52 discussed above with respect to FIGS. 2-3. Clutch 406 may be an electro-mechanically, mechanically, or hydraulically actuated wet clutch, centrifugal clutch, dry clutch, or multi-disc clutch, among other examples. Additionally, as illustrated in FIG. 4B, reduction gearset 422 is used between CVT 404 and clutch 406, thereby offering improved control and protection (e.g., of clutch 406 as a result of the reduced rotational speed of shaft 412). Additional examples of such aspects are discussed below with respect to reduction gearset 446 in FIGS. 4E-4J.

Actively Controlled Clutch/Torque Limiting/Launch Modes

Clutch 406 may be an actively controlled clutch, which is electronically, hydraulically, and/or mechanically controlled. Clutch 406 may be actuated in a way that ensures clutch 406 fails closed, thereby enabling vehicle operation even after a failure. For example, electromechanical control may be used, such that in instances where sufficient power is unavailable, clutch 406 may remain in or revert to a closed position. As another example, clutch 406 may permit manual actuation (e.g., using a mechanical device from outside of the vehicle), such that a vehicle operator may manually close the clutch during a failure to enable continued operation of the vehicle. In other examples, clutch 406 may instead be a centrifugal clutch or other self-controlled or mechanical clutch (e.g., with reduced or without active control).

As illustrated in FIG. 4A, data from sensors 414, 416, 418, and 419 may be processed (e.g., by a control unit of the vehicle, as is described below in greater detail with respect to FIG. 12) and used to control clutch 406 accordingly. For example, sensor 414 may provide the revolutions per minute (RPM) of the output shaft of CVT 404, sensor 416 may provide the RPM of the output shaft of clutch 406, sensor 418 may provide information associated with a state of geartrain 408 (e.g., a shift drum position), and sensor 419 may provide the RPM of one or more ground-engaging members.

While example sensors are illustrated and described herein, it will be appreciated that any number of additional or alternative sensors may be used in other examples. For example, one or more temperature sensors, wear sensors, and/or contact sensors may be used in other examples. As a result of the data provided by sensors 414, 416, 418, and 419, slip of clutch 406 may be detected and handled according to aspects described herein. As another example, shift demand from a vehicle operator may similarly be detected and operation of the vehicle may be adjusted accordingly. For instance, clutch 406 may adapt to different conditions (e.g., wear, weather, ambient temperature, internal or mechanical temperature of the clutch, and/or altitude) and provide different operating modes (e.g., a race operating mode, a sport operating mode, a comfort operating mode, an eco operating mode, and a hill-hold operating mode).

In examples, clutch 406 may provide torque-limiting functionality, thereby reducing or eliminating torque spikes and associated torque transfer between geartrain 408, CVT 404, and prime mover 402. For instance, if the vehicle encounters a sudden torque spike as a result of being airborne, landing, and/or encountering an obstacle with one or more ground-engaging members, clutch 406 may permit a certain amount of slip, thereby reducing or preventing the transfer of torque from geartrain 408 (e.g., via shaft 410) to CVT 404 and/or prime mover 402 (e.g., via shaft 412). Such a condition may be identified based on one or more of sensors 414, 416, 418, and 419, for example as a result of identifying a mismatch between a ground-engaging member RPM reported by sensor 419 and a CVT RPM reported by sensor 414.

As an example, one or more vehicle parameters from an inertial measurement unit may be used to detect an airborne condition, which may be processed in combination with wheel speed (e.g., from sensor 419), throttle input, and/or a geartrain acceleration value to generate a power-on-landing metric. The power-on-landing metric may be determined to indicate a potential high energy power-on-landing condition (e.g., when the power-on-landing metric is above a predetermined threshold). As a result of identifying the potential high energy power-on-landing condition, torque capacity and/or an associated clamping force of clutch 406 may be reduced or adjusted accordingly. Similarly, the sensors may be used to set and/or maintain acceleration limits and/or torque set points for ground-engaging members of the vehicle. As another example, such torque-limiting functionality may be used to protect the belt of CVT 404 and in instances where clutch 406 is determined to have a high temperature (e.g., above a predetermined threshold), as may be the case when the vehicle is creeping, among other examples.

In some instances, clutch 406 may be configured to have a clamping force above that of the torque supplied by prime mover 402 via shaft 412 (e.g., according to a predetermined percentage or predetermined threshold), such that torque is transferred from prime mover 402, through CVT 404 and clutch 406, to geartrain 408 during operation of the vehicle, while also enabling slip at clutch 406 due to torque spikes (e.g., as may be introduced via geartrain 408). In another example, clutch 406 may be opened to decouple geartrain 408 and CVT 404 in response to identifying a set of conditions in which a torque spike is likely. For example, clutch 406 may be opened in response to determining the vehicle is airborne. Thus, it will be appreciated that the clamping force of clutch 406 may be controlled according to any of a variety of conditions.

As another example, clutch 406 may be used to decouple geartrain 408 from CVT 404, thereby enabling shifting of geartrain 408 while the vehicle is in motion or enabling the vehicle to move while decoupled from CVT 404 and prime mover 402. Similarly, clutch 406 may be used to provide controlled engagement of geartrain 408, such as when the vehicle transitions from being stationary to powered movement by prime mover 402. As a result of using clutch 406 to provide controlled engagement of geartrain 408, CVT 404 may experience less wear. For instance, a belt of CVT 404 need not slip during engagement of geartrain 408, as may otherwise be the case in instances where clutch 406 is omitted.

Further, as compared to a configuration in which clutch 406 is coupled between prime mover 402 and CVT 404 (e.g., such that clutch 406 is upstream of CVT 404), the illustrated downstream configuration may result in improved packaging and control. Additionally, while clutch 406 may be larger and have a comparatively larger moment of inertia (MOI), the reduction in RPM that results from being downstream of CVT 404 may still yield a reduction in the overall MOI, which may result improved acceleration characteristics, among other examples. Further, as a result of positioning clutch 406 downstream of CVT 404, CVT 404 need not shift or recover after a gear shift of geartrain 408. Similarly, the drive and driven clutches of CVT 404 may shift to a different ratio while CVT 404 is decoupled from geartrain 408 (e.g., as compared to the ratio of CVT 404 prior to opening clutch 406).

By contrast, in a configuration where clutch 406 is upstream of CVT 404, CVT 404 may need to spool up after being decoupled by clutch 406, the ratio of CVT 404 may subsequently be adjusted, and then the clutch may need to close more smoothly to synchronize the rotational speeds of prime mover 402, CVT 404, and geartrain 408. Thus, the illustrated downstream configuration may further enable comparatively quicker shifting. Further, clutch 406 may absorb energy associated with speed matching various aspects of the powertrain assembly, thereby reducing the amount of energy that CVT 404 absorbs and extending the longevity of CVT 404 accordingly. Additionally, there may be less drag during start since clutch 406 may be used to decouple geartrain 408.

Clutch Located on Input Shaft of Geartrain

Figures 4C, 4D:
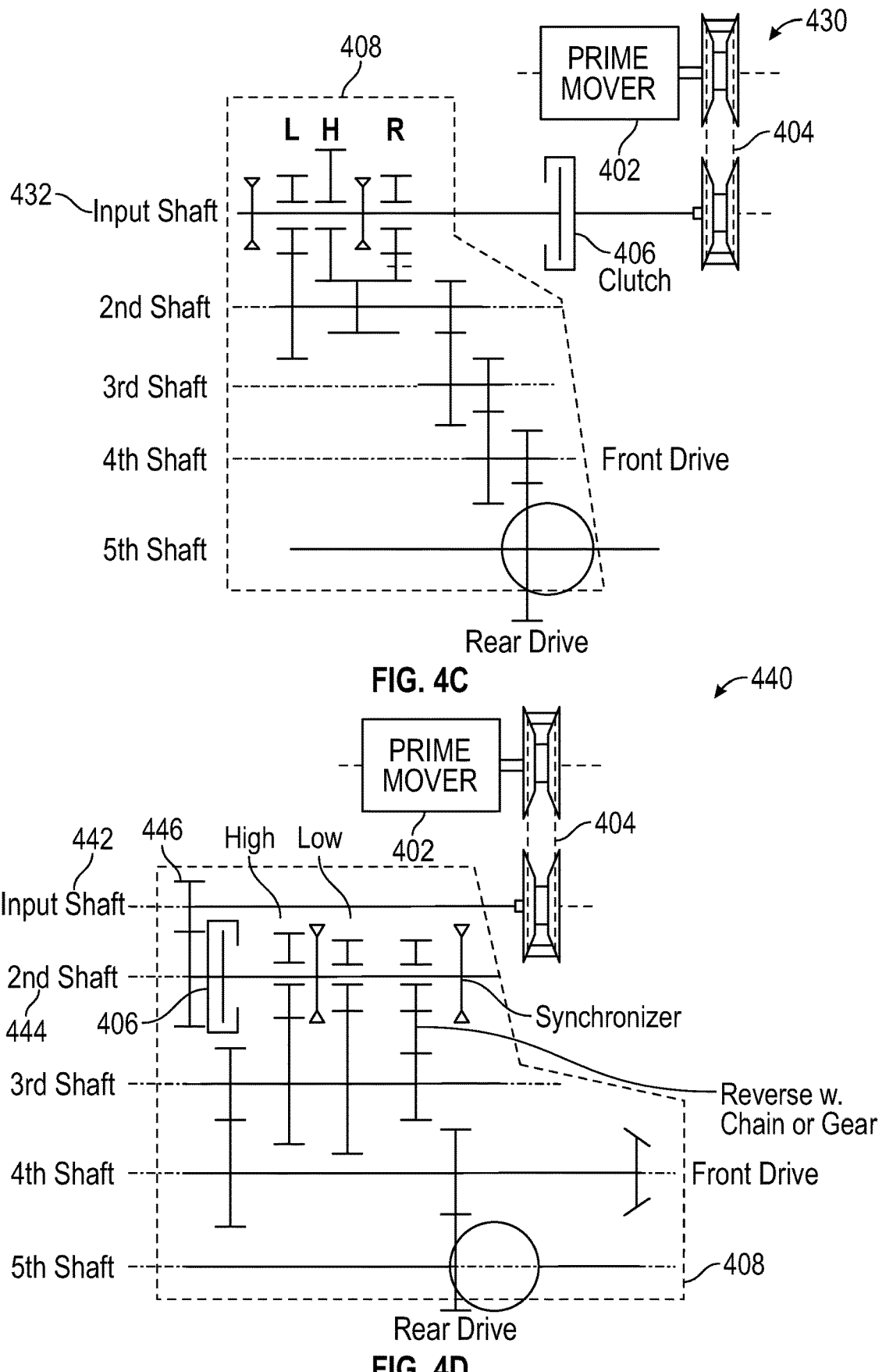

With reference now to FIGS. 4C and 4D, diagrams 430 and 440 illustrate examples in which each respective geartrain 408 includes a plurality of shafts and associated gears. Similar to FIGS. 4A and 4B, FIG. 4C illustrates an example in which clutch 406 is coupled to input shaft 432 of geartrain 408. In instances where clutch 406 is capable of handling the rotational speed of the input shaft (e.g., as illustrated in diagrams 400, 420, and 430), clutch 406 may be comparatively smaller, as the associated torque may be lower and, similarly, the clamping force (and the bearings needed to withstand the clamping force) may be lower.

By contrast, FIG. 4D illustrates an example where clutch 406 is coupled to second shaft 442 of geartrain 408, which is mechanically coupled to the input shaft 444 of geartrain 408 by reduction gearset 446, thereby reducing the speed with which the second shaft rotates. The example illustrated in FIG. 4D may be used in instances where the rotational speed of the input shaft exceeds that which clutch 406 is capable of handling (as compared to the input shaft of geartrain 408, as illustrated in FIGS. 4A-4C above).

Figures 4E, 4F:
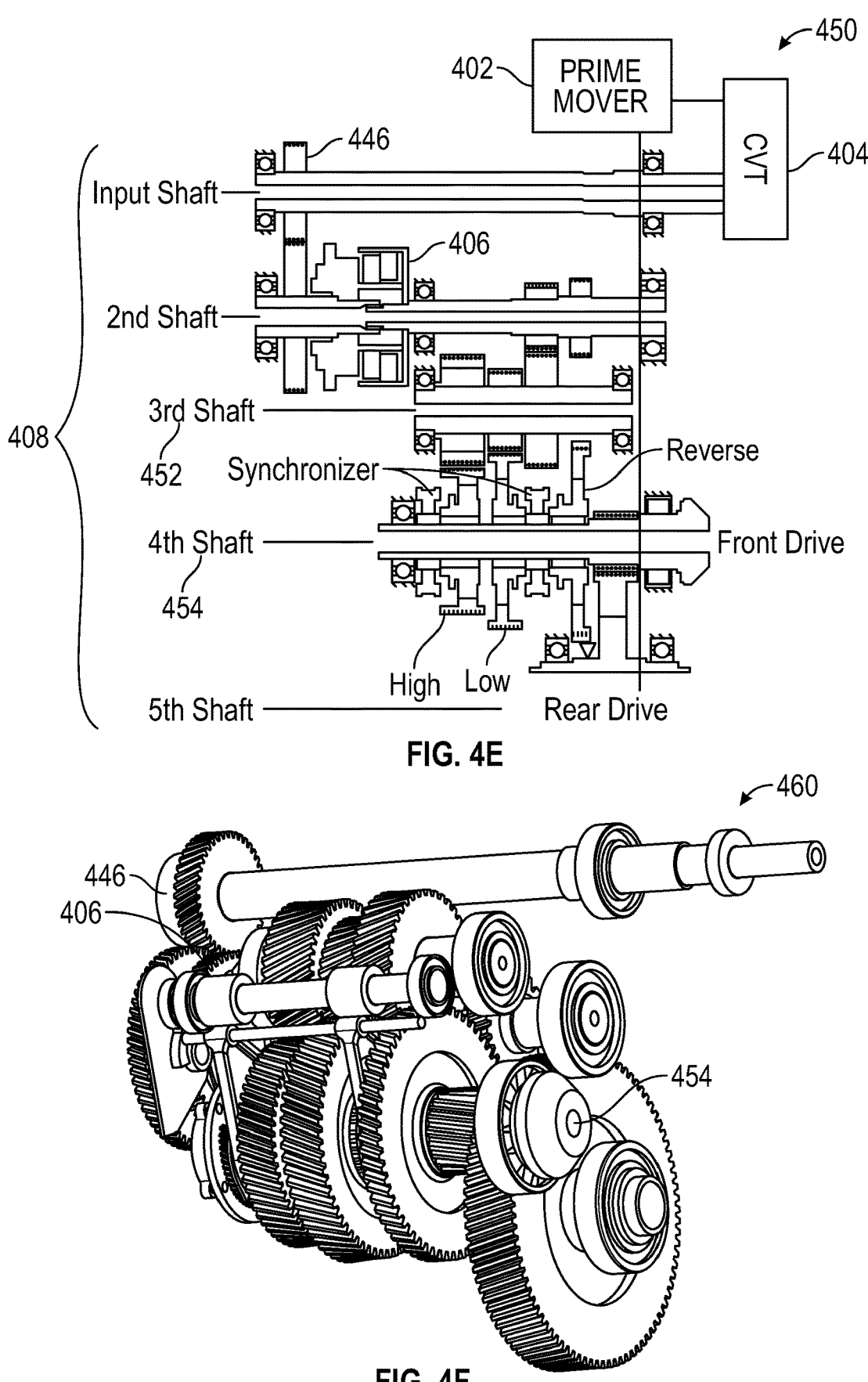
FIG. 4E illustrates a conceptual diagram of another example powertrain assembly for use by a vehicle according to aspects described herein.
FIG. 4F illustrates a perspective view of an example powertrain according to FIG. 4E.
Figure 4G:
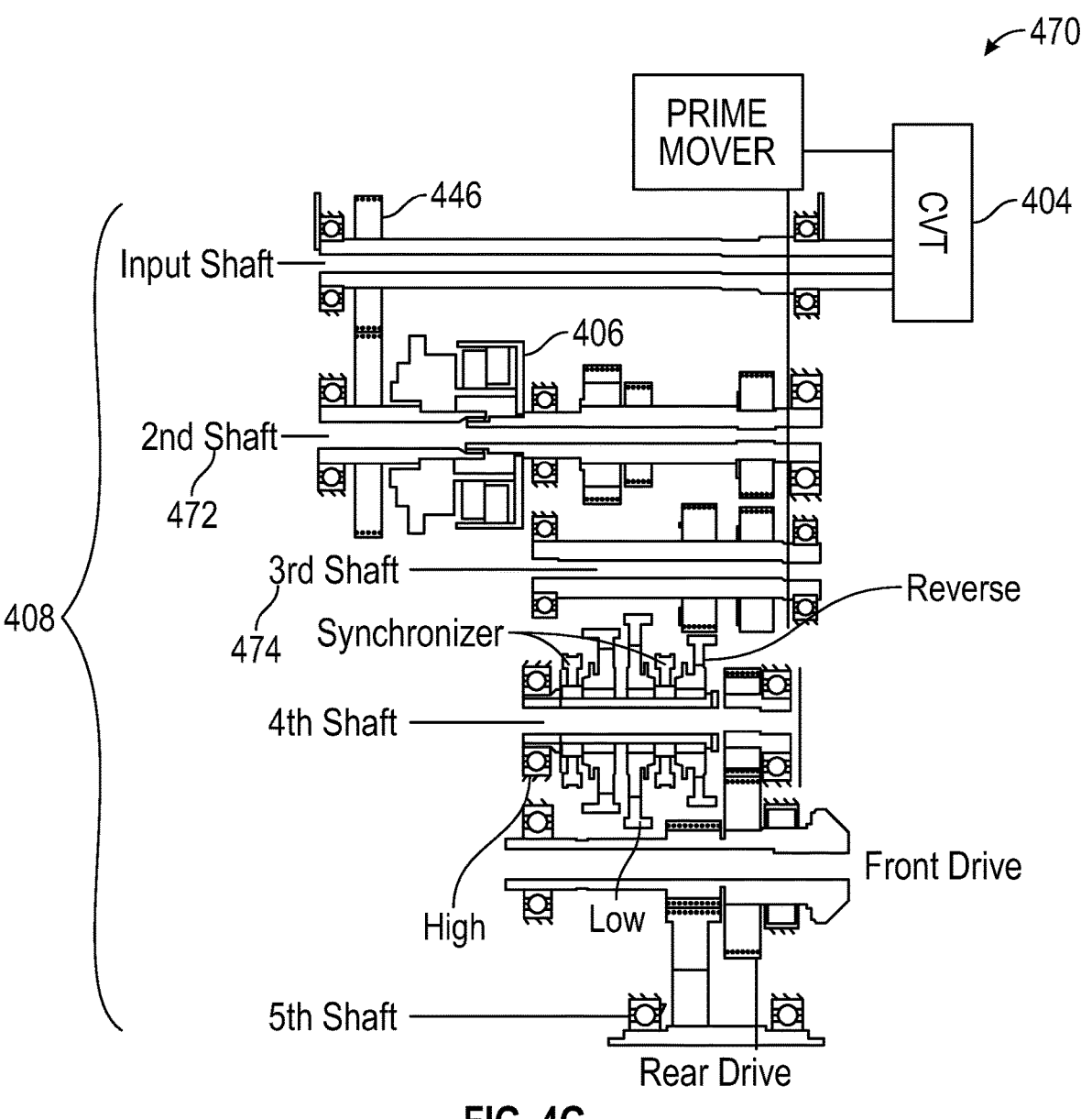
FIG. 4G illustrates a conceptual diagram of another example powertrain assembly for use by a vehicle according to aspects described herein.
Figure 4H:
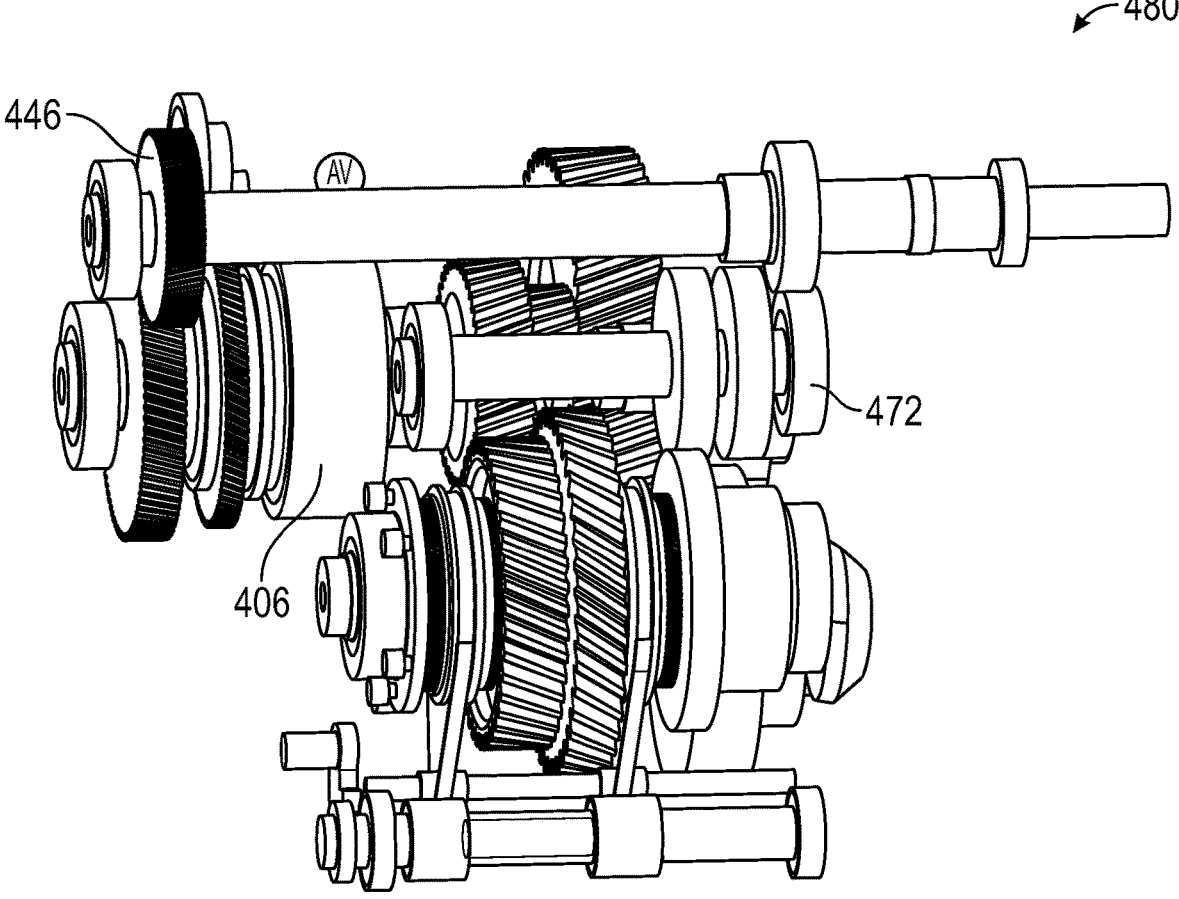
FIG. 4H illustrates a side view of an example powertrain according to FIG. 4G.
Figures 4I, 4J:
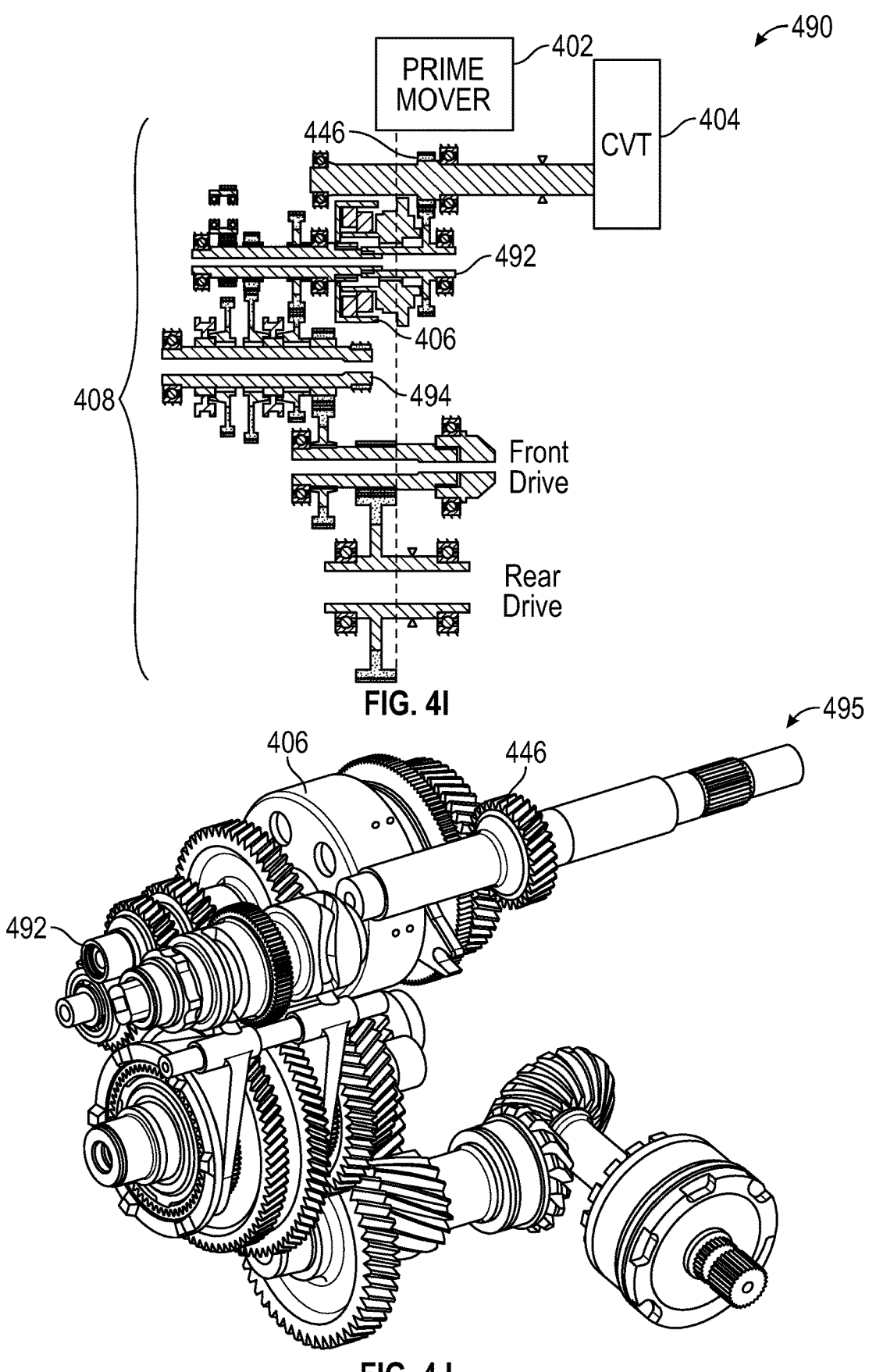
FIG. 4I illustrates a conceptual diagram of a further example powertrain assembly for use by a vehicle according to aspects described herein.
FIG. 4J illustrates a perspective view of an example powertrain according to FIG. 4I.

FIGS. 4E, 4G, and 4I are provided as additional examples in which reduction gearset 446 is used upstream of clutch 406 within geartrain 408. Additionally, FIGS. 4F, 4H, and 4J each illustrate a perspective view 460, a side view 480, or a perspective view 495 of an example powertrain according to FIG. 4E, 4G, or 4I, respectively. With reference to FIG. 4G, diagram 470 illustrates an example in which the shifting gearsets are located on second shaft 472 and third shaft 474 (e.g., rather than third shaft 452 and fourth shaft 454 illustrated in FIG. 4E). FIG. 4I illustrates another example in which the shifting gearsets are similarly located on second shaft 492 and third shaft 494. As a result, the powertrain illustrated in diagrams 470 and 490 may be comparatively smaller and/or lighter (e.g., having more compact dimensions, one or more reduced shaft lengths, and/or reduced gear width), as there is less reduction and thus less associated torque handled by gears associated with second shaft 472, 492 and third shaft 474, 494 as compared to gears associated with third shaft 452 and fourth shaft 454 of FIG. 4E.

Architectural Options/Synchronizer to Replace Dog Ears

While FIGS. 4A-4J are described as examples where clutch 406 is used to provide various functionality of the illustrated powertrain assemblies, it will be appreciated that, in other examples, at least some of the described functionality may alternatively or additionally be provided by CVT 404.

As an example, a first version of a powertrain assembly may be provided in which CVT 404 and clutch 406 operate according to the aspects described above, while a second version of the powertrain assembly may be provided in which clutch 406 is omitted, such that CVT 404 may be used to also provide similar starting clutch functionality. In some examples, the CVT of the second version may utilize a polymeric belt, while the first version may utilize either a polymeric belt or a metallic belt. For example, in a high-demand application, clutch 406 may be retained (e.g., for starting functionality, torque-limiting functionality, and/or decoupling functionality, as described above) and CVT 404 may utilize a metallic belt, while a lower-demand application may omit clutch 406 and utilize a substantially polymeric belt to provide starting clutch functionality, among other examples. In both versions, the configuration of the powertrain assembly may otherwise be substantially similar.

In instances where clutch 406 is integrated into geartrain 408, the space requirements of the powertrain may be reduced. Further, such a configuration may offer improved modularity, where a similar prime mover and/or CVT may be used for varying geartrain configurations. As another example, a first version of a powertrain assembly may include an actively controlled clutch 406 and synchronizer, a second version of the powertrain assembly may include an actively controlled clutch 406 and shift dogs, and a third version of the powertrain assembly may omit clutch 406 and use a polymeric belt of CVT 404 to provide starting clutch functionality. These and other such versions may otherwise use a similar prime mover and/or CVT, thereby reducing manufacturing differences, part counts, and design complexity. For instance, a similar interface may be used between prime mover 402 and CVT 404 in each example. Additionally, the disclosed aspects may provide greater flexibility for implementing mechanical or electronic shifting, as well as adapting a given design from an internal combustion engine to an electric motor, among other examples.

It will further be appreciated that dog ring shifting may be used in some examples, while synchronized gear shifting may be used in other examples. In some instances, the geartrain may otherwise be substantially similar regardless of whether dog ring shifting or synchronized gear shifting is used. For example, dog ring shifting may be used to reduce the associated cost of geartrain 408, while synchronized gear shifting may be used in instances where improvements to shifting comfort and/or shift-on-the-fly functionality (e.g., as may further be enabled by clutch 406) is preferred. Additionally, use of synchronized gear shifting may decrease the amount of backlash in the system (e.g., as a result of variability in throttle input). As another example, a geartrain with dog ring shifting may be used in association with an internal combustion engine, while a substantially similar geartrain with synchronized gear shifting may be used in instances where the powertrain includes an electric motor to reduce backlash in the system.

Additionally, the powertrain assemblies illustrated in FIGS. 4A-4J enable modularity. Using a starting clutch after prime mover 402 may require additional space along an associated crank shaft, which may limit the orientation of powertrain assembly within the vehicle. For example, depending on the size of prime mover 402, such a powertrain assembly may be limited to a configuration that extends generally parallel to a longitudinal axis of the vehicle (e.g., longitudinal axis L in FIG. 1). By contrast, placing clutch 406 downstream of CVT 404 (e.g., such that it is not directly coupled to prime mover 402) may enable a configuration that is either substantially parallel or substantially perpendicular to the longitudinal axis. Further, the disclosed powertrain assembly may enable a substantially similar type and/or configuration of prime mover 402 to be used in various different vehicles. Similarly, the configuration of prime mover 402 and CVT 404 may be substantially similar, where clutch 406 may be used in some assemblies and omitted in other assemblies (e.g., such that CVT 404 may provide similar functionality in the absence of clutch 406).

It will be appreciated that the orientation of components illustrated in FIGS. 4A-4J are provided as examples and any of a variety of alternative configurations may be used in other examples. Further, while FIGS. 4A-4J are examples in which a single clutch 406 is used, it will be appreciated that other powertrain assemblies may use any number of clutches. For example, a first clutch may be operably coupled between prime mover 402 and CVT 404 and used as a starting clutch, while a second clutch may be operably coupled between CVT 404 and geartrain 408 (e.g., similar to clutch 406 as described above) and used as a shifting clutch. Thus, the functionality described above may be provided by the first clutch, the second clutch, or any combination thereof.

Shift on the Fly Transmission Configuration

Figure 5:
FIG. 5 illustrates a conceptual diagram of another powertrain assembly for use by a vehicle according to aspects described herein.
Figure 5:
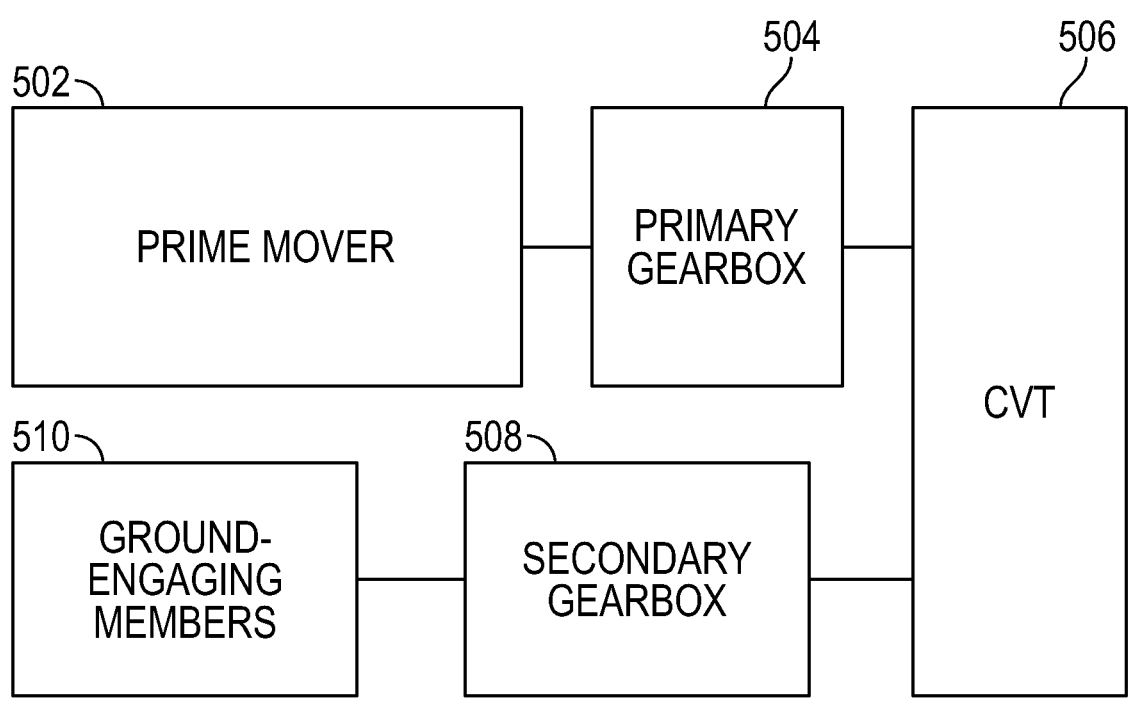

FIG. 5 illustrates a conceptual diagram of another powertrain assembly 500 for use by a vehicle according to aspects described herein. As illustrated, FIG. 5 includes prime mover 502, primary gearbox 504, CVT 506, secondary gearbox 508, and ground-engaging members 510. Aspects of prime mover 502, CVT 506, and ground-engaging members 510 may be similar to those discussed above with respect to engine 32, CVT 34, and ground-engaging members 4, respectively, and are therefore not redescribed below in detail.

Powertrain assembly 500 includes both primary gearbox 504 upstream of CVT 506 (e.g., coupled between prime mover 502 and CVT 506) and secondary gearbox 508 downstream of CVT 506 (e.g., coupled between CVT 506 and ground-engaging members 510). Primary gearbox 504 may enable a vehicle operator to select a gear of the vehicle, such as a forward gear, a neutral gear, or a reverse gear. As an example, primary gearbox 504 includes a planetary gearset, a shifting clutch, and a launch clutch, such that shifting between forward and reverse is performed by selectively coupling different members of the planetary gearset. Thus, primary gearbox 504 may provide shuttle shift functionality for various associated gears.

Secondary gearbox 508 may further enable the selection of a high gear reduction and a low gear reduction, such that each gear of primary gearbox 504 further has an associated high range and a low range. In some examples, a clutch (not pictured) may be operably coupled between primary gearbox 504 and secondary gearbox 508 (e.g., either upstream or downstream of CVT 506), such that secondary gearbox 508 may be decoupled for shifting between the high gear reduction and the low gear reduction, or vice versa. As another example, secondary gearbox 508 may include a synchronizer to provide synchronized shifts between the high and low gear reductions of secondary gearbox 508. In a further example, CVT 506 may shift to at least partially synchronize speeds between the high and low gear reductions, thereby decreasing the energy experienced by a synchronizer of secondary gearbox 508 when shifting between various reduction gearsets. Secondary gearbox 508 may be used to provide a larger reduction than may otherwise be possible using CVT 506 in the absence of secondary gearbox 508.

It will be appreciated that the orientation of components illustrated in FIG. 5 is provided as an example and any of a variety of other configurations may be used in other examples. For instance, powertrain assembly 500 may extend substantially parallel to or substantially perpendicular to a longitudinal axis of a vehicle (e.g., longitudinal axis L of vehicle 2 in FIG. 1).

Fixed Shaft Two-Speed Dual Clutch Transmission

Figure 6:
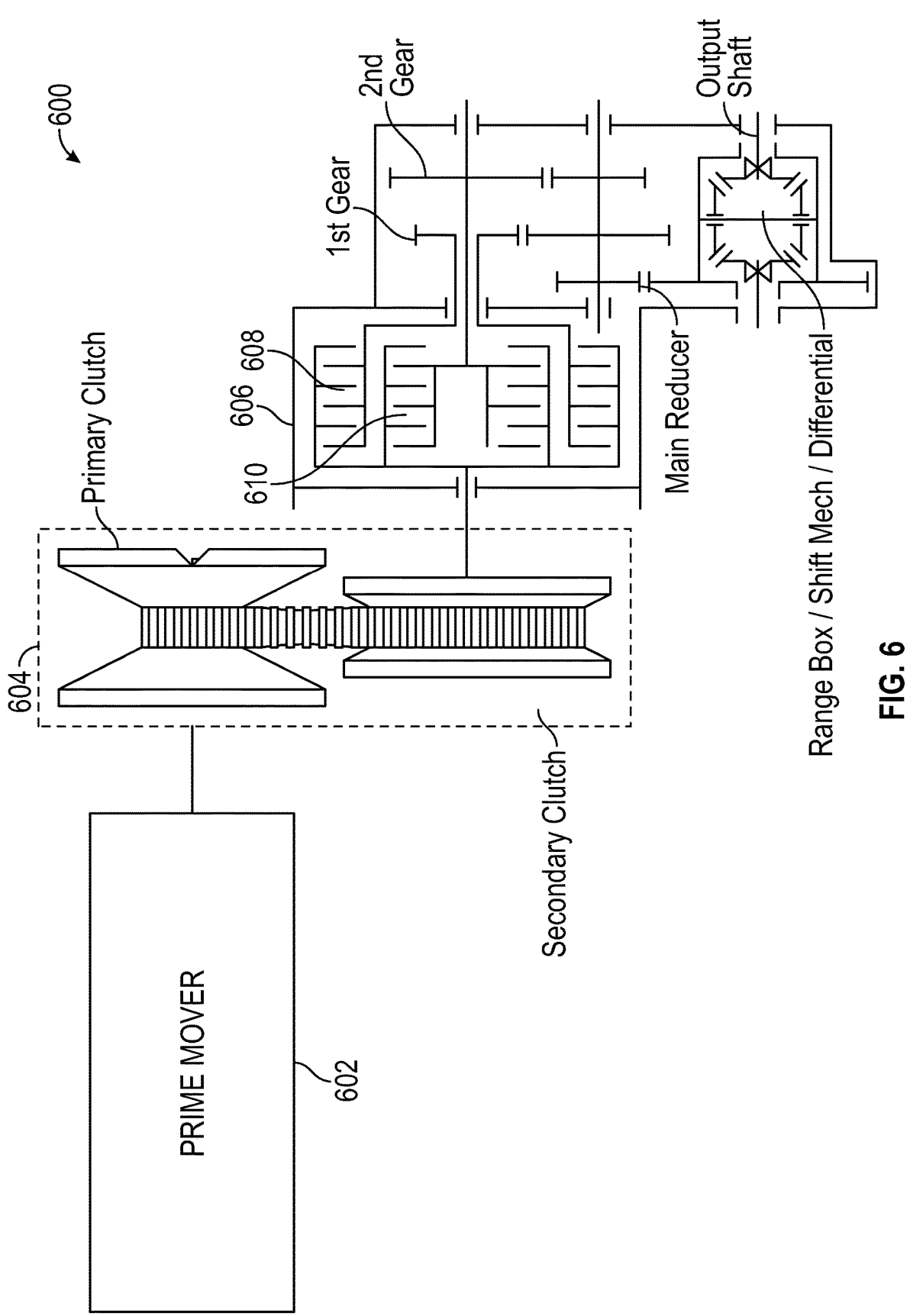
FIG. 6 illustrates a conceptual diagram of another powertrain assembly that includes a dual-clutch transmission for use by a vehicle according to aspects described herein.

FIG. 6 illustrates a conceptual diagram of another powertrain assembly 600 that includes a dual-clutch transmission for use by a vehicle according to aspects described herein. As illustrated, powertrain assembly 600 includes prime mover 602, CVT 604, and dual-clutch transmission (DCT) 606. Aspects of prime mover 602 and CVT 604 may be similar to those discussed above with respect to engine 32 and CVT 34, respectively, and are therefore not redescribed below in detail.

DCT 606 includes a first clutch 608 and a second clutch 610, which are configured to engage a first gear and a second gear, respectively, with the main reducer. As illustrated, the secondary or drive clutch of CVT 604 is operably coupled to DCT 606. The output shaft of DCT 606 may be coupled to a set of ground-engaging members according to aspects described above.

Thus, DCT 606 may switch between first clutch 608 and second clutch 610 to provide a high gear reduction and a low gear reduction, respectively. As a result of incorporating DCT 606 into powertrain assembly 600, the vehicle may transition between the first gear and the second gear while stationary. Similarly, the reduced complexity associated with shifting between the first and the second gear (e.g., by engaging one of clutches 608 or 610) may result in a more compact configuration and may enable DCT 606 to transition between the first and second gears more quickly than instances where a mechanical lever and/or gear change is used.

Additionally, when transitioning between clutch 608 and clutch 610, the ratio of CVT 604 (e.g., between the primary clutch and the secondary clutch of CVT 604) may be reconfigured contemporaneously with the transition so as to reduce the associated torque interrupt. For example, CVT 604 may backshift when DCT 606 upshifts (e.g., transitioning from clutch 608 to clutch 610), or vice versa. In examples, clutches 608 and 610 may each be hydraulically controlled. As another example, DCT 606 may be configured such that clutch 608 is normally closed and clutch 610 is normally open, thereby ensuring that one clutch remains engaged even in instances where the vehicle experiences a failure.

It will be appreciated that the starting ratio and shift schedule associated with CVT 604 and DCT 606 may be adapted according to any of a variety of scenarios. For example, in a rock crawl or sport scenario, a higher numeric ratio may be used to start and may be held during vehicle operation unless an indication to shift is received from a vehicle operator, thereby ensuring that vehicle wheel torque remains high. As another example, a lower numeric ratio may be used in a vehicle cruise scenario, thereby reducing the noise, vibration, and/or harshness associated with vehicle operation. In a further example, the vehicle may start in a lower numeric ratio during a trail scenario, but may upshift to a higher numeric ratio during periods of acceleration (e.g., above a first predetermined threshold). Similarly, the higher numeric ratio may be held or the vehicle may further downshift during a period of high acceleration (e.g., above a second predetermined threshold).

It will be appreciated that aspects of powertrain assembly 600 may be incorporated with other powertrain assemblies described above. For example, DCT 606 may be incorporated as part of geartrain 408 discussed above with FIGS. 4A-4J (e.g., on an intermediate shaft after an input shaft of the geartrain, thereby having a lower rotational speed with potentially increased torque requirements).

Variable Front to Rear Overdrive Ratio Transmission

Figure 7A:
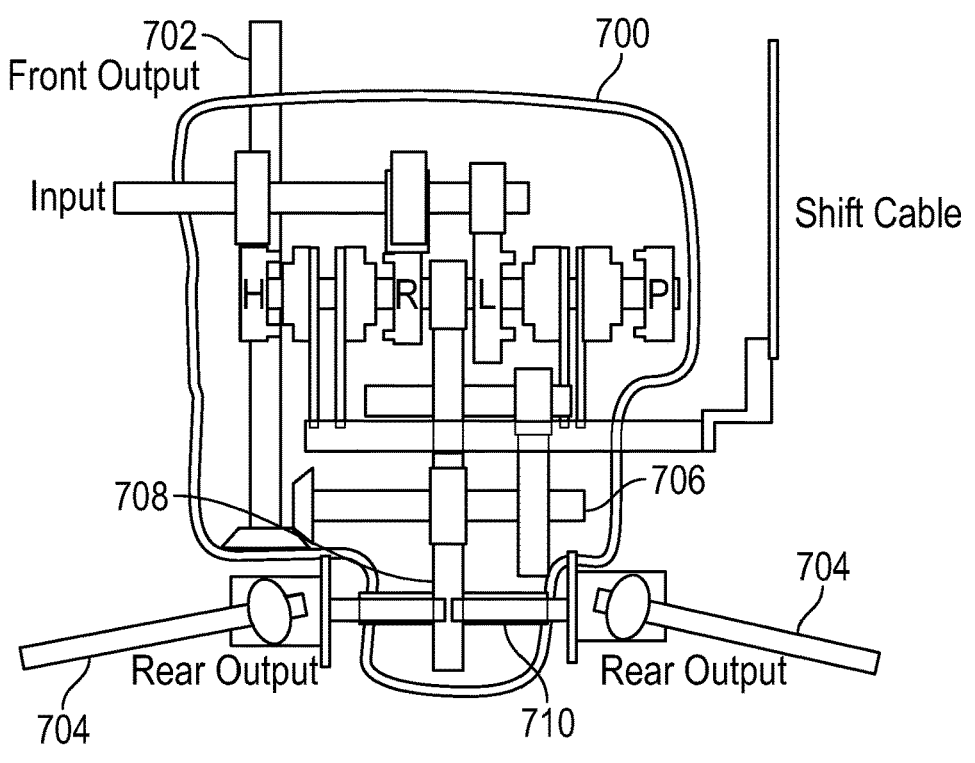
FIG. 7A illustrates a conceptual diagram of a top view of an example geartrain for use by a vehicle according to aspects described herein.
Figure 7B:
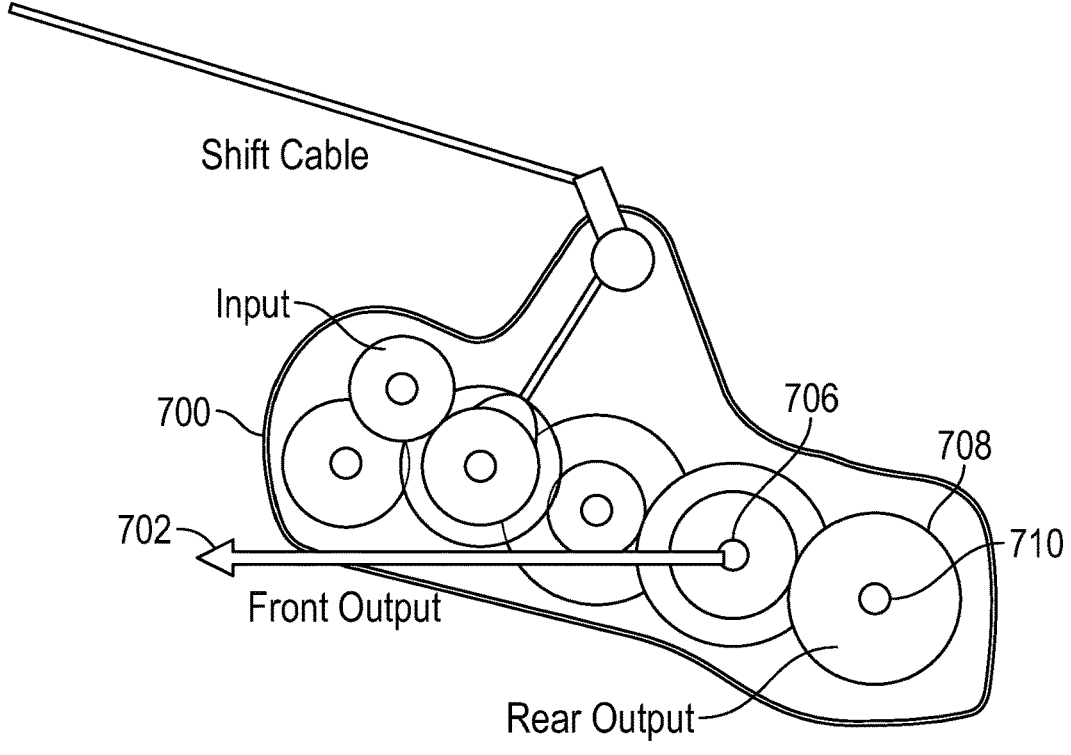
FIG. 7B illustrates a conceptual diagram of a side view of the example geartrain of FIG. 7A.
Figure 7C:
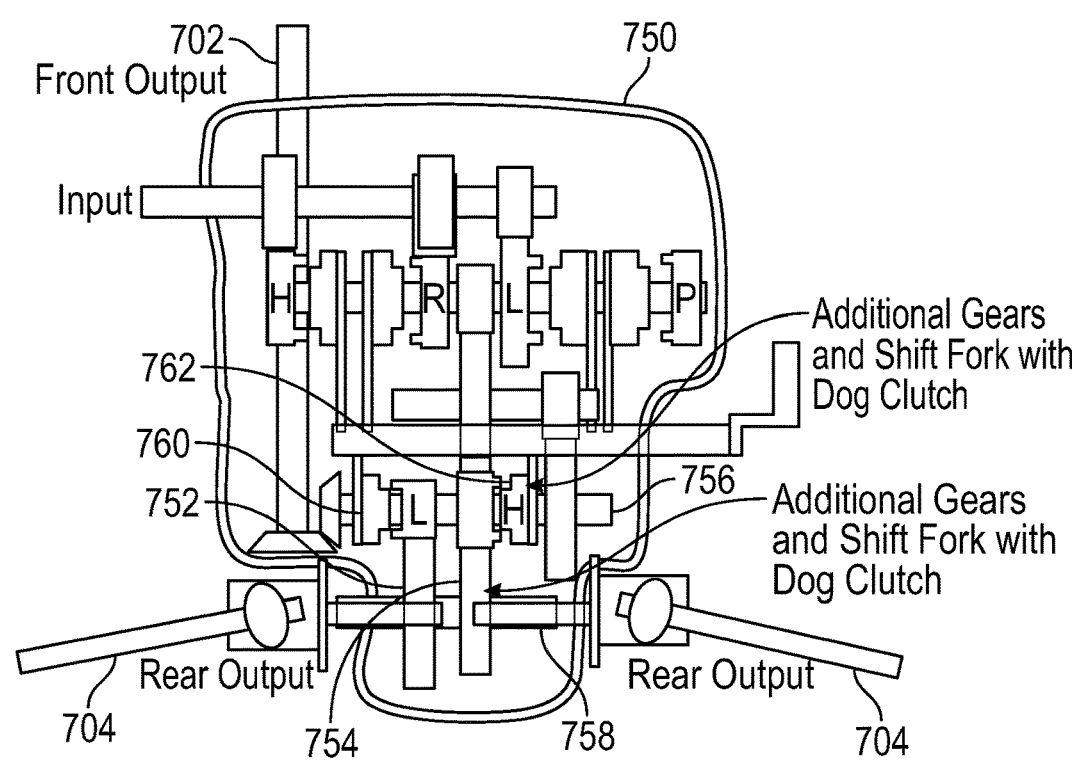
FIG. 7C illustrates a conceptual diagram of a top view of another example geartrain for use by a vehicle according to aspects described herein.
Figure 7D:
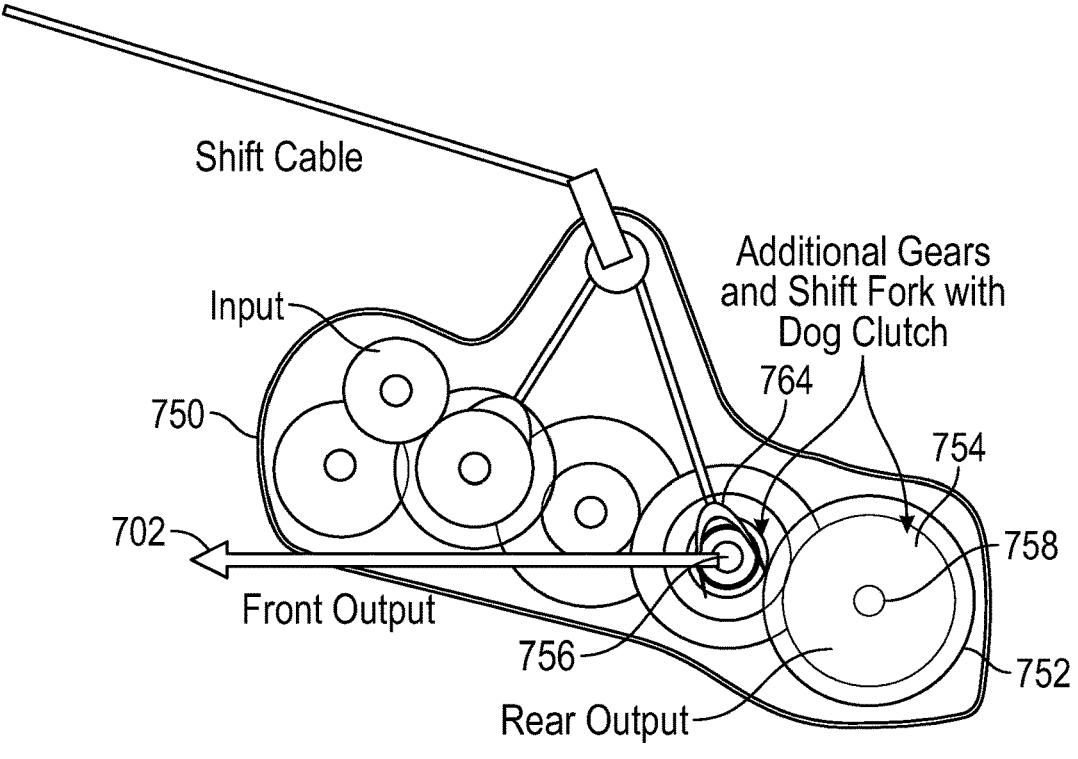
FIG. 7D illustrates a conceptual diagram of a side view of the example geartrain of FIG. 7C.

FIGS. 7A and 7B illustrate conceptual diagrams of a top view and a side view, respectively, of an example geartrain 700 for use by a vehicle according to aspects described herein. As illustrated, geartrain 700 includes front output 702 and rear outputs 704, each of which may be mechanically coupled to ground-engaging members of the vehicle (e.g., ground-engaging members 4 of vehicle 2 discussed above with respect to FIG. 1). In the example illustrated in FIGS. 7A and 7B, front output 702 and rear outputs 704 may operate at the same ratio when geartrain 700 is in high gear, low gear, or reverse configuration. For example, a ground-engaging member coupled to front output 702 may rotate once in the same time a ground-engaging member coupled to rear output 704 rotates 1.1 times (thus having a front to rear ratio of 1:1.1 between front output 702 and rear output 704).

However, there may be instances where a different ratio between front output 702 and rear outputs 704 may be beneficial. In the example discussed above, ground-engaging members coupled to front output 702 would not provide traction until the rear ground-engaging members coupled to rear output 704 slip. Thus, when the vehicle is used for mudding and/or rock crawling, for example, substantially similar output to all ground-engaging members (e.g., a front to rear ratio of 1:1) may be preferred.

Accordingly, FIGS. 7C-7F illustrate conceptual diagrams of another example geartrain 750 for use by a vehicle according to aspects described herein. As compared to geartrain 700, geartrain 750 enables the vehicle to have a substantially similar front to rear ratio (e.g., of 1:1) while in low gear. When geartrain 750 is operated in a high gear configuration, a different front to rear ratio may be used (e.g., a ratio of 1:1.1, thereby overdriving front output 702).

As illustrated, geartrain 750 includes high final gearset 754 and low final gearset 752 on shafts 756 and 758, while geartrain 700 includes a single final gearset 708 on shafts 706 and 710. In examples, single final gearset 708 and high final gearset 754 may be similar in size and/or reduction (e.g., thereby providing a ratio that overdrives rear output 704 as compared to front output 702). Low final gearset 752 may be larger and/or provide a greater reduction as compared to high final gearset 754, thereby slowing shaft 758 relative to front output 702 and bringing the front to rear ratio closer to 1:1.

The high and low gears associated with shaft 756 may be loosely coupled. In examples, each gear has dog teeth cast into the face to allow the gear to join one of splined dog clutches 760 or 762 when engaged. The appropriate splined dog clutch may then engage the corresponding final gearset via an associated shifting mechanism (e.g., dog clutch 762 for high final gearset 754 or dog clutch 760 for low final gearset 752). Dog clutches 760 and 762 are splined to shaft 756 and are guided by the shifting forks 764 on the shift rail.

Figure 7E:
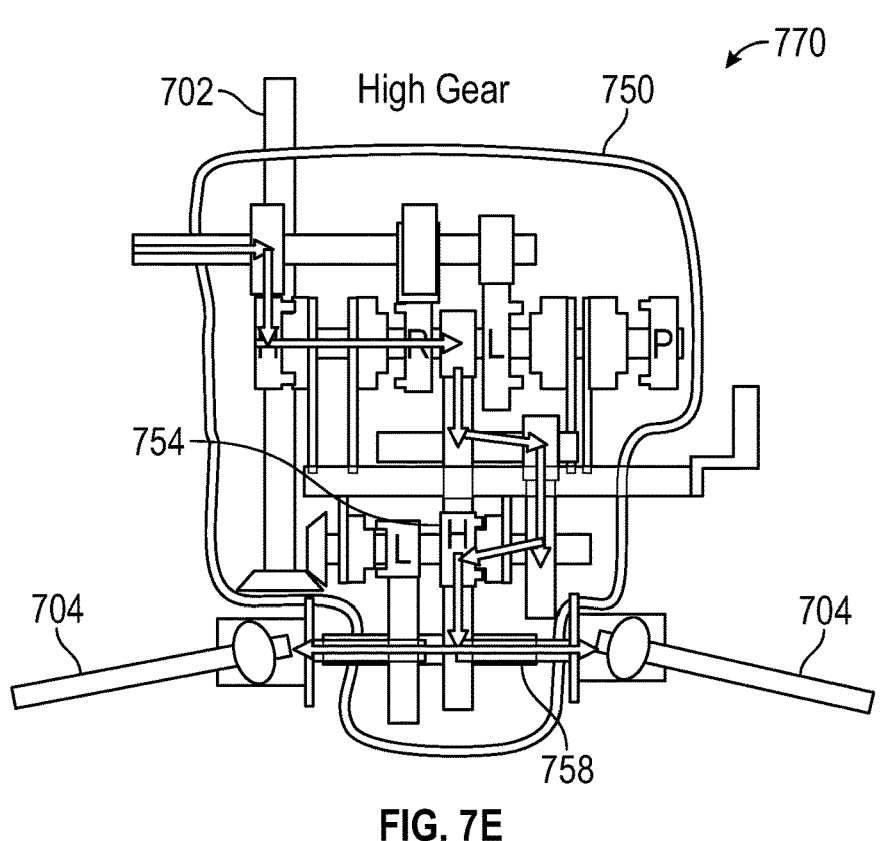
FIG. 7E illustrates a conceptual diagram of a top view of the example geartrain of FIG. 7C in a high gear configuration.
Figure 7F:
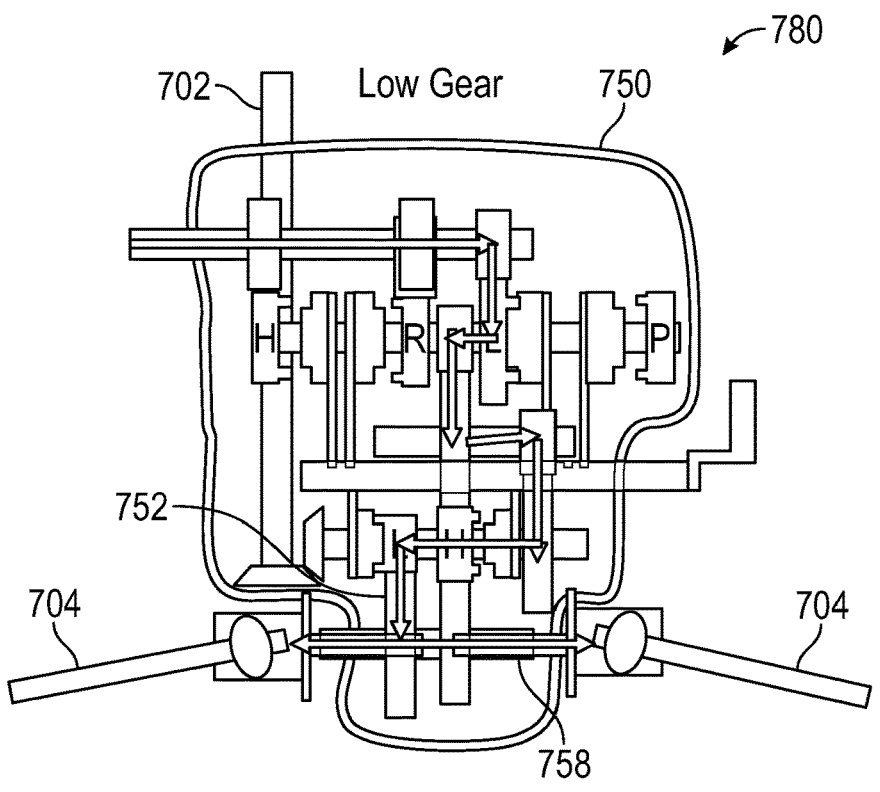
FIG. 7F illustrates a conceptual diagram of a top view of the example geartrain of FIG. 7C in a low gear configuration.

FIGS. 7E and 7F are provided as example configurations 770 and 780 to illustrate how torque is transmitted when geartrain 750 is in a high gear configuration and a low gear configuration, respectively. As illustrated in FIG. 7E, high gearset 754 is engaged when geartrain 750 is in a high gear configuration, thereby increasing the overdrive for rear output 704 as compared to front output 702 by increasing the speed at shaft 758 while maintaining a similar speed of front output 702.

By contrast, when geartrain 750 is in a low gear configuration (or a reverse gear configuration), as shown in FIG. 7F, high gearset 754 is disengaged and low gearset 752 is engaged instead. Thus, the speed of shaft 758 is decreased (as compared to aspects described above with respect to FIG. 7E), such that the speed of rear output 704 is similar or otherwise closer to that of front output 702.

It will be appreciated that, in other examples, any of a variety of other configurations may be used. For example, the disclosed aspects need not be limited to a high final gearset and a low final gearset and additional or alternative gearsets may be used. Additionally, a high final gearset and a low final gearset may correspond to any of a variety of other geartrain configurations in other examples. For instance, the high final gearset or the low final gearset may additionally or alternatively be used when geartrain 750 is in a reverse or a neutral configuration.

Bearing Support for Launch Clutch/Launch Clutch on Engine

Figure 8A:
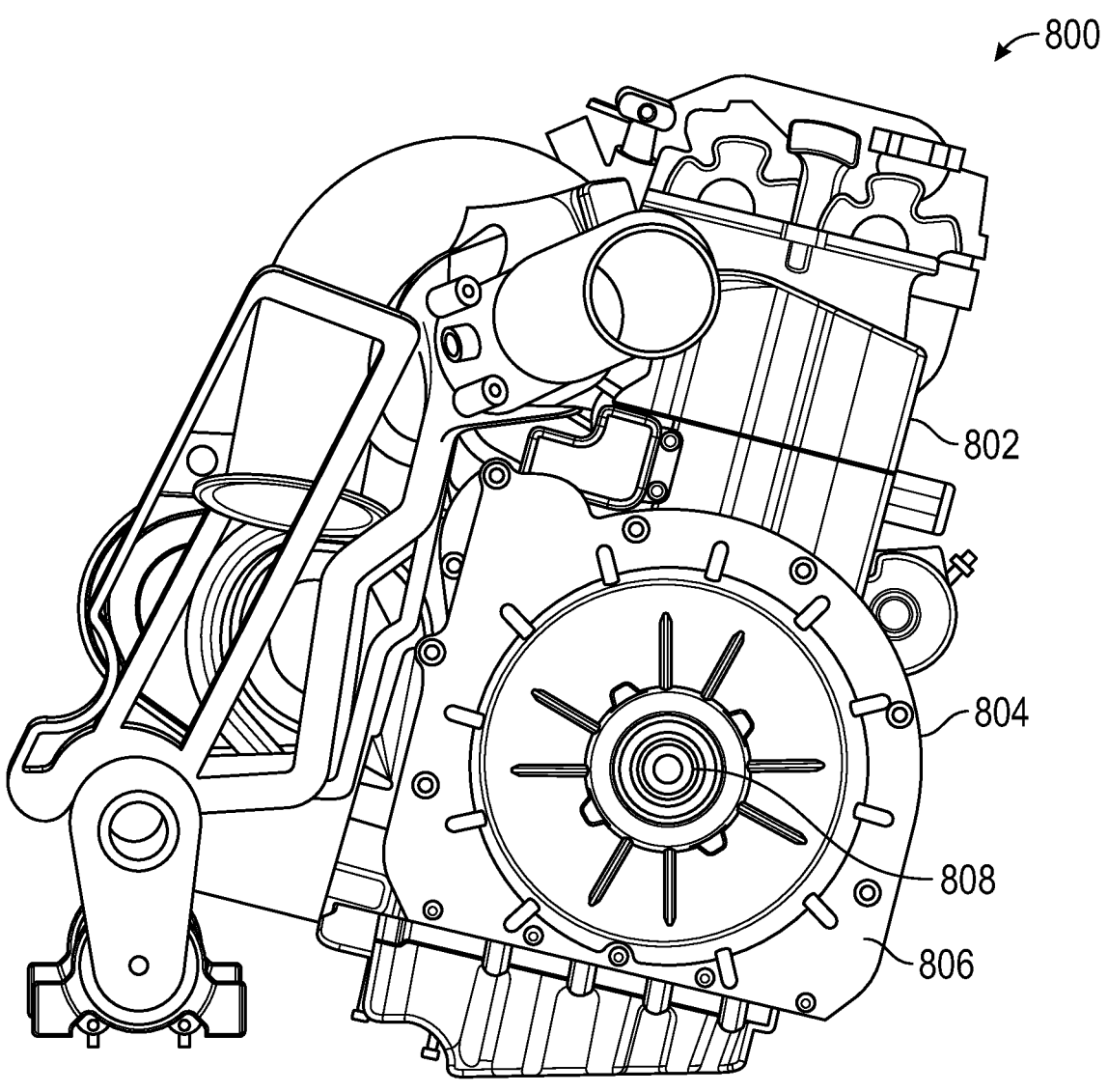
FIG. 8A illustrates a front view of a prime mover to which a starting clutch is mounted.
Figure 8B:
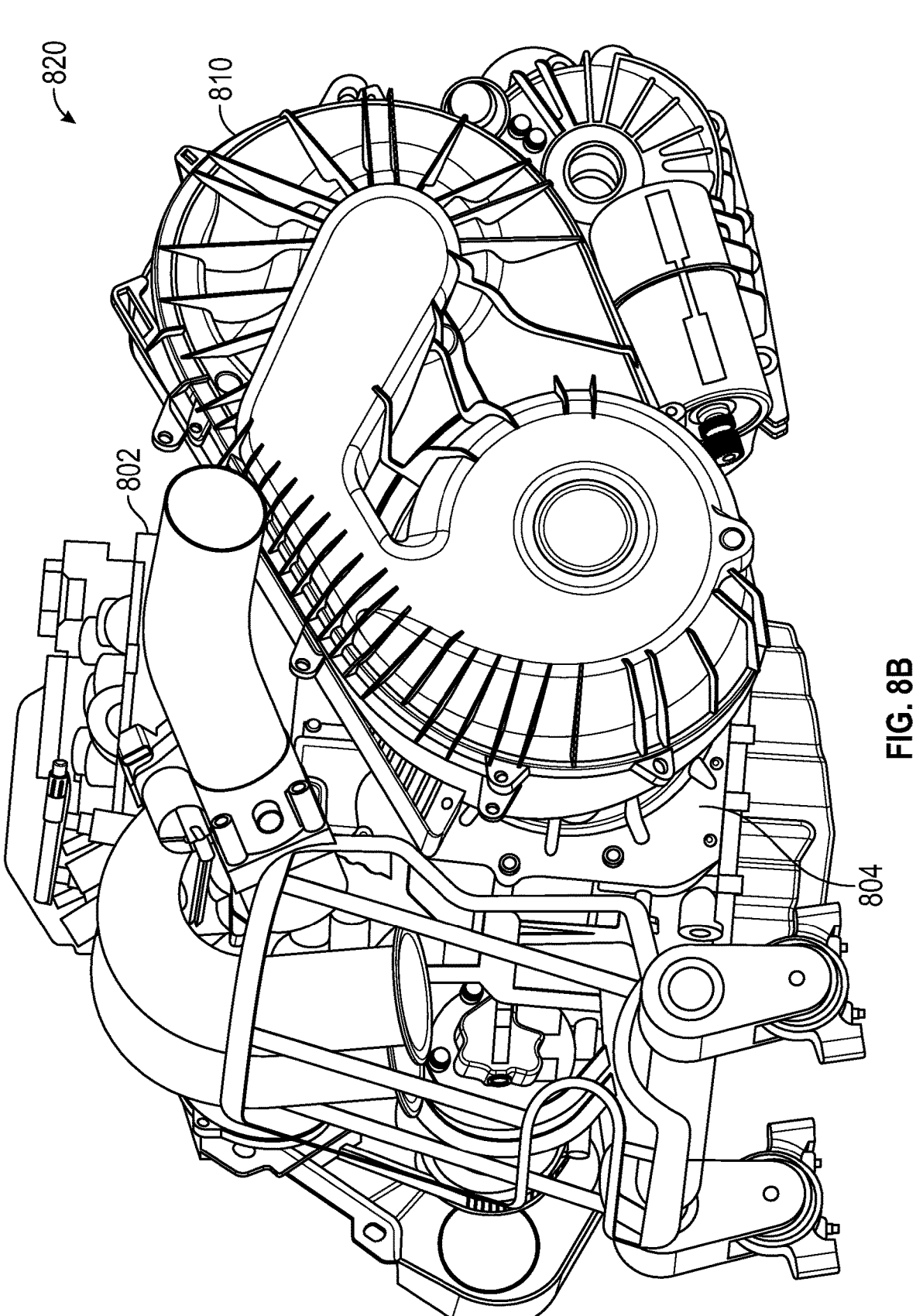
FIG. 8B illustrates a perspective view of a continuously variable transmission coupled to the starting clutch of FIG. 8A.

FIG. 8A illustrates front view 800 of prime mover 802 to which starting clutch 804 is mounted. Aspects of prime mover 802 may be similar to engine 32 and discussed above and are therefore not redescribed below in detail. As illustrated, clutch 804 is coupled to prime mover 802. According to aspects described herein, clutch 804 may be actuated according to any of a variety of mechanisms, including centrifugal, mechanical, electro-mechanical, and/or hydraulic, among other examples. Clutch 804 includes housing 806, which has an opening through which output shaft 808 of clutch 804 extends. FIG. 8B illustrates a perspective view 820 of CVT 810 coupled to starting clutch 804. Thus, output shaft 808 of clutch 804 may be operably coupled to a primary or drive clutch 838 (FIG. 8C) of CVT 810.

Figure 8C:
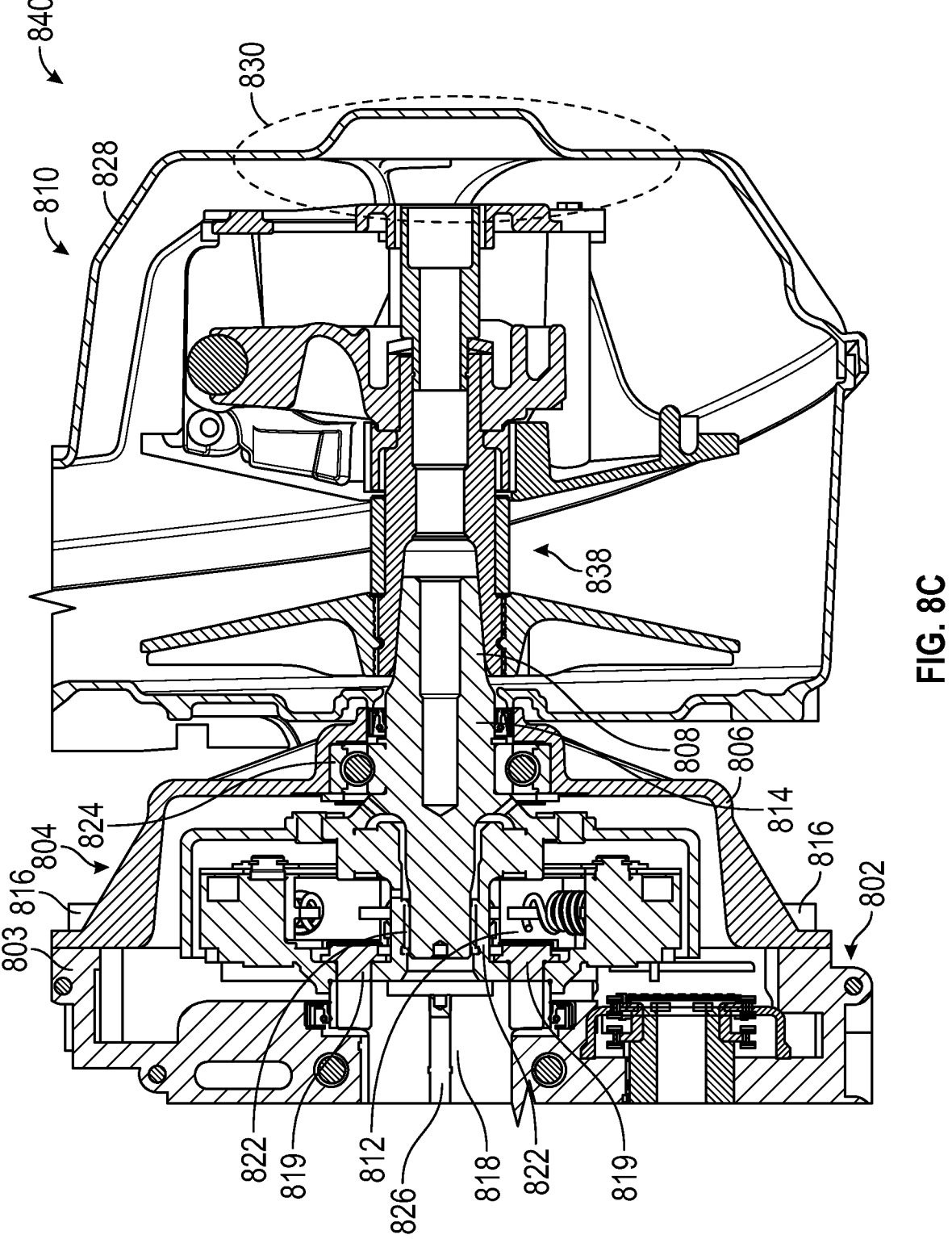
FIG. 8C illustrates a side cross-sectional view of the starting clutch and continuously variable transmission of FIG. 8B.

FIG. 8C illustrates a side cross-sectional view 840 of starting clutch 804 and CVT 810. As illustrated, housing 806 is mechanically coupled to crankcase 803 of prime mover 802 using fasteners 816. It will be appreciated that any of a variety of coupling means may be used to mechanically couple housing 806 with prime mover 802.

Clutch 804 includes input subassembly 812 and output subassembly 814. Input subassembly 812 is mechanically coupled to flange 818 of the crankshaft of prime mover 802 using fasteners 819. As a result of coupling input subassembly 812 to flange 818 of the crankshaft (e.g., rather than a more central coupling means), a cavity is available along the axis of rotation of the crankshaft, in which needle bearing 822 is disposed to support output shaft 808. Thus, input subassembly 812 is supported by flange 818, while output shaft 808 of output subassembly 814 is supported by needle bearing 822 (which is disposed within input subassembly 812) and support bearing 824 (which is disposed within housing 806). Both bearings 822 and 824 are internal to housing 806, such that an external bearing (e.g., within housing 828 of CVT 810, for example within dashed region 830) need not be used. As a result, the footprint associated with prime mover 802, clutch 804, and/or CVT 810 may be reduced.

Additionally, clutch 804 may share lubricant with prime mover 802. For instance, housing 806 may cooperate with crankcase 803 to from a reservoir or sump of lubricant with which subassemblies 812 and 814 may be lubricated. In examples, pathway 826 may be used to distribute oil to various components of clutch 804, such as needle bearing 822 and support bearing 824. As a result of being located substantially along the axis of rotation of the crankshaft, oil distributed via pathway 826 may be at least partially dispersed as a result of the rotation of the crankshaft and/or clutch. Thus, bearings 822 and/or 824 need not be greased and sealed, which may increase their longevity.

Figure 8D:
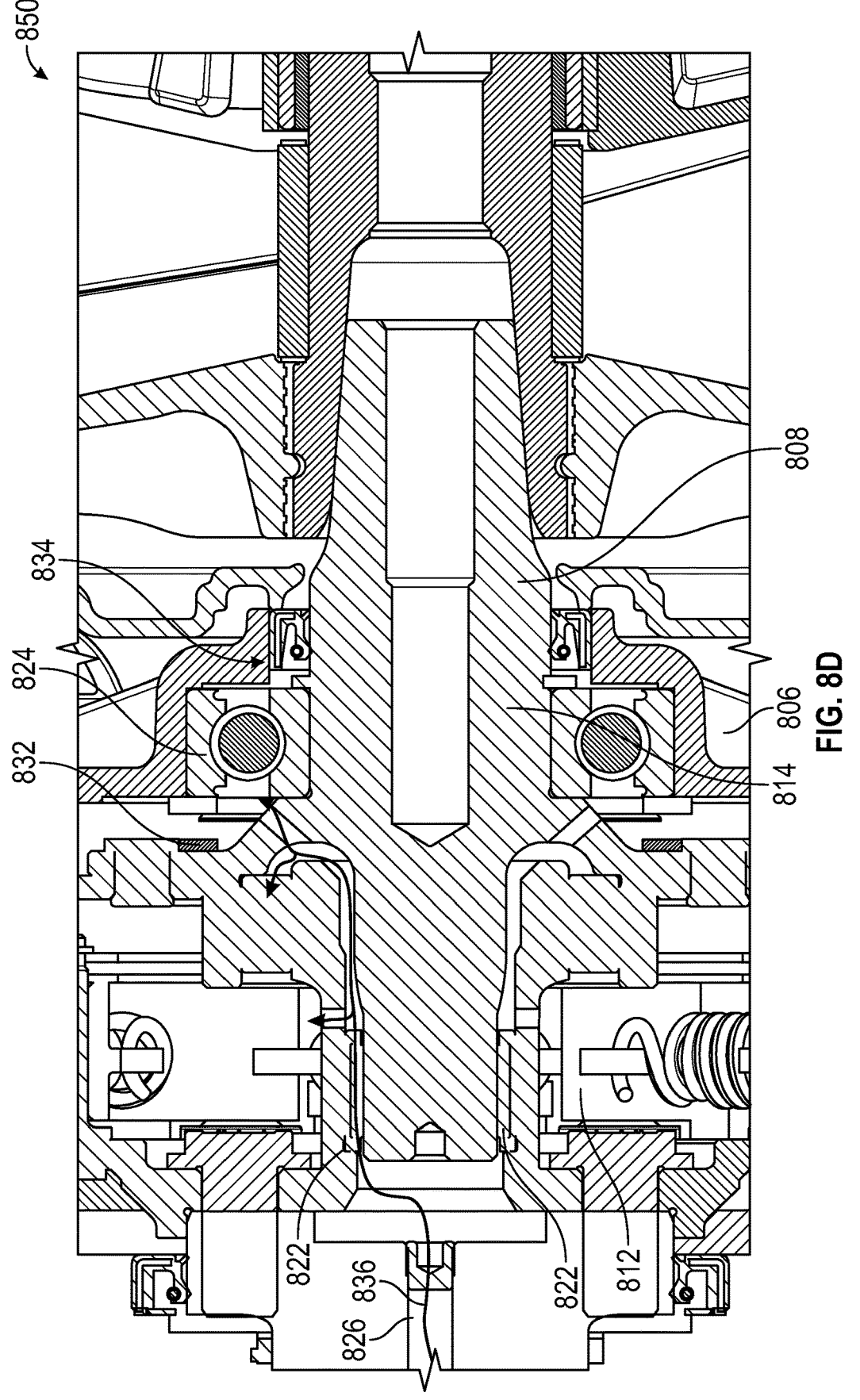
FIG. 8D illustrates a detail view of FIG. 8C.

FIG. 8D illustrates detail view 850, which includes an example oil path 836 that provides lubricant to subassemblies 812 and 814, as well as bearings 822 and 824. Additionally, FIG. 8D further illustrates bearing retention plate 832, which retains support bearing 824 within housing 806, as well as seal 834, which prevents the ingress of debris and egress of lubricant.

Returning to FIGS. 8B and 8C, primary or drive clutch 838 of CVT 810 is mechanically coupled to output shaft 808 of clutch 804. Drive clutch 838 is supported at least in part by output shaft 808 of output subassembly 814. Thus, external support may be reduced or need not be used. Such aspects may reduce the overall width of the system, may reduce a number of associated components, and/or may further avoid complex support structures that impact serviceability and increase the likelihood of incorrect reassembly. For instance, it may be easier to remove housing 828 of CVT 810 to service CVT 810 (e.g., to replace a belt). As a result of the decreased size of the disclosed assembly, prime mover 802, clutch 804, and/or CVT 810 may be arranged in any of a variety of configurations, including, but not limited to, an orientation that extends in a generally perpendicular direction relative to a longitudinal axis of the vehicle (e.g., axis L of vehicle 2 in FIG. 1) or an orientation that extends in a generally parallel direction relative to the longitudinal axis.

One-Way Launch Clutch

Figure 8E:
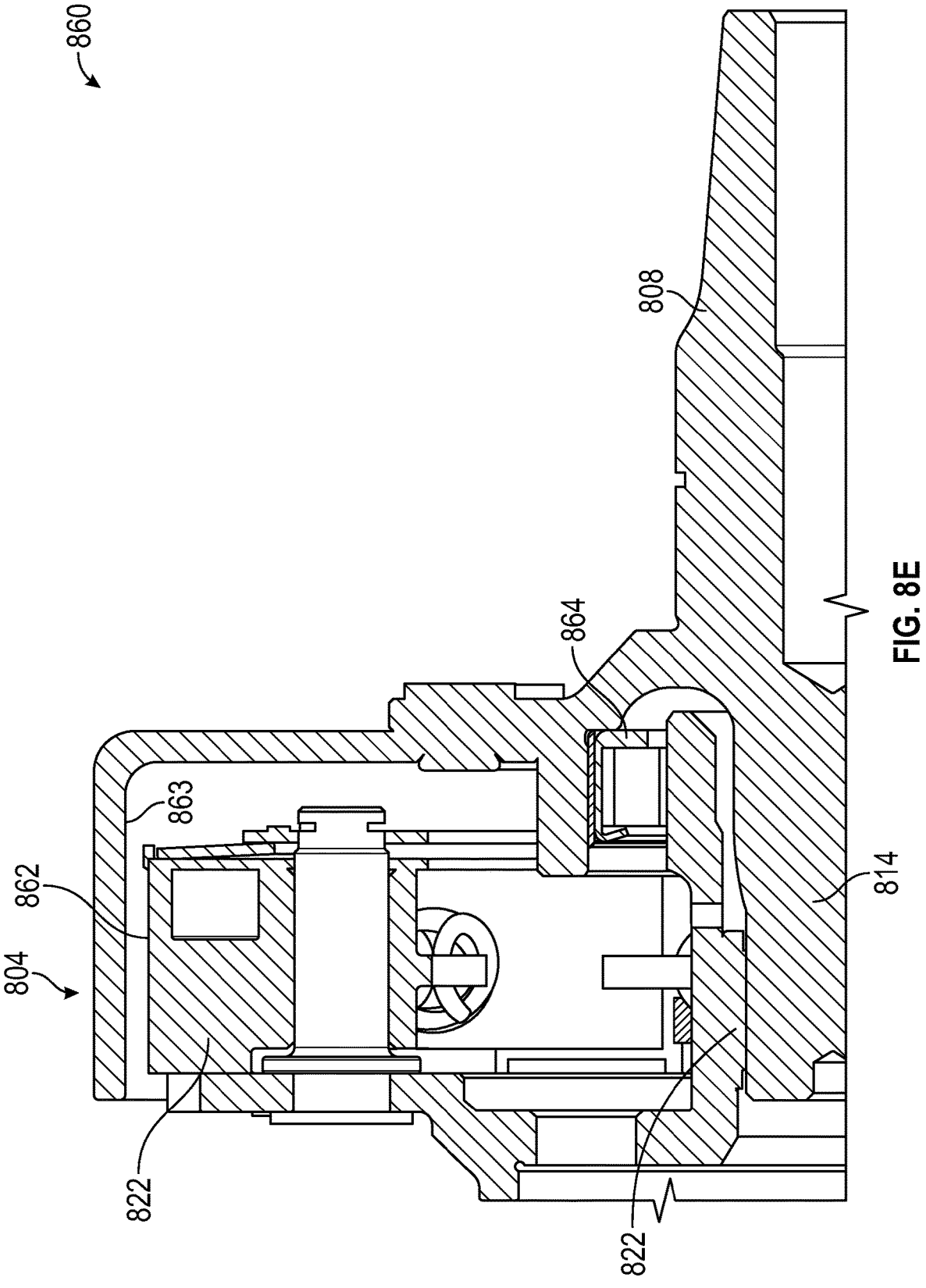
FIG. 8E illustrates a detail view of the starting clutch of FIG. 8C.

FIG. 8E illustrates a detail view 860 of the starting clutch 804 of FIG. 8C. As illustrated, detail view 860 further depicts one-way clutch 864 and friction interfaces 862, 863 of starting clutch 804. Thus, when friction interface 862 of input subassembly 812 is engaged with friction interface 863 of output subassembly 814, torque is transmitted from the crankshaft to output shaft 808 as described above. Further, in instances where output shaft 808 overspeeds the crankshaft and friction interfaces 862 and 863 are not engaged (e.g., below a certain engine speed), one-way clutch 864 causes output subassembly 814 to engage with input subassembly 814, thereby facilitating engine braking of output shaft 808. Given, in some examples, the belt of CVT 810 generally remains in tension, engine braking via CVT 810 may not be possible, such that one-way clutch 864 is used to provide engine braking via starting clutch 804 instead. In examples, one-way clutch 864 does not engage above a certain speed, thereby protecting one-way clutch 864 and/or other associated components from damage. Additionally, or alternatively, one-way clutch 864 limits torque transfer above a threshold, such that a torque event that exceeds the threshold causes one-way clutch 864 to slip rather than transferring excess torque to input subassembly 812. Thus, one-way clutch 864 facilitates engine braking while also reducing or eliminating damage that may otherwise result from various dynamic events (e.g., a powered-on or powered-off landing of the vehicle).

Multi-Angle CVT Drive Pulley Sheaves

Figure 9:
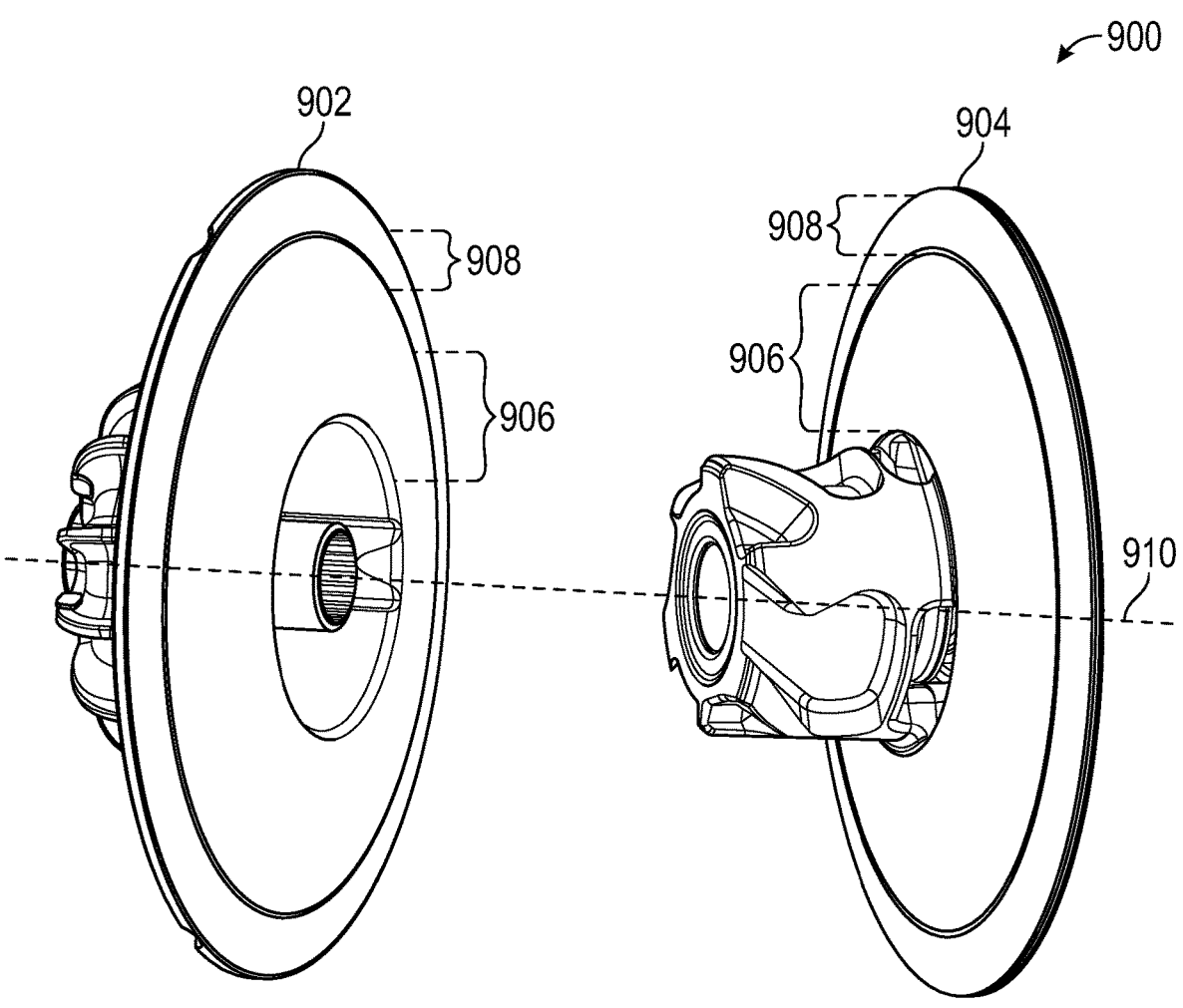
FIG. 9 illustrates an exploded view of an example clutch for use in a continuously variable transmission according to aspects described herein.

FIG. 9 illustrates an exploded view of an example clutch 900 for use in a continuously variable transmission according to aspects described herein. Aspects of driven clutch 900 may be similar to driven clutch 52 discussed above with respect to FIG. 3 and are therefore not redescribed below in detail.

As illustrated, driven clutch 900 includes sheave 902 and sheave 904, where the face of each sheave 902, 904 includes two regions 906 and 908. In examples, region 906 of sheave 902 and region 906 of sheave 904 may each have similar but opposing angles, such that the distance between region 906 of sheave 902 and region 906 of sheave 904 increases when moving radially outward from axis 910.

Similar to region 906, region 908 of sheave 902 and region 908 of sheave 904 may also have a similar but opposing angle. However, the angle of region 908 may be smaller than that of region 906. The angle of region 906 may be selected to substantially match that of a belt with which driven clutch 900 is used, while the angle of region 908 may be a smaller angle than that of region 906.

As a result of the decreased angle near the outer annulus of sheaves 902 and 904, a radial pressure gradient may be produced where a belt (not pictured) contacts sheaves 902 and 904, such that higher pressure is exhibited near the top surface of the belt and lower pressure (or, in some examples, even a gap between sheave 902 and/or 904 and the belt) is exhibited near the bottom surface of the belt. As a result, decreased noise, vibration, and/or harshness may be generated by driven clutch 900 during lower-speed operation.

Additionally, as compared to instances where a single angle is used (rather than different angles between regions 906 and 908), the belt cannot wear to match both angles and may instead wear to match the angle of region 906 (e.g., where the belt is most likely to reside during operation). Similarly, misalignment may be reduced or minimized as a result of the majority of travel is still being within region 906 (as compared to a sheave having a uniformly reduced angle).

CVT Spider Shoulder Bolt/Threaded Bushings

In examples, a spider roller may be retained within a spider assembly of a CVT (e.g., CVT 34 discussed above with respect to FIGS. 1-3) using a press fit. However, stress introduced by the press fit and/or as a result of the press fit process may reduce the lift of the spider assembly. Further, the press fit process may alter the intended fit as a result of misalignment.

Figure 10A:
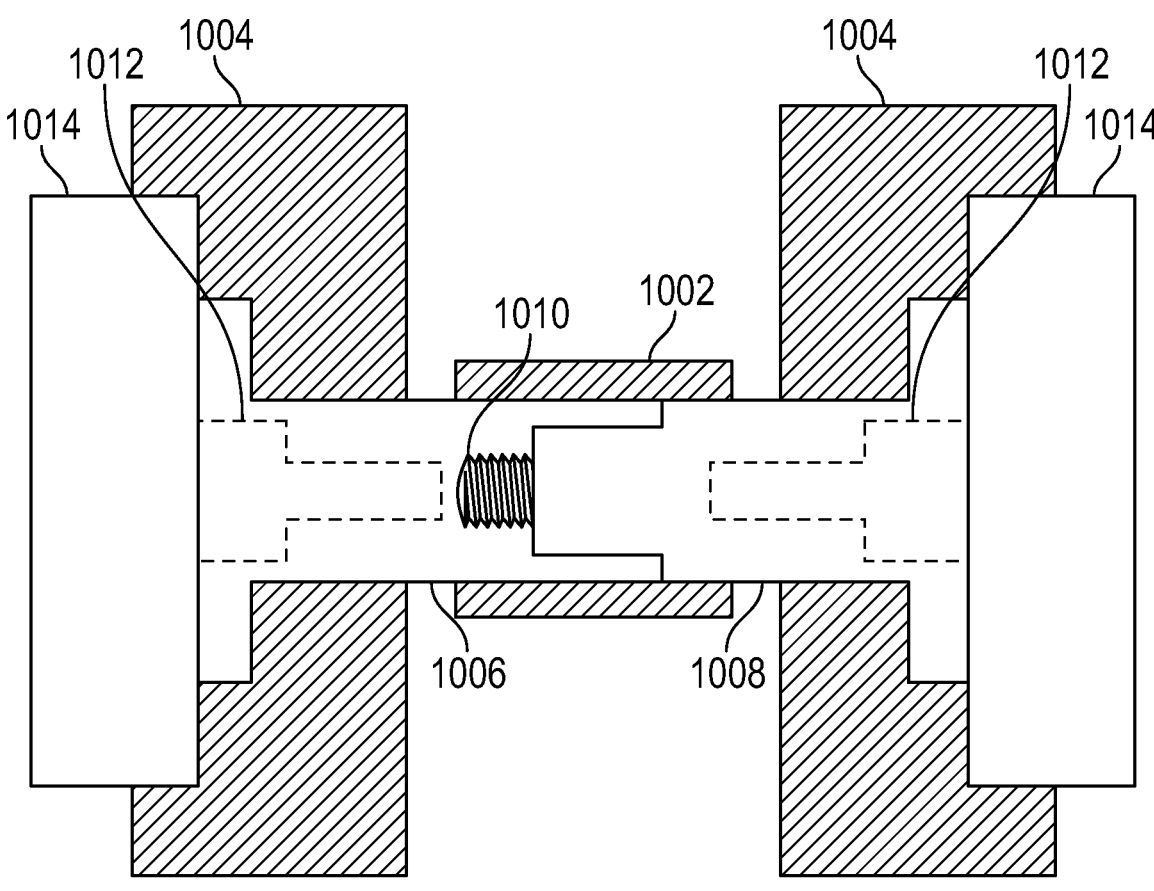
FIG. 10A illustrates a conceptual diagram of a coupling means with which a spider roller is coupled to a spider assembly of a continuously variable transmission.

Accordingly, FIG. 10A illustrates a conceptual diagram of a coupling means with which a spider roller or bushing 1002 is coupled to a spider assembly 1000 of a CVT. As illustrated, spider assembly 1000 includes spider members 1004, each of which includes an opening configured to receive one of shouldered sleeve 1006 or 1008. Additionally, bushing 1002 is sized and shaped to receive shouldered sleeves 1006 and 1008. Shouldered sleeve 1008 includes thread 1010. Shouldered sleeve 1006 is configured to receive thread 1010 of shouldered sleeve 1008, thereby mechanically coupling shouldered sleeve 1006 and shouldered sleeve 1008 and retaining bushing 1002 between spider members 1004. Shouldered sleeves 1006 and 1008 each include internal drive 1012, which may be used when fastening shouldered sleeves 1006 and 1008 together. Accordingly, each internal drive 1012 is ultimately covered by a corresponding button 1014, which may be fastened to shouldered sleeve 1006 or 1008 (e.g., using a friction fit, a mechanical fastener, and/or adhesive, among other examples).

While assembly 1000 is illustrated as an example in which shouldered sleeves 1006 and 1008 are joined within bushing 1002, it will be appreciated that shouldered sleeve 1008 may be shorter or longer (and shouldered sleeve 1006 may similarly be longer or shorter, respectively), thereby shifting the location at which shouldered sleeves 1006 and 1008 are joined. Further, as a result of joining shouldered sleeve 1006 and 1008, substantially full contact may be achieved between spider members 1004 and the ends of shouldered sleeves 1006 and 1008 (e.g., even in instances where spider members 1004 are part of a casting which may have associated variability).

Figure 10B:
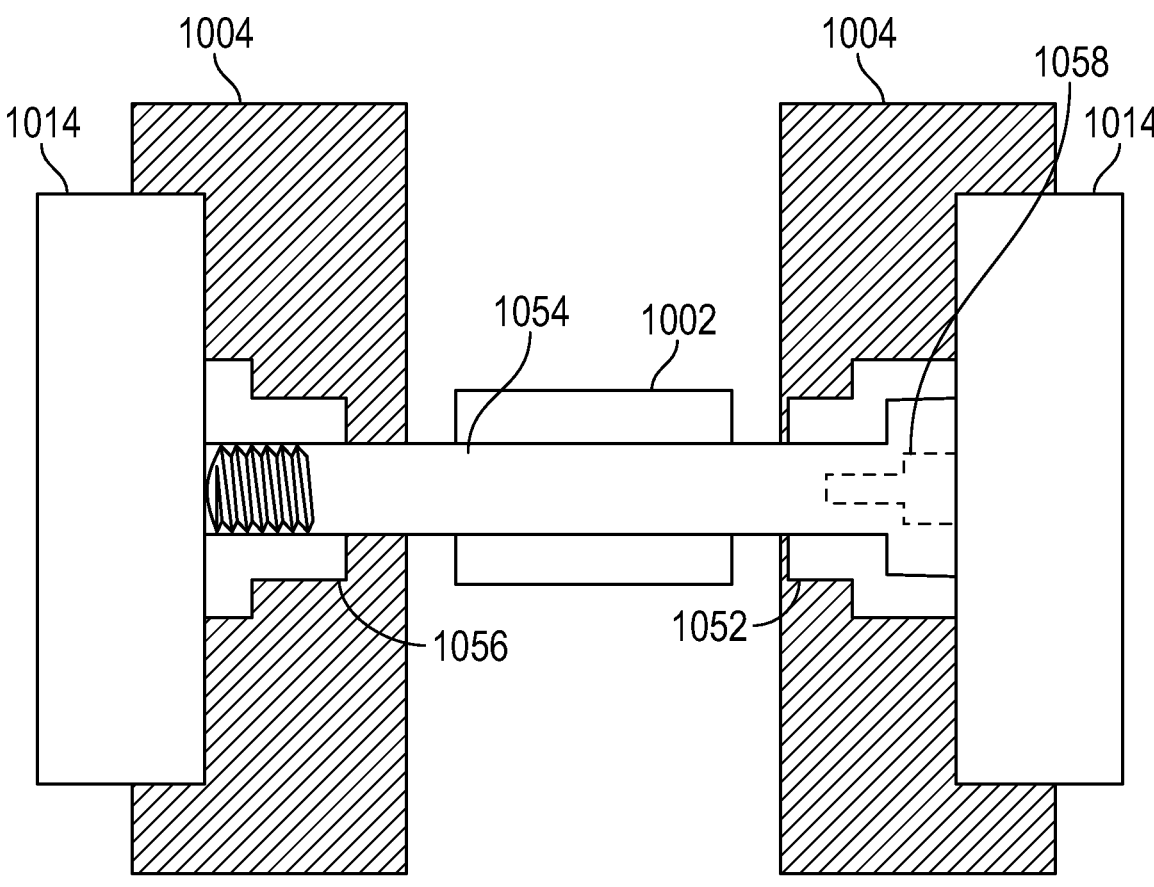
FIG. 10B illustrates a conceptual diagram of another coupling means with which a spider roller is coupled to a spider assembly of a continuously variable transmission.

FIG. 10B illustrates a conceptual diagram of another coupling means with which spider roller 1002 is coupled to a spider assembly 1050 of a continuously variable transmission. Similar to FIG. 10A, spider assembly 1000 includes spider members 1004 and buttons 1014. Rather than using a set of shouldered sleeves as discussed above with respect to FIG. 10A, FIG. 10B is an example in which spider members 1004 are configured to receive inserts 1052 and 1056. Insert 1056 is configured to receive the threads of threaded shoulder bolt 1054. Accordingly, threaded shoulder bolt 1054 rests within insert 1052 and mechanically couples with insert 1056, thereby retaining bushing 1002 between spider members 1004. Similar to shouldered sleeves 1006 and 1008, threaded shoulder bolt 1054 includes internal drive 1058, which may be used when fastening threaded shoulder bolt 1054 to insert 1056. Thus, the tension created by fastening threaded shoulder bolt 1054 and insert 1056 ensure that bushing 1002 is retained by spider assembly 1050.

Helical Splined Connection for CVT Pulley

Figure 11:
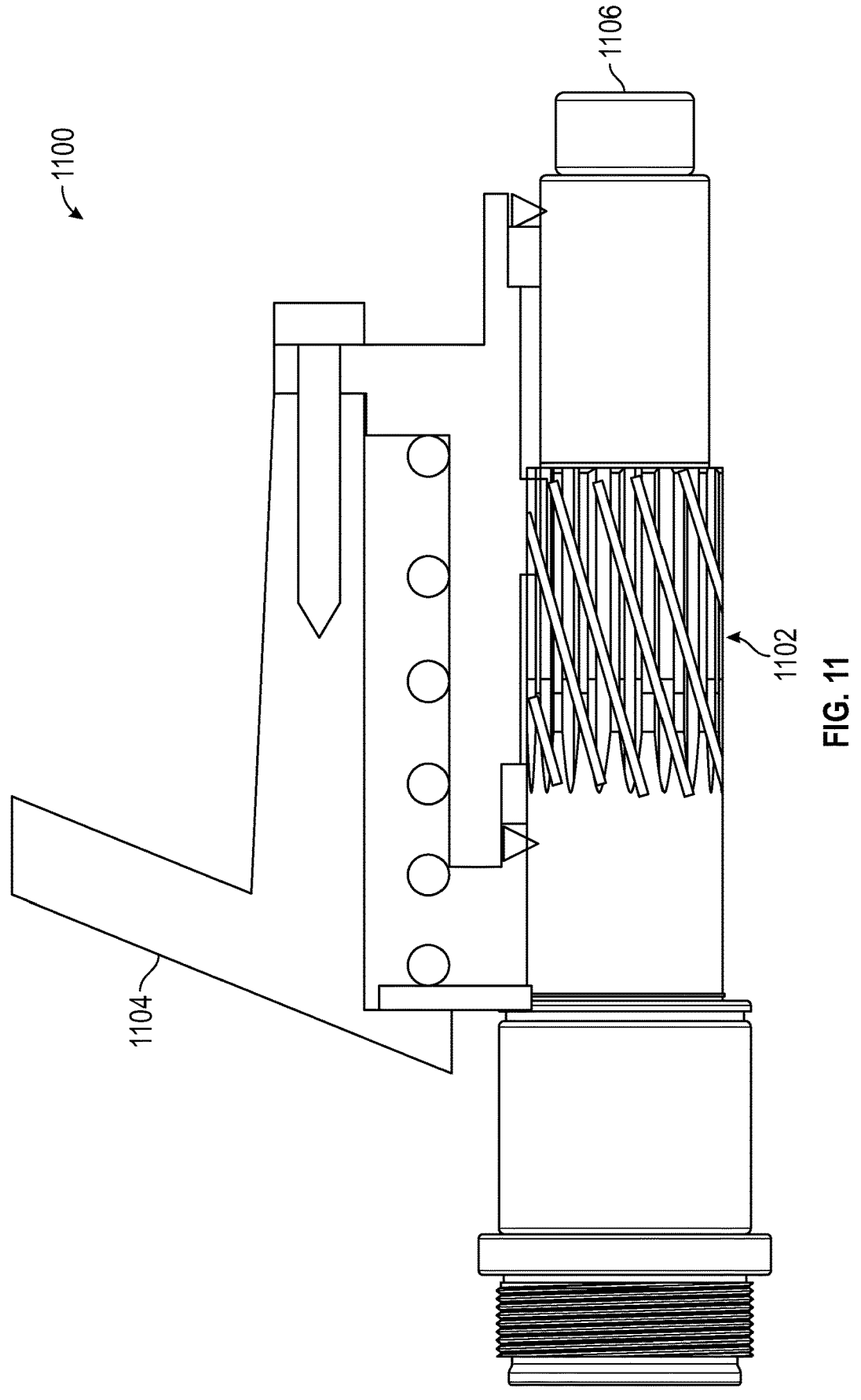
FIG. 11 illustrates a conceptual diagram of a drive clutch with a helical spline according to aspects described herein.

FIG. 11 illustrates a conceptual diagram of a drive clutch 1100 with a helical spline 1102 according to aspects described herein. Drive clutch 1100 may be part of a CVT, such as CVT 34 discussed above with respect to FIGS. 1-3. As illustrated, drive clutch 1100 includes movable sheave 1104 and helical spline 1102. Thus, drive clutch 1100 utilizes helically cut sliding spline 1102 to rotatably couple the stationary shaft 1106 to movable sheave 1104, while still allowing axial translation of movable sheave 1104 along the helix to achieve variable ratios of the CVT.

In examples, the orientation of helical spline 1102 may be selected to affect an RPM profile of the vehicle (e.g., associated with partial-throttle operation). For example, the RPM may be decreased for improved noise, vibration, and harshness in partial-throttle applications or may be increased for improved responsiveness and acceleration in other applications. In instances where noise, vibration, and/or harshness considerations are prioritized over throttle response, the helical angle of helical spline 1102 may be oriented such that applied propulsion torque from a prime mover (e.g., engine 32 or prime mover 402) counteracts the force generated by centrifugal biasing elements of the CVT.

As a result, a higher force (e.g., typically heavier) centrifugal biasing element may be used, which may thus transmit more applied clamping force to the belt under lower torque conditions than a non-torque sensing coupling would allow, while still maintaining operating speed under high or maximum propulsive torque. This may result in a numerically lower ratio in partial-throttle applications, thereby reducing the vehicle sound level while still allowing the system to operate at comparatively higher or maximum power.

For example, when higher torque is input to the system (e.g., via shaft 1106), the use of helical spline 1102 may result in a reduced amount of clamping force to be transmitted to the belt (e.g., as a linear function of applied torque from the centrifugal biasing elements). As a result, a centrifugal biasing element that applies comparatively more force may be used, while still maintaining a higher maximum torque RPM. Conversely, when there is reduced torque demand (e.g., under more steady-state or cruising conditions), use of helical spline 1102 may result in a reduced clamping force applied to the belt. The biasing element may still produce applied force in such a scenario, though the reduction in applied torque may reduce the counteracting effect of helical spline 1102, thereby reducing the operating RPM and the resulting vehicle sound level.

As another example, the configuration of helical spline 1102 may be reversed, such that applied torque adds to the resulting clamping force. As a result, a proportionally lighter centrifugal biasing element may be used, thereby resulting in higher partial-throttle RPM (e.g., without unnecessarily over-revving the prime mover under an increased torque or throttle application). This may improve an associated throttle response, as may be used in performance- and/or sport-oriented applications. Additionally, the forces associated with the biasing elements may be reduced, which may increase the longevity of wear interfaces surrounding the centrifugal biasing elements (e.g., because less force may be provided by the biasing element to produce an equivalent belt force). In another embodiment, helical spline 1102 may instead use a helical roller-ramp design, a sliding pin-track design, or a sliding element button-ramp design, among other examples.

Control Aspects

Figure 12:
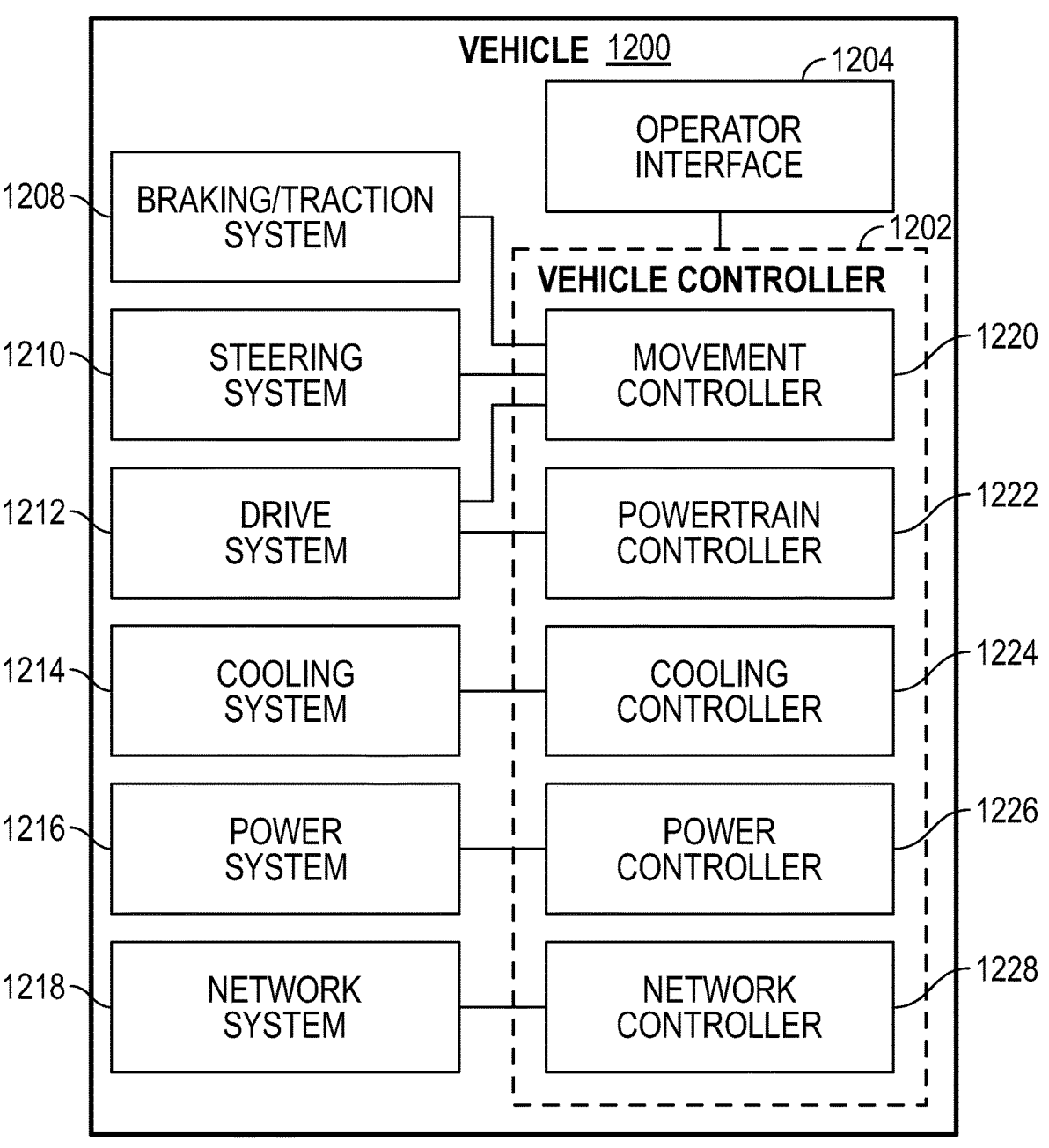
FIG. 12 illustrates a conceptual diagram of an example vehicle according to aspects described herein.

FIG. 12 is a representative view of an example vehicle 1200 according to aspects described herein. Aspects of vehicle 1200 are similar to vehicle 2 discussed above with respect to FIGS. 1-3 and are therefore not redescribed below in detail.

As illustrated, vehicle 1200 includes vehicle controller 1202 and operator interface 1204. In examples, operator interface 1204 which includes at least one input device (not pictured) and at least one output device (not pictured). Example input devices include levers, buttons, switches, touch screens, soft keys, and other suitable input devices. Example output devices include lights, displays, audio devices, tactile devices, and other suitable output devices. An operator may signal to vehicle controller 1202 to alter the operation of one or more systems of vehicle 1200 through the input devices.

Vehicle controller 1202 has at least one processor and at least one associated memory. Vehicle controller 1202 may be a single device or a distributed device, and the functions of the vehicle controller 1202 may be performed by hardware and/or as computer instructions on a non-transitory computer readable storage medium, such as the associated memory.

As illustrated, vehicle controller 1202 includes movement controller 1220, powertrain controller 1222, cooling controller 1224, power controller 1226, and network controller 1228. In examples, vehicle controller 1202 controls functionality of vehicle 1200, including braking/traction system 1208, steering system 1210, drive system 1212, cooling system 1214, power system 1216, and network system 1218. Vehicle controller 1202 may communicate with systems of vehicle 1200 using any of a variety of protocols, including, but not limited to, a controller area network (CAN) bus, an Ethernet or BroadR-Reach connection, a fiber connection, a universal serial bus (USB) connection, and/or a wireless connection.

As illustrated, movement controller 1220 communicates with braking/traction system 1208, steering system 1210, and drive system 1212. For example, movement controller 1220 may control the pressure and frequency of the actuation of one or more brake calipers of braking/traction system 1208, a steering angle of one or more ground-engaging members (e.g., ground-engaging members 4) of steering system 1210, and/or a power output of one or more engines (e.g., engine 32) and/or electric motors of drive system 1212. In examples, movement controller 1220 may receive user input via external controls (e.g., of operator interface

1204) or via a remote computing device (not pictured) and control system 1208, 1210, and/or 1212 accordingly. In other examples, vehicle controller 302 may be an autonomous-ready system that automatically affects operation of vehicle 300 in response to detected conditions of the vehicle and/or the environment in which the vehicle is operating. While example aspects are described herein with respect to braking/traction system 1208 and/or steering system 1210, it will be appreciated that similar techniques may be used in instances where drive system 1212 includes an individual drive motor for each ground engaging member. For example, a set of drive motors may be used to provide vehicle stability aspects as an alternative to or in addition to control of braking/traction system 1208 and/or steering system 1210.

Drive system 1212 may further include a powertrain assembly, such as the powertrain assemblies discussed above with respect to aspects of FIGS. 1-11. As illustrated, vehicle controller 1202 includes powertrain controller 1222, which may control the powertrain assembly according to aspects described herein. For example, powertrain controller 1222 may obtain data associated with a set of sensors of vehicle 1200. Example sensors include, but are not limited to, temperature sensors, vehicle speed sensors, RPM sensors (e.g., sensors 414, 416, and 419 discussed above with respect to FIG. 4A), an inertial measurement unit (IMU) sensor, and/or a sensor associated with a state of a geartrain (e.g., sensor 418 of geartrain 408), among other examples. It will be appreciated that sensors need not be limited to a powertrain assembly, and may alternatively or additionally provide data associated with braking/traction system 1208, steering system 1210, power system 1216, and/or other aspects of drive system 1212, among other examples.

Based on the obtained data, powertrain controller 1222 may actuate a CVT of the powertrain assembly (e.g., CVT 34, CVT 404, CVT 506, and/or CVT 604), may control a clutch of the powertrain assembly (e.g., clutch 406 and/or DCT 606), and/or may cause the powertrain assembly to shift between various associated gears (e.g., from a high gear configuration to a low gear configuration and/or between final gearsets, such as those discussed above with respect to FIGS. 7A-7F). As an example, powertrain controller 1222 may control a clamping force associated with a clutch of the powertrain assembly so as to provide torque-limiting functionality or to enable a shift to occur while vehicle 1202 is in motion, among other examples. Additional example control aspects of powertrain controller 1222 are discussed herein, for example with reference to FIGS. 4A-11 and 13A-14F.

Vehicle 1200 is further illustrated as including network system 1218 and network controller 1228. Network controller 1228 may control communications between vehicle 1200 and other vehicles and/or devices. For example, network system 1218 may be used to communicate via a local area network, a peer-to-peer network, the Internet, or any of a variety of other networks. In one embodiment, network controller 1228 communicates with paired devices utilizing a BLUETOOTH or WI-FI protocol. In this example, network system 1218 may include a radio frequency antenna. Network controller 1228 controls the pairing of devices to vehicle 1200 and the communications between vehicle 1200 and such remote devices.

As an example, a remote computing device (e.g., a mobile computing device or a tablet computing device) may be used to control aspects of vehicle 1200. Control by the remote computing device may be similar to the control functionality provided by operator interface 1204. For example, an operator may view image/video data from one or more cameras of the vehicle and may provide user input to control vehicle 1200 accordingly. It will be appreciated that any number of networks, network types, and associated technologies may be used. For example, network system 1218 may include a cellular antenna, a satellite antenna, and/or one or more components for wired communication.

Ratio Control Supervisor

Figure 13A:
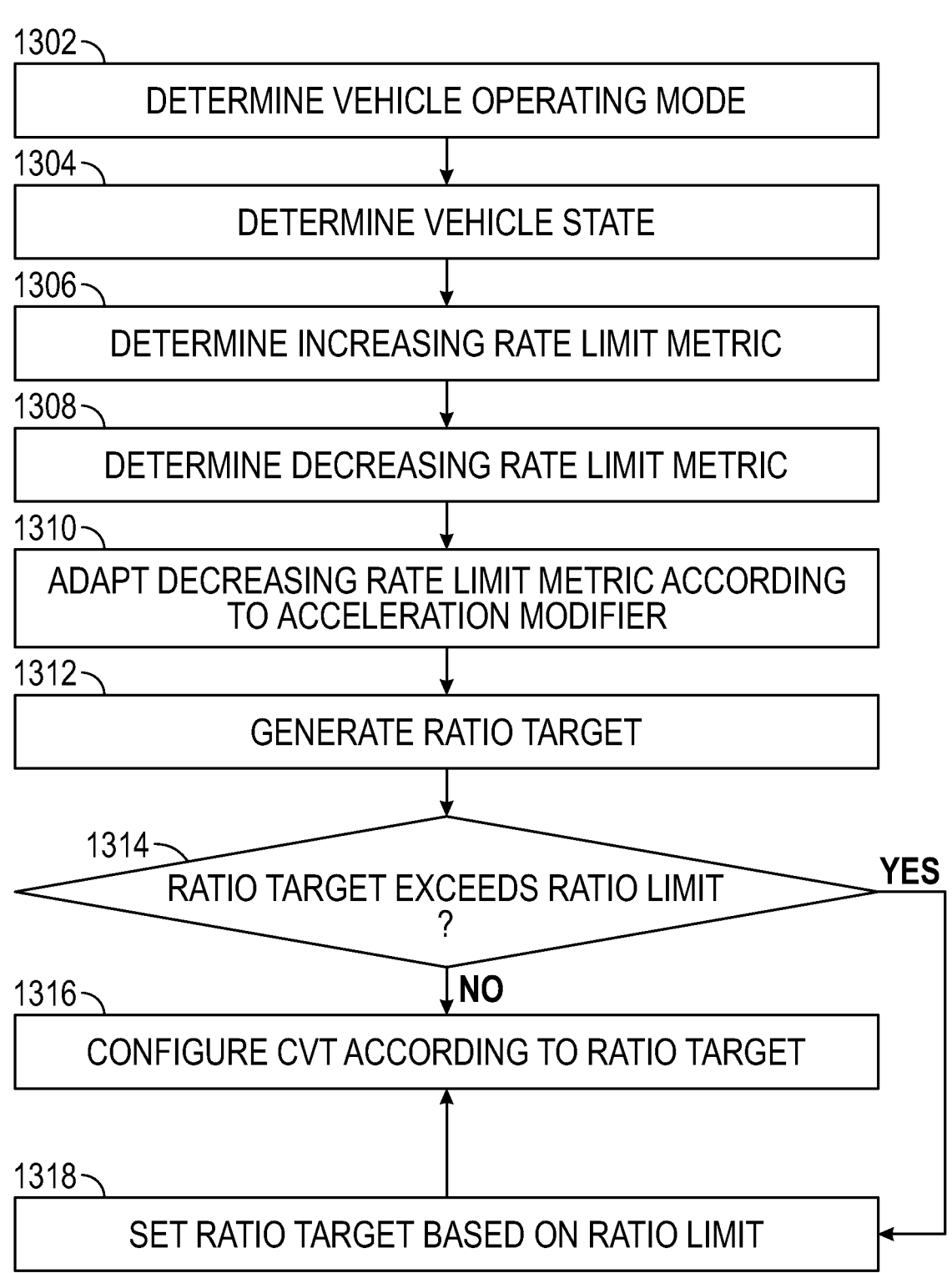
FIG. 13A illustrates an overview of an example method for controlling a CVT of a vehicle based on a shift rate limit according to aspects described herein.

FIG. 13A illustrates an overview of an example method 1300 for controlling a CVT of a vehicle based on a shift rate limit according to aspects described herein. Method 1300 may be performed by a powertrain controller (e.g., powertrain controller 1222 in FIG. 12) and may be used to increase the likelihood that a belt of the CVT remains in tension during normal operation. As an example, method 1300 may affect back-shifting during braking and/or upshifting during a slip event of one or more ground-engaging members. As illustrated, method 1300 evaluates the tractive effort provided by the drive system (e.g., drive system 1212) and the force provided by the braking/traction system (e.g., braking/traction system 1208).

In examples, the shift rate limit may be configurable according to a drive mode of the vehicle (e.g., as may be specified by a vehicle operator). Each drive mode may have an associated increasing rate limit metric and an associated decreasing rate limit metric (e.g., a comfort operating mode may have a slower shift response, while a sport operating mode may have a higher shift response), such that a change to the ratio of the CVT is determined according to the illustrated method and limited according to the increasing rate limit metric and the decreasing rate limit metric. In examples, an acceleration modifier (e.g., according to a vehicle dynamics model) may be used to affect a rate with which the CVT ratio may decrease, additional aspects of which are discussed below with respect to FIGS. 14A-14F.

Additionally, a set of ratio limits may be used, which may evaluate a torque transmissibility associated with the CVT (e.g., at a given torque and/or speed input). For example, at tighter belt wrap angles near a maximum ratio of the CVT, the contact area of the belt with the primary sheaves may be relatively small, such that the system may be unable to transfer the full torque capability of the prime mover. Thus, to increase the likelihood of adequate clamping force and reduce the likelihood of slip, the set of ratio limits may include a maximum ratio based on the input torque target of the prime mover. Similarly, the set of ratio limits may include a minimum ratio that is selected (e.g., based on the vehicle speed and directional gear) to reduce the likelihood that the speed of the prime mover drops below a predetermined threshold (e.g., when the vehicle is decelerating to a stop).

Method 1300 begins at operation 1302, where a vehicle operating mode is determined. For example, the vehicle operating mode may be specified by a vehicle operator, may default to a certain operating mode when the vehicle is powered on, or may change according to environmental conditions, among other examples.

At operation 1304, a vehicle state is determined. For example, the vehicle state may be determined from any of a variety of sensors of the vehicle. The vehicle state may include an RPM of the prime mover, an associated amount of torque, and/or a current ratio target of a CVT of the vehicle, among other examples.

Flow progresses to operation 1306, where an increasing rate limit metric is determined. For example, the increasing rate limit metric may be determined based at least in part of the vehicle state that was determined at operation 1304 and/or a vehicle operation mode that was determined at operation 1302. In examples, the increasing rate limit metric is determined from a table or matrix, which may specify an increasing rate limit metric for a given prime mover speed and/or associated amount of torque. In some operation 1306 comprises identifying the table or matrix based on the operating mode that was determined at operation 1302, such that different tables may be used for different operating modes. The table or matrix may have been generated based on empirical data for the torque transmissibility at known drive sheave diameters, which may be directly related to geometric ratio. For example, two-dimensional line map may be generated, where the x-axis corresponds to the prime mover RPM and the y-axis corresponds to the associated leading torque. A maximum ratio may then be plotted within the two-dimensional line map. In another example, a set of rules may be used to generate the increasing rate limit metric based on one or more inputs.

Moving to operation 1308, a decreasing rate limit metric is determined. Similar to operation 1306, the decreasing rate limit metric may be determined based at least in part of the vehicle state that was determined at operation 1304 and/or a vehicle operation mode that was determined at operation 1302. In examples, the decreasing rate limit metric is determined from a table or matrix, which may specify a decreasing rate limit metric for a given prime mover speed and/or associated amount of torque. In some operation 1306 comprises identifying the table or matrix based on the operating mode that was determined at operation 1302, such that different tables may be used for different operating modes. The table or matrix may have been generated according to a set of empirical observations, as discussed above with respect to operation 1306. In another example, a set of rules may be used to generate the decreasing rate limit metric based on one or more inputs.

At operation 1310, the decreasing rate limit metric that was determined at operation 1308 may be adapted according to an acceleration modifier. For example, operation 1310 may comprise evaluating an estimated maximum acceleration based on a tractive effort of the powertrain as compared to data obtained from a speed sensor of the vehicle (e.g., as may have been obtained at operation 1302). Additional examples of such aspects are discussed below with respect to FIGS. 14A-14F. The evaluation may comprise determining whether a difference between the estimated maximum acceleration and the data from the speed sensor exceeds a predetermined threshold (e.g., according to a percent difference or a subtractive difference). If it is determined that the difference exceeds the predetermined threshold, operation 1312 may comprise adapting the decreasing rate limit metric to inhibit the CVT from upshifting.

Flow progresses to operation 1312, where a ratio target is generated. The ratio target may be generated based on a preexisting ratio target (e.g., as may have been determined at operation 1304) and based on the determined increasing and decreasing rate limit metrics. In examples, the ratio target is further determined based at least on a braking target of the vehicle (e.g., as may have been determined at operation 1304), such that the generated ratio may be adapted in instances where a deceleration target of the vehicle is not met (e.g., within a predetermined threshold). As a result, the generated ratio may cause the CVT to backshift more, thereby further decelerating the vehicle.

At determination 1314, it is determined whether the ratio generated at operation 1312 exceeds a ratio limit. As noted above, a set of ratio limits may be used, including a maximum ratio and a minimum ratio that evaluate the torque transmissibility associated with the CVT. Accordingly, if it is determined that the generated ratio exceeds a ratio limit (e.g., above a maximum ratio or below a minimum ratio), flow branches "YES" to operation 1318, where the ratio target is set based on a ratio limit. Flow then progresses to operation 1316 where the CVT is configured according to the ratio target, which is discussed below.

If, however, it is determined that the generated ratio does not exceed the ratio limit, flow instead branches "NO" to operation 1316, where the CVT is configured according to the generated ratio target. For example, operation 1316 may comprise actuating a drive clutch and/or driven clutch of the CVT according to the ratio target, thereby configuring the CVT accordingly. Method 1300 terminates at operation 1316.

Figure 13B:
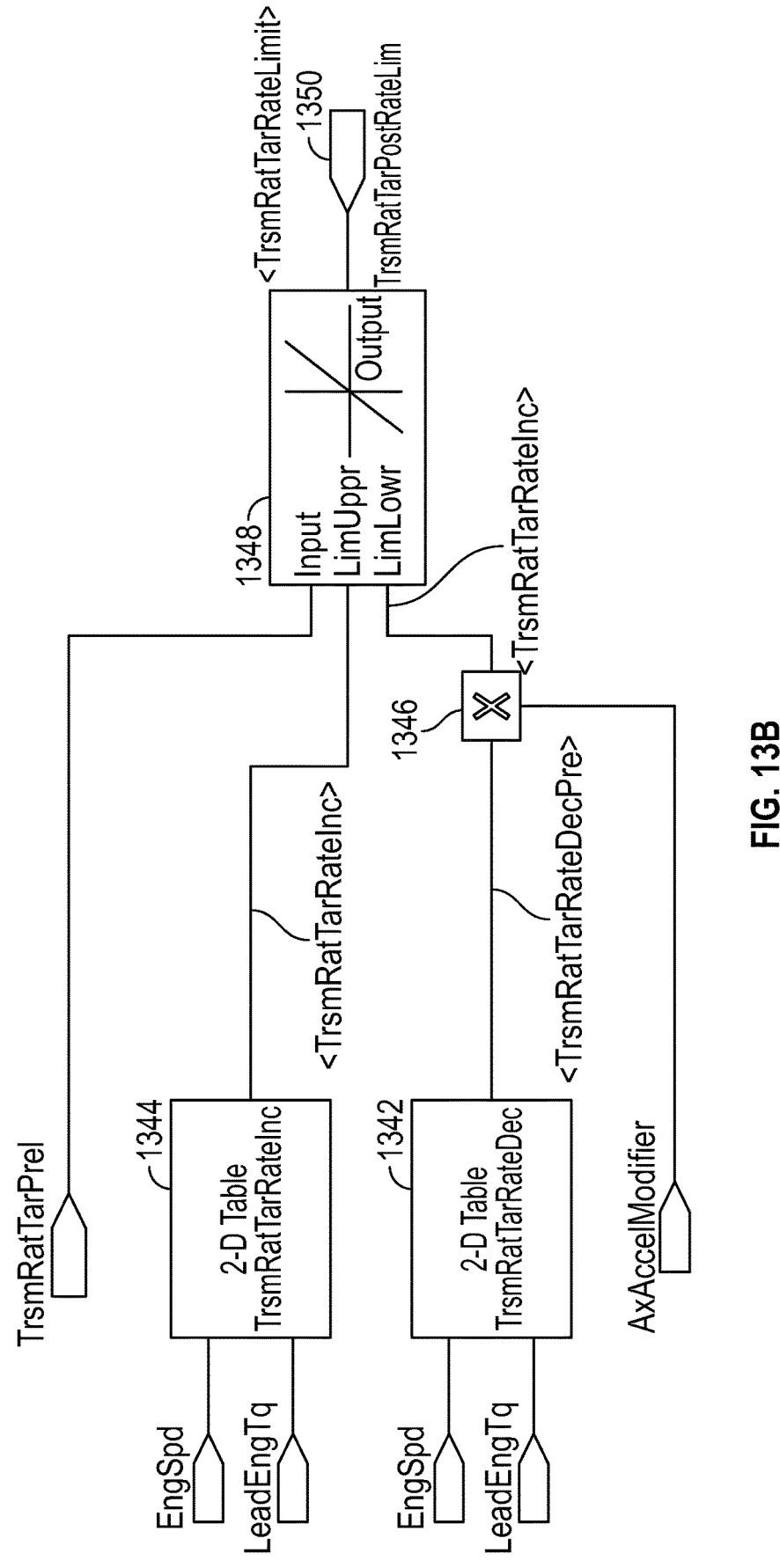
FIGS. 13B-13C illustrate example models similar to the method set forth in FIG. 13A.
Figure 13C:
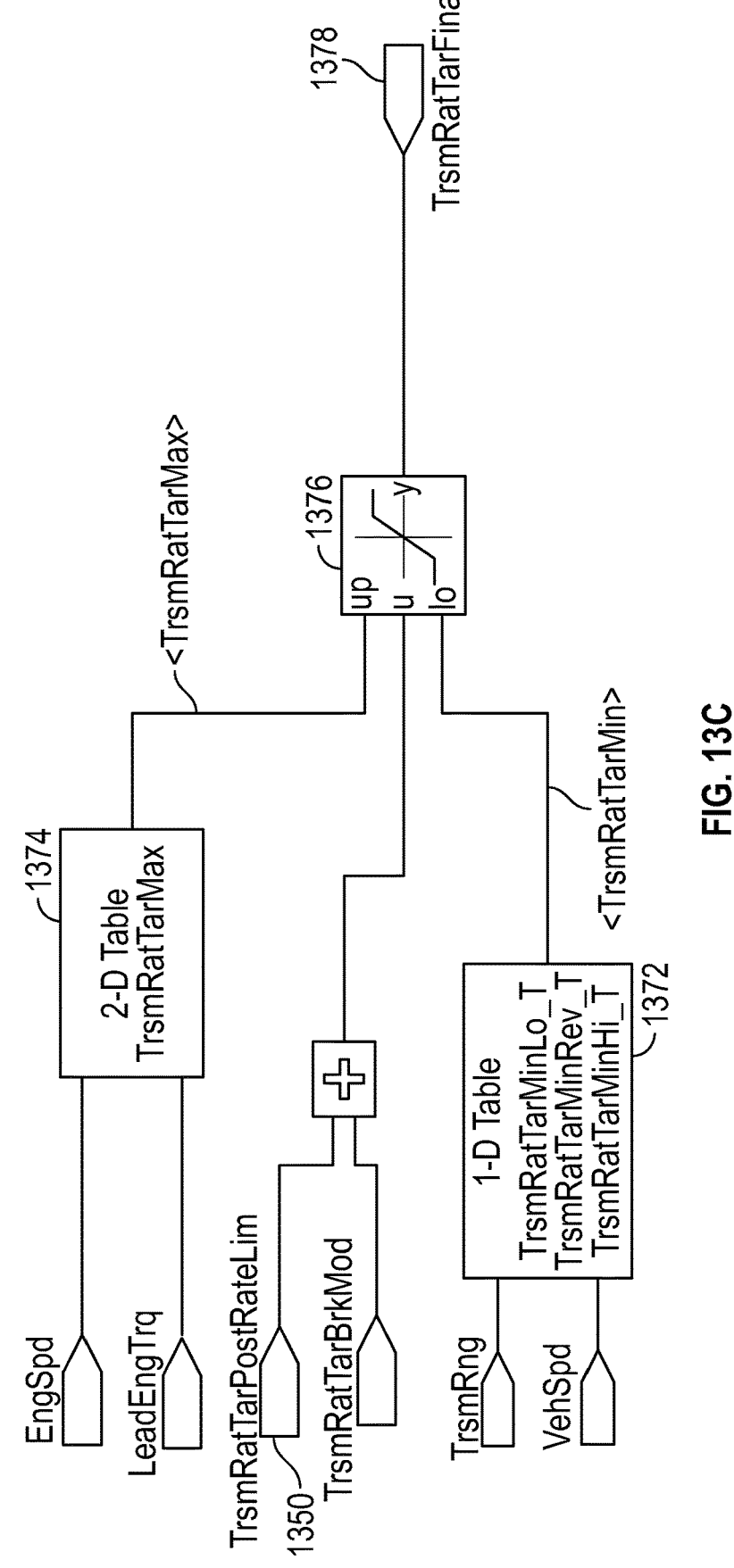

FIGS. 13B-13C illustrate example models 1340 and 1370 similar to the method set forth in FIG. 13A. With reference to FIG. 13B, tables 1342 and 1344 are used to generate a decreasing rate limit metric and an increasing rate limit, respectively (e.g., based on engine speed, "EngSpd," and associated torque, "LeadEngTq"). The decreasing rate limit is adapted at operation 1346 (e.g., similar to aspects of operation 1310 discussed above with respect to FIG. 13B). Operation 1348 then generates target rate limit 1350 (e.g., similar to aspects of operation 1312) based on the increasing rate limit metric, the adapted decreasing rate limit metric, and the preliminary rate target.

Turning to FIG. 13C, final rate target 1378 is generated based on target rate limit 1350 in conjunction with a target brake modifier (e.g., similar to aspects of operation 1312), where a target maximum (e.g., determined based on table 1374) and a target rate minimum (e.g., based on table 1372) are used to ensure final rate target 1378 does not exceed a set of ratio limits.

LVD Model for Terrain Compensation Control

FIGS. 14A-14F illustrate example control diagrams for controlling a CVT of a vehicle according to aspects described herein. In examples, aspects of FIGS. 14A-14F may be used when controlling a CVT according to aspects of method 1300 discussed above with respect to FIG. 13A. For example, FIG. 14A may characterize terrain information using multiple sub-models (e.g., FIGS. 14B-14F). Such sub-models may be used to evaluate terrain conditions and modify the associated shift profile accordingly to promote smooth, uninterrupted, operation by a vehicle operator.

Figure 14A:
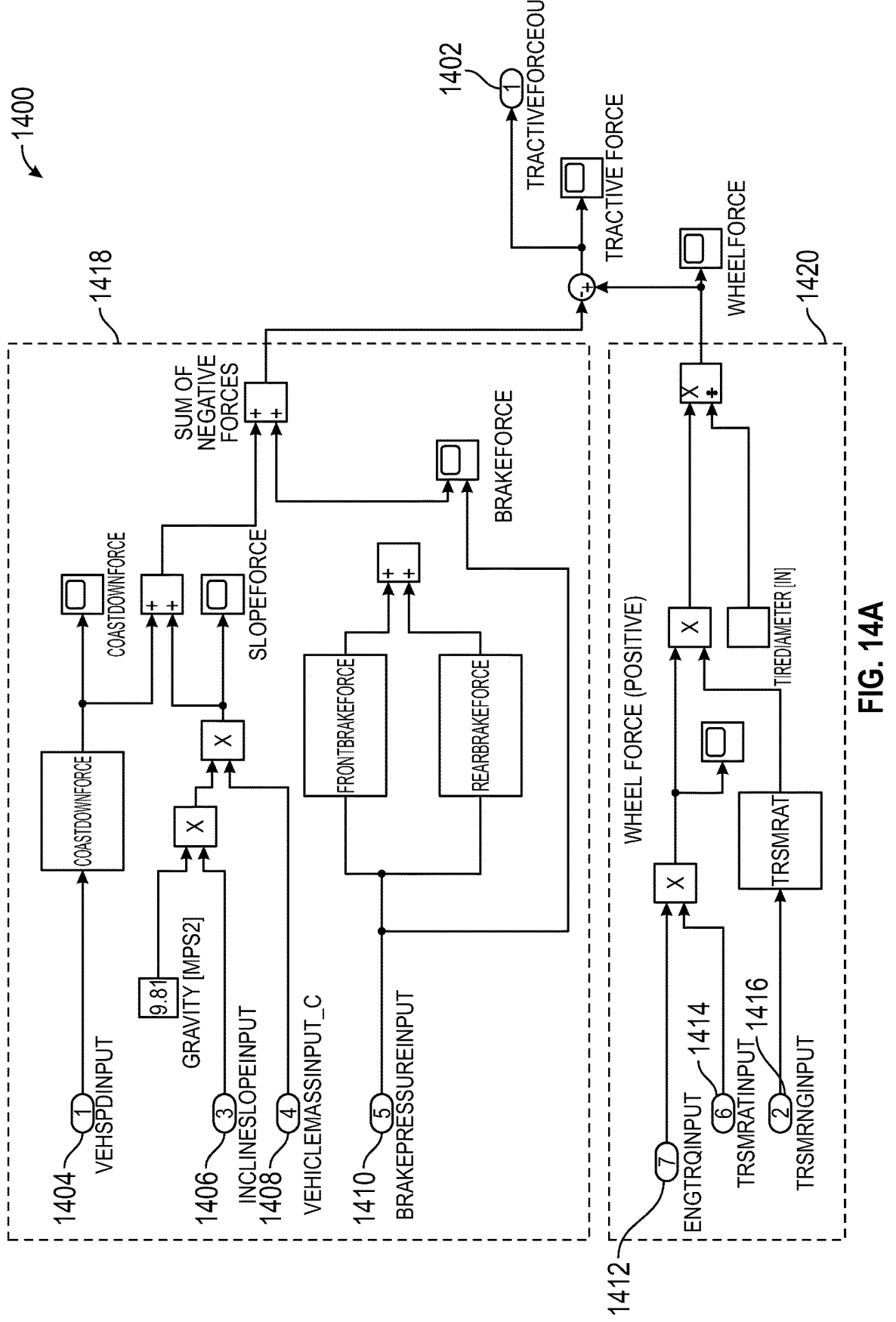
FIGS. 14A-14F illustrate example models for controlling a CVT of a vehicle according to aspects described herein.

FIG. 14A illustrates an overview of example model 1400 for modeling longitudinal vehicle dynamics. The illustrated model accounts for environmental factors (e.g., vehicle incline/decline, rolling drag, moving friction) and driving forces (e.g., current gear, transmission ratio, current engine torque, and braking force). As illustrated, model 1400 generates tractive force 1402 based on vehicle speed 1404, vehicle slope 1406, vehicle mass 1408, brake pressure 1410, engine torque 1412, transmission ratio 1414, and transmission range 1416. Inputs 1402-1416 may be determined from one or more sensors of the vehicle, as discussed above. As illustrated, model 1400 accounts for negative forces 1418 acting on the vehicle, which are subtracted from positive forces 1420 to yield tractive force 1402.

Figures 14B, 14C:
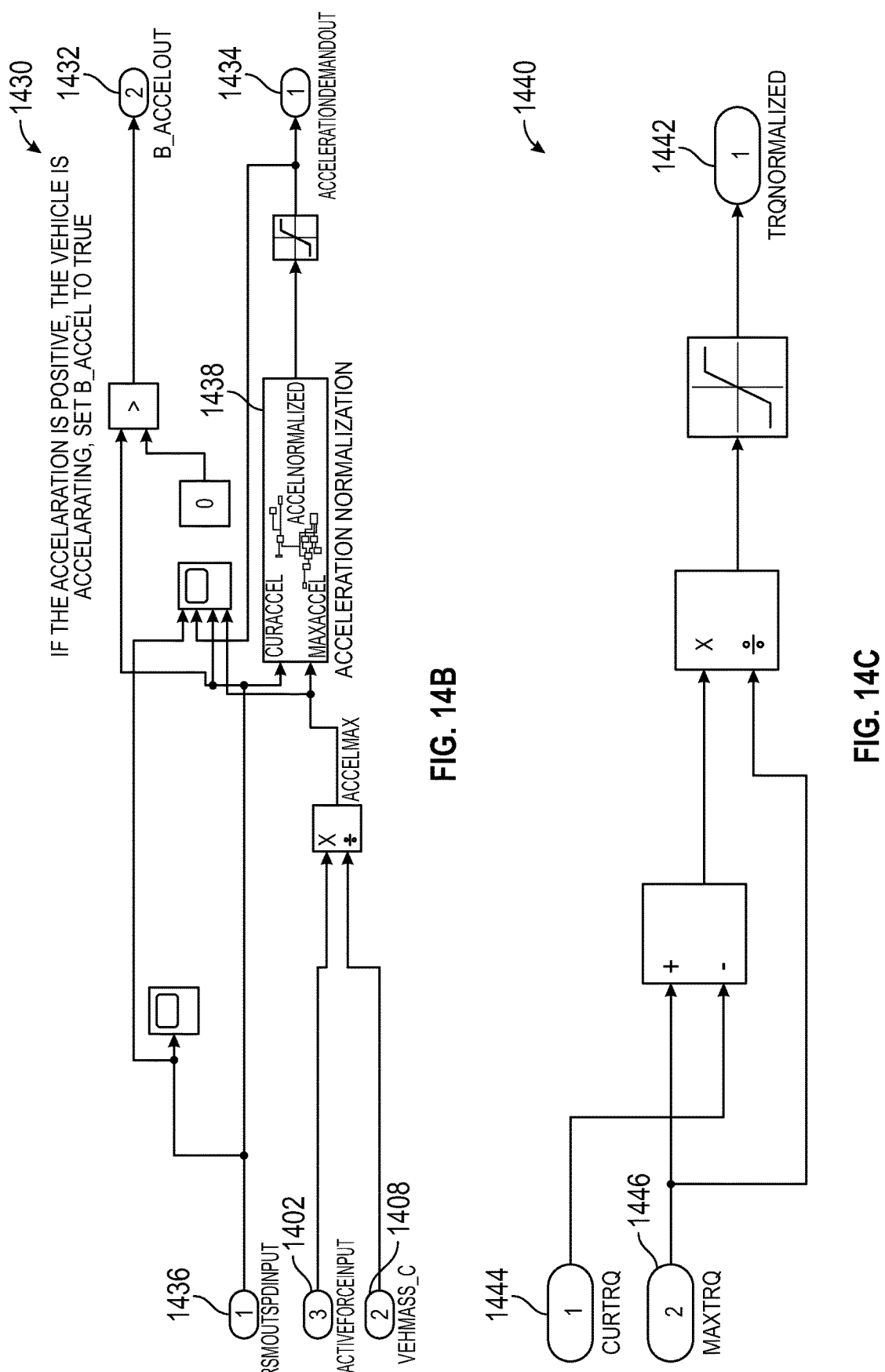

FIG. 14B illustrates an overview of an example model 1430 for modeling acceleration demand. As illustrated, model 1430 uses tractive force 1402 (e.g., as was generated in FIG. 14A), as well as transmission speed 1436 and vehicle mass 1408. Model 1430 generates both an indication 1432 as to whether the vehicle is currently accelerating and maximum acceleration 1434. Acceleration indication 1432 may be generated based on a derivative of the current velocity (e.g., as may be determined from transmission speed 1436). The resulting data may be filtered for noise reduction and evaluated to determine whether it indicates a positive acceleration.

With respect to maximum acceleration 1434, tractive force 1402 from FIG. 14A is divided by vehicle mass 1408 to yield maximum theoretical acceleration that would be achievable under ideal conditions. The maximum theoretical acceleration is then normalized 1438 based on the determined current acceleration. As a result, a normalized maximum acceleration of one indicates that the current acceleration and maximum acceleration are equal. By contrast, a value greater than one (e.g., such that the current acceleration exceeds the maximum acceleration) may indicate that the vehicle is slipping, while a value lower than one may indicate that the vehicle may still accelerate. As illustrated, maximum acceleration 1434 is normalized and ultimately constrained between a set of values, though it will be appreciated that such aspects may be omitted in other examples.

FIG. 14C illustrates an overview of an example model 1440 for determining torque reserve 1442, which may indicate an amount of remaining torque for a given driving condition. As illustrated, model 1440 determines torque reserve 1442 based on current torque 1444 and maximum torque 1446. Current torque 1444 and maximum torque 1446 may be determined based on an engine control module of the vehicle (e.g., vehicle controller 1202 discussed above with respect to FIG. 12). In examples, remaining torque reserve 1442 is normalized (e.g., between zero and one or as a percentage), such that a value of 100% may indicate that all of the potential energy of the prime mover is available, while a value of 0% may indicate that no additional energy is available.

Figure 14D:
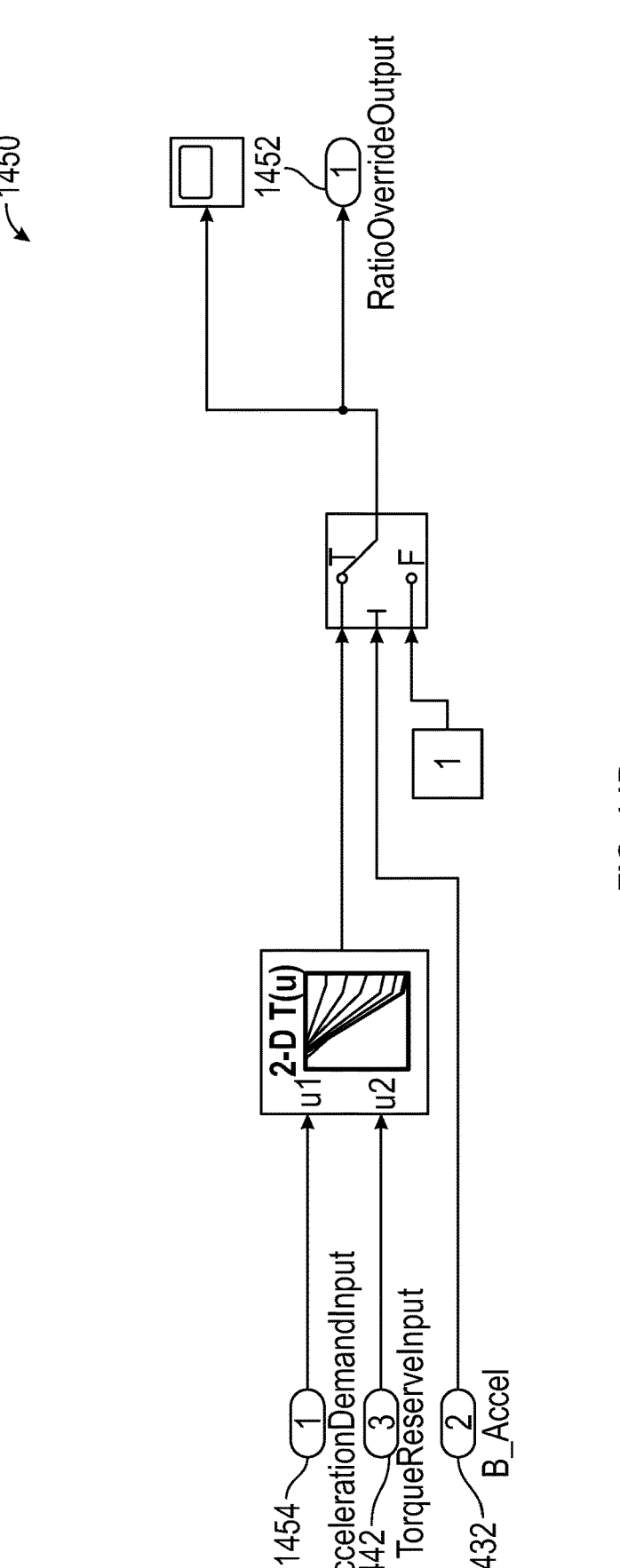

FIG. 14D illustrates an overview of an example model 1450 for generating a ratio override metric 1452 to characterize the terrain condition of an environment. As illustrated, ratio override metric 1452 is generated based on acceleration demand 1454, torque reserve 1442 (e.g., as may have been determined according to FIG. 14C), and acceleration indication 1432 (e.g., as may have been determined according to FIG. 14B). In examples, ratio override metric 1452 may affect the speed with which a transmission shifts during acceleration and/or if the transmission is permitted to shift (e.g., if conditions are severe enough). Logic associated with model 1450 may identify the differences between pavement, dirt, gravel, sand, and ice, among other conditions. While the present example illustrates a model for positive acceleration, it will be appreciated that similar techniques may additionally or alternatively be used for deceleration.

Figure 14E:
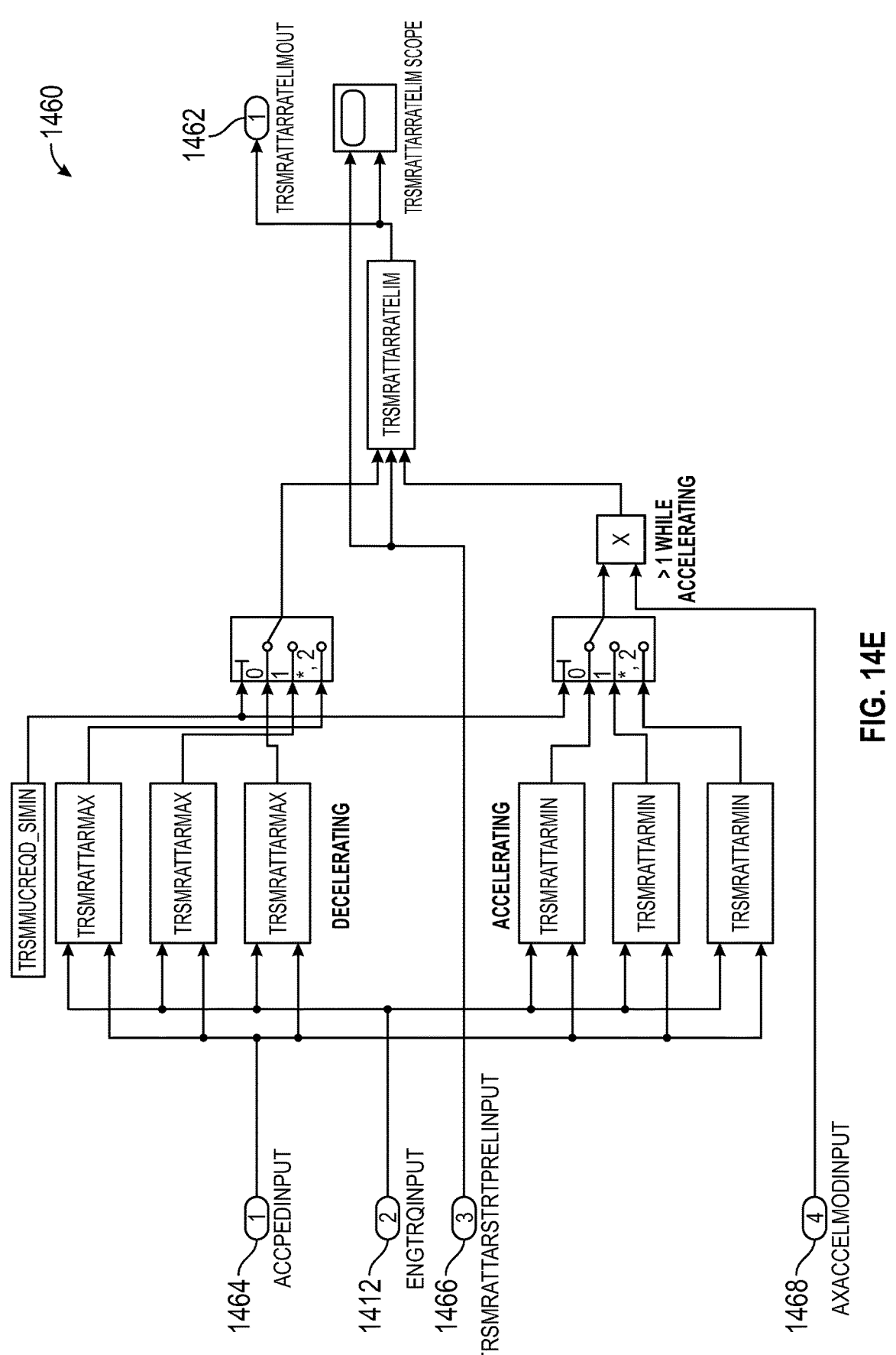

FIG. 14E illustrates an overview of an example model 1460 for generating a target rate limit 1462 at which a transmission ratio can change. As illustrated model 1460 processes accelerator pedal input 1464, engine torque 1412, preliminary target ration 1466, and transmission mode indication 1468. In examples, model 1460 may be modified based on ratio override metric 1452 (e.g., as may have been generated by model 1450 of FIG. 14D).

Figure 14F:
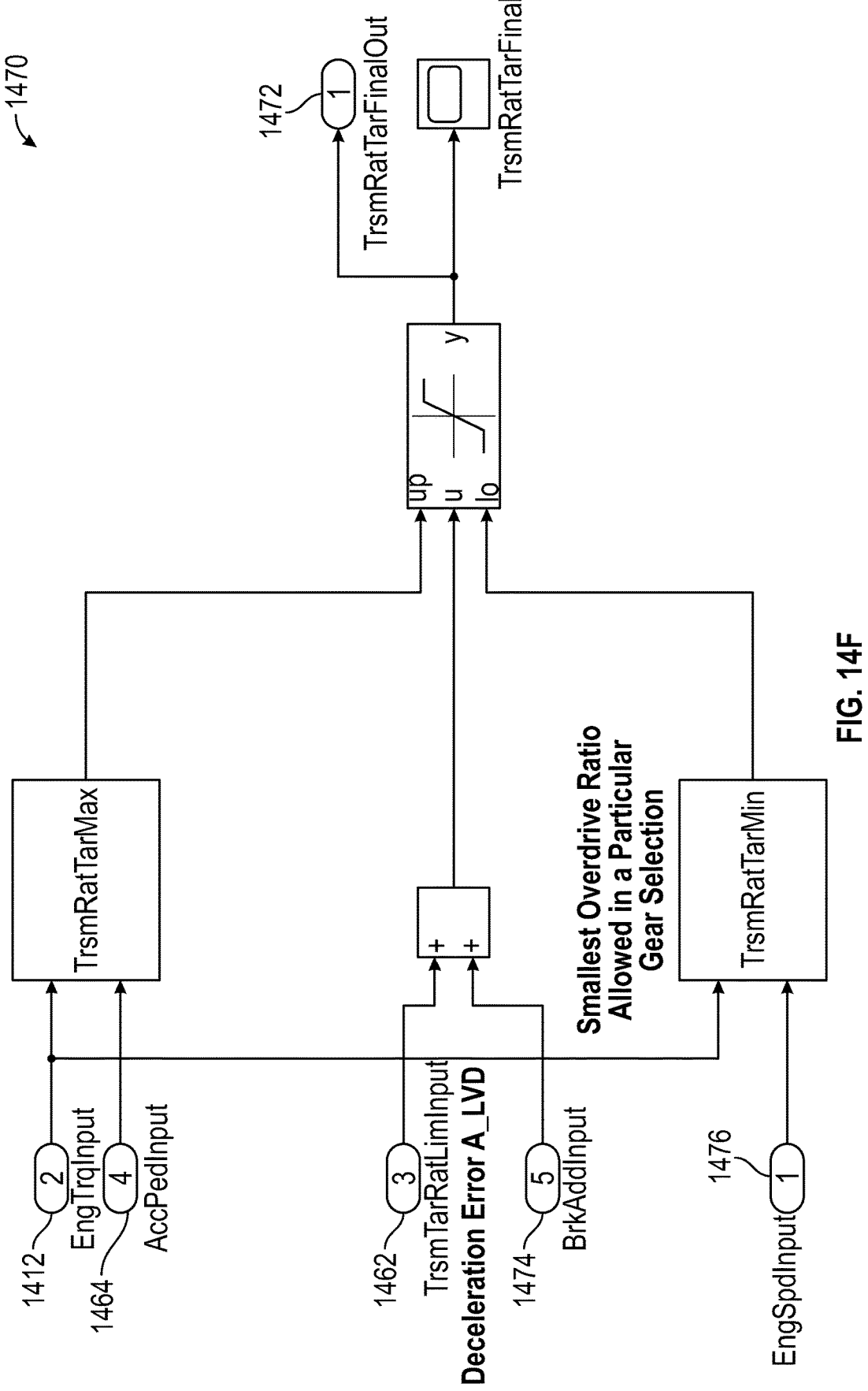

FIG. 14F illustrates an overview of an example model 1470 for generating final target ratio 1472 that does not exceed a set of ratio limits. As illustrated, model 1470 processes engine torque 1412, accelerator pedal input 1464, target rate limit 1462 (e.g., as may have been generated by model 1460 of FIG. 14E), brake add ratio 1474, and engine speed 1476. Thus, as a result of processing brake add ratio 1474, model 1470 may also account for braking by a vehicle operator, thereby assisting with deceleration of the vehicle.

Resulting final target ratio 1472 may similarly be used to configure a CVT of the vehicle, similar to aspects discussed above with respect to operation 1316 of method 1300 in FIG. 13A.

Launch Clutch Temperature Predictive Modeling and Protection

In instances where a launch clutch is used in conjunction with a CVT, the launch clutch engages based on the speed of the engine until it is locked, thereby transmitting substantially all of the power from the engine to the CVT. However, slippage during clutch engagement increases the temperature of launch clutch components. As component temperatures increase, the vehicle may exhibit decreased performance and/or component failure.

Figure 15:
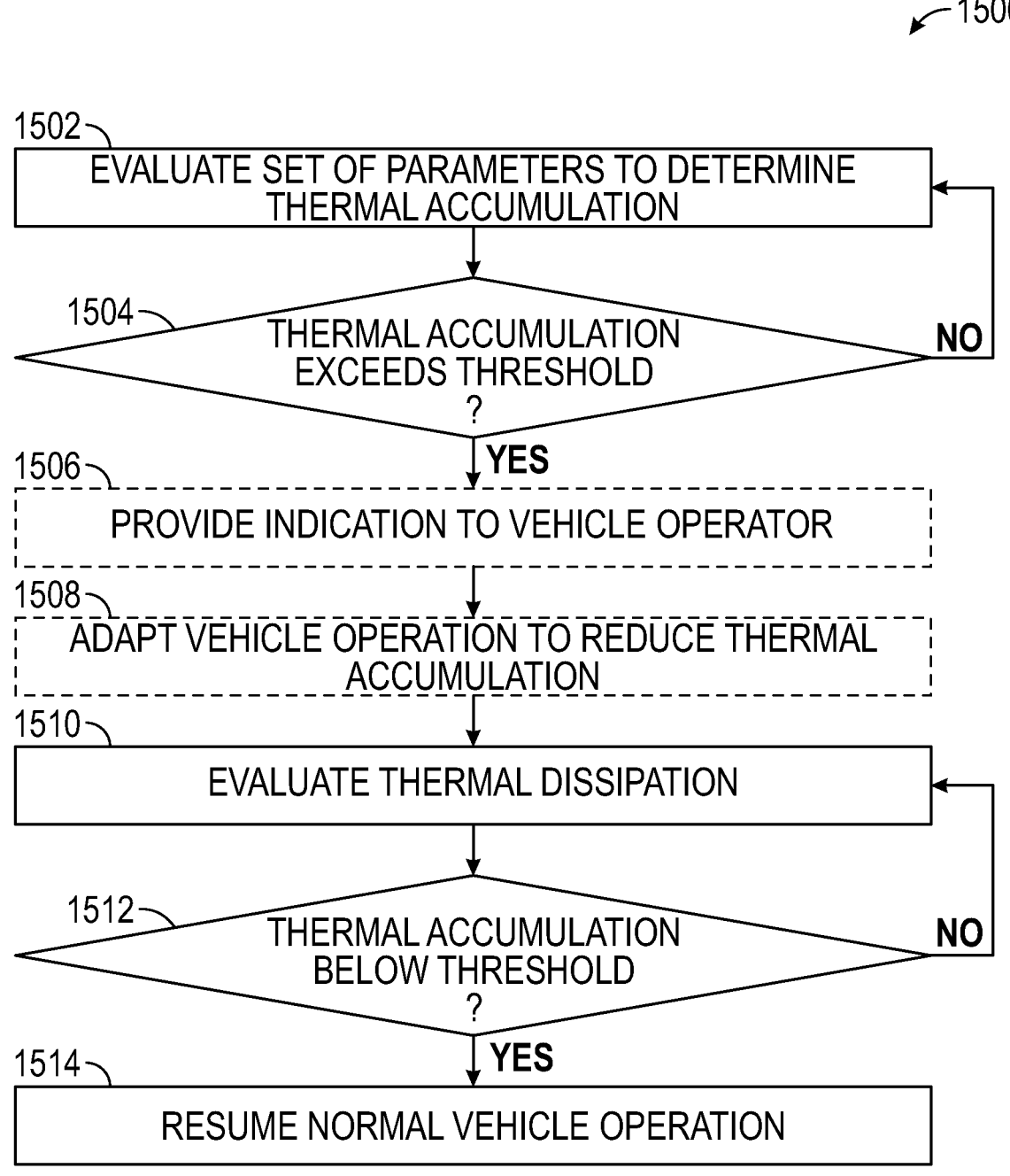
FIG. 15 illustrates an overview of an example method for predictive modeling and protective operation of a powertrain assembly according to aspects described herein.

Accordingly, FIG. 15 illustrates an overview of an example 1500 for predictive modeling and protective operation of a powertrain assembly according to aspects described herein. As illustrated, FIG. 15 begins at operation 1502, where a set of parameters are evaluated to determine thermal accumulation (also referred to herein as a "thermal accumulation metric") for a launch clutch. Example parameters include, but are not limited to, a speed of launch clutch components, a relative speed difference between two or more launch clutch components, an amount of torque being transferred by the launch clutch, and/or a slippage duration. As is discussed in greater detail below, the thermal accumulation determination may further account for thermal dissipation (e.g., actual and/or estimated), as may be modeled according to thermal transfer between the launch clutch and one or more components to which the launch clutch is mechanically coupled. Additionally, or alternatively, the launch clutch is cooled via engine oil, such that thermal dissipation resulting therefrom may similarly be included in the thermal accumulation determination for the launch clutch. Additionally, or alternatively, one or more temperature sensors are used (e.g., to determine an oil temperature and/or a case temperature).

At determination 1504, it is determined whether the thermal accumulation exceeds a threshold. In some examples, operation 1502 comprises determining thermal accumulation for multiple launch clutch components, such that determination 1504 comprises evaluating each thermal accumulation metric as compared to a threshold for the corresponding launch clutch component. If it is determined that the thermal accumulation metric does not exceed the threshold, flow branches "NO" and returns to operation 1502. Thus, the thermal accumulation of the launch clutch may be iteratively monitored (e.g., periodically and/or in response to an event).

If, however, it is instead determined that the thermal accumulation metric exceeds the threshold, flow branches "YES" to operation 1506, where an indication is presented to a vehicle operator. For example, the indication is presented via an operator interface of the vehicle (e.g., as a visual alert, an audible alert, and/or a haptic alert).

At operation 1508, operation of the vehicle is adapted to reduce thermal accumulation in the launch clutch. For example, vehicle speed and/or torque may be limited. Additionally, or alternatively, a cooling system of the vehicle is configured to promote increased cooling of the engine oil and/or the launch clutch.

Operations 1506 and 1508 are illustrated using dashed boxes to indicate that, in some examples, one or both operations may be omitted. Further, while method 1500 is illustrated as an example where operations 1506 and 1508 occur after a single determination 1504, it will be appreciated that similar techniques may be used to provide an indication to a vehicle operator after a first threshold is reached, after which vehicle operation is adapted after a second threshold is reached.

At operation 1510, thermal dissipation of the launch clutch is evaluated. Aspects of operation 1510 are similar to those discussed above with respect to operation 1502 and are therefore not necessarily redescribed in detail. For example, the same or a similar set of parameters are evaluated to determine thermal accumulation of the launch clutch accordingly.

Accordingly, at determination 1512, it is determined whether the thermal accumulation of the launch clutch is below a threshold. Aspects of determination 1512 may be similar to those discussed above with respect to determination 1504 and are therefore not redescribed in detail. In examples, the threshold evaluated at determination 1504 is different than the threshold that is evaluated at determination 1512. For example, a higher threshold may be used to determine whether to adapt vehicle functionality as compared to the threshold that is evaluated to determine whether to restore vehicle functionality, or vice versa. If it is determined that the thermal accumulation metric is not below the threshold, flow branches "NO" and returns to operation 1510. Thus, the thermal accumulation of the launch clutch may be iteratively monitored (e.g., periodically and/or in response to an event).

If, however, it is instead determined that thermal accumulation is below the threshold, flow branches "YES" to operation 1514, where normal operation of the vehicle is resumed. For example, a speed and/or torque restriction may be removed. As another example, operation 1514 comprises removing an indication that was generated at operation 1506 and/or providing an indication that the vehicle has returned to a normal operating state. It will be appreciated that any of a variety of alternative or additional operations may be performed in other examples. As illustrated, method 1500 terminates at operation 1514.

The following clauses are provided as example aspects of the disclosed subject matter:

1. A vehicle, comprising: a frame; a plurality of ground-engaging members supporting the frame; and a powertrain supported by the frame and operably coupled to the plurality of ground-engaging members, the powertrain comprising: a prime mover; a continuously variable transmission operably coupled to the prime mover; and a clutch operably coupled between the continuously variable transmission and the plurality of ground-engaging members.

2. The vehicle of clause 1, wherein a geartrain is operably coupled between the clutch and the plurality of ground-engaging members.

3. The vehicle of clause 2, wherein the geartrain further comprises one of a synchronizer or a shift dog.

4. The vehicle of clause 1, wherein the clutch is part of a geartrain that is operably coupled between the continuously variable transmission and the plurality of ground-engaging members.

5. The vehicle of clause 4, wherein the geartrain comprises an input shaft, a second shaft, and a reduction gearset operably coupled to both the input shaft and the second shaft, and wherein the clutch is operably coupled to the second shaft of the geartrain.

6. The vehicle of any one of clauses 1-5, further comprising a controller configured to: identify an airborne condition based on data from an inertial measurement unit of the vehicle; in response to identifying the airborne condition, determine a power-on-landing metric based on one or more of: a rotational speed associated with the plurality of ground-engaging members; a throttle input; or a geartrain acceleration value; and based on determining the power-on-landing metric is above a predetermined threshold, adjust a torque capacity of the clutch.

7. The vehicle of any one of clauses 1-6, wherein the clutch is one of an electrically controlled clutch, a hydraulically controlled clutch, or a mechanically controlled clutch.

8. The vehicle of any one of clauses 1-7, wherein the continuously variable transmission comprises a drive clutch, and wherein the drive clutch is supported by an output shaft of the clutch.

9. The vehicle of any one of clauses 1-8, wherein the continuously variable transmission comprises a spider assembly, the spider assembly comprising a bushing retained by a first shouldered sleeve and a second shouldered sleeve, wherein the second shouldered sleeve is configured to receive a thread of the first shouldered sleeve to retain the bushing.

10. The vehicle of any one of clauses 1-8, wherein the continuously variable transmission comprises a spider assembly, the spider assembly comprising a bushing retained by a threaded shoulder bolt and a threaded insert configured to receive the threaded shoulder bolt.

11. The vehicle of any one of clauses 1-10, wherein a crankcase of the prime mover and a housing of the clutch cooperate to form a reservoir of lubricant for the clutch.

12. The vehicle of any one of clauses 1-11, wherein the continuously variable transmission comprises a first driven sheave and a second driven sheave, wherein the first driven sheave and the second driven sheave each have a first region having a first angle and a second region having a second angle different from the first angle.

13. The vehicle of any one of clauses 1-12, wherein the continuously variable transmission comprises a drive clutch and a helically cut sliding spline that rotatably couples a stationary shaft of the continuously variable transmission to a movable sheave of the drive clutch.

14. A powertrain assembly, comprising: a prime mover, comprising a crankshaft and a crankcase; and a clutch, comprising: a housing coupled to the crankcase and including an opening defined about an axis of rotation of the crankshaft; an input subassembly coupled to a flange of the crankshaft, wherein a second bearing is disposed within the input subassembly about the axis of rotation; and an output subassembly comprising an output shaft that extends through the opening, wherein the output assembly is supported by the first bearing of the housing and the second bearing of the input subassembly.

15. The powertrain assembly of clause 14, further comprising a continuously variable transmission operably coupled to the output shaft of the clutch.

16. The powertrain assembly of clause 15, wherein the continuously variable transmission comprises a drive clutch, and wherein the drive clutch is supported by the output shaft of the clutch.

17. The powertrain assembly of any one of clauses 15-16, wherein the continuously variable transmission comprises a spider assembly, the spider assembly comprising a bushing retained by a first shouldered sleeve and a second shouldered sleeve, wherein the second shouldered sleeve is configured to receive a thread of the first shouldered sleeve to retain the bushing.

18. The powertrain assembly of any one of clauses 15-16, wherein the continuously variable transmission comprises a spider assembly, the spider assembly comprising a bushing retained by a threaded shoulder bolt and a threaded insert configured to receive the threaded shoulder bolt.

19. The powertrain assembly of any one of clauses 15-18, wherein the continuously variable transmission comprises a first driven sheave and a second driven sheave, wherein the first driven sheave and the second driven sheave each have a first region having a first angle and a second region having a second angle different from the first angle.

20. The powertrain assembly of any one of clauses 15-19, wherein the continuously variable transmission comprises a drive clutch and a helically cut sliding spline that rotatably couples a stationary shaft of the continuously variable transmission to a movable sheave of the drive clutch.

21. The powertrain assembly of any one of clauses 14-20, wherein the crankcase and the housing of the clutch cooperate to form a reservoir of lubricant for the clutch.

22. The powertrain assembly of any one of clauses 14-21, wherein the clutch further comprises an oil pathway configured to receive lubricant from the prime mover.

23. The powertrain assembly of clause 22, wherein the oil pathway is further configured to distribute the lubricant to at least one of the first bearing and the second bearing.

24. A method for controlling a continuously variable transmission of a vehicle, the method comprising: determining an increasing rate limit metric and a decreasing rate limit metric, wherein the increasing rate limit metric and the decreasing rate limit metric each define a rate of change for a ratio of the continuously variable transmission; processing the decreasing rate limit metric based on an acceleration modifier associated with a tractive effort of a powertrain of the vehicle to generate an adapted decreasing rate limit metric; generating a ratio target for the continuously variable transmission based on the increasing rate limit metric and the adapted decreasing rate limit metric; and configuring the continuously variable transmission using the generated ratio target.

25. The method of clause 24, wherein the increasing rate limit metric and the decreasing rate limit are each determined based on a mapping corresponding to a prime mover revolutions per minute (RPM) and a torque.

26. The method of clause 25, wherein the mapping is selected from a set of mappings associated with an operating mode of the vehicle.

27. The method of any one of clauses 24-26, further comprising: determining whether the generated ratio target exceeds a set of ratio limits, the set of ratio limits including at least one of a maximum ratio and a minimum ratio; and when it is determined that the generated ratio target exceeds the set of ratio limits, using a ratio limit of the set of ratio limits to configure the continuously variable transmission.

28. The method of any one of clauses 24-27, wherein the ratio target is generated based at least in part on a longitudinal vehicle dynamics model for the vehicle.

29. A powertrain assembly, comprising: a prime mover; and a geartrain, the geartrain comprising: an input shaft operably coupled to an output shaft of the prime mover; a second shaft operably coupled to the input shaft of the geartrain; a front output operably coupled to the second shaft; a rear output switchably coupled to the second shaft by a first gearset and a second gearset, wherein the first gearset is configured to provide a first front to rear ratio between the front output and the rear output and the second gearset is configured to provide a second front to rear ratio between the front output and the rear output.

30. The powertrain assembly of clause 29, wherein: the geartrain further comprises: a high gear configuration between the input shaft and the second shaft; and a low gear configuration between the input shaft and the second shaft; the first gearset is associated with the high gear configuration; and the second gearset is associated with the low gear configuration.

31. A method for vehicle management, the method comprising: obtaining a set of parameters associated with a launch clutch of the vehicle, wherein the launch clutch is operably coupled to a continuously variable transmission of the vehicle; generating, based on the set of parameters, a thermal accumulation metric for the launch clutch; and based on determining the thermal accumulation metric exceeds a threshold, adapting operation of the vehicle to reduce thermal accumulation in the launch clutch.

32. The method of clause 31, wherein the set of parameters comprises one or more of: a speed of a first component of the launch clutch; a relative speed difference between the first component and a second component of the launch clutch; an amount of torque transferred by the launch clutch; and a slippage duration of the launch clutch.

33. The method of any one of clauses 31-32, wherein the thermal accumulation metric is generated based at least in part on thermal dissipation of the launch clutch.

34. The method of any one of clauses 31-33, wherein adapting operation of the vehicle comprises providing an indication to a vehicle operator that thermal accumulation of the launch clutch has exceeded the threshold.

35. The method of any one of clauses 31-34, wherein adapting operation of the vehicle comprises at least one of: changing a maximum speed of the vehicle; changing a maximum torque of the vehicle; increasing cooling by a cooling system of the vehicle.

36. The method of any one of clauses 31-35, further comprising, after adapting operation of the vehicle: generating a second thermal accumulation metric for the launch clutch; and based on determining the second thermal accumulation metric is below a second threshold, returning the vehicle to a normal operating state.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A vehicle, comprising:
a frame;
a plurality of ground-engaging members supporting the frame; and
a powertrain supported by the frame and operably coupled to the plurality of ground-engaging members, the powertrain comprising:
a prime mover including a crankcase and a crankshaft operable to rotate within the crankcase;
a continuously variable transmission operably coupled to the prime mover; and
a clutch operably coupled between the continuously variable transmission and the prime mover, the clutch including an input subassembly coupled to the crankcase and an output subassembly coupled to the continuously variable transmission, and
wherein at least a portion of the output subassembly extends into a space radially inwards of the input subassembly.

2. The vehicle of claim 1, wherein a geartrain is operably coupled between the clutch and the plurality of ground-engaging members.

3. The vehicle of claim 2, wherein the geartrain further comprises one of a synchronizer or a shift dog.

4. The vehicle of claim 1, wherein the clutch is part of a geartrain that is operably coupled between the continuously variable transmission and the plurality of ground-engaging members.

5. The vehicle of claim 4, wherein the geartrain comprises an input shaft, a second shaft, and a reduction gearset operably coupled to both the input shaft and the second shaft, and wherein the clutch is operably coupled to the second shaft of the geartrain.

6. The vehicle of claim 1, further comprising a controller configured to:
identify an airborne condition based on data from an inertial measurement unit of the vehicle;
in response to identifying the airborne condition, determine a power-on-landing metric based on one or more of:
a rotational speed associated with the plurality of ground-engaging members;
a throttle input; or
a geartrain acceleration value; and
based on determining the power-on-landing metric is above a predetermined threshold, adjust a torque capacity of the clutch.

7. The vehicle of claim 1, wherein the clutch is one of an electrically controlled clutch, a hydraulically controlled clutch, or a mechanically controlled clutch.

8. The vehicle of claim 1, wherein the continuously variable transmission comprises a drive clutch, and wherein the drive clutch is supported by an output shaft of the clutch.

9. The vehicle of claim 1, wherein the continuously variable transmission comprises a spider assembly, the spider assembly comprising a bushing retained by a first shouldered sleeve and a second shouldered sleeve, wherein the second shouldered sleeve is configured to receive a thread of the first shouldered sleeve to retain the bushing.

10. The vehicle of claim 1, wherein the continuously variable transmission comprises a spider assembly, the spider assembly comprising a bushing retained by a threaded shoulder bolt and a threaded insert configured to receive the threaded shoulder bolt.

11. The vehicle of claim 1, wherein a crankcase of the prime mover and a housing of the clutch cooperate to form a reservoir of lubricant for the clutch.

12. The vehicle of claim 1, wherein the continuously variable transmission comprises a first driven sheave and a second driven sheave, wherein the first driven sheave and the second driven sheave each have a first region having a first angle and a second region having a second angle different from the first angle.

13. The vehicle of claim 1, wherein the continuously variable transmission comprises a drive clutch and a helically cut sliding spline that rotatably couples a stationary shaft of the continuously variable transmission to a movable sheave of the drive clutch.

14. A powertrain assembly, comprising:
a prime mover, comprising a crankshaft and a crankcase; and
a clutch, comprising:
  a housing coupled to the crankcase and including an opening defined about an axis of rotation of the crankshaft, a first bearing positioned within the housing;
  an input subassembly coupled to a flange of the crankshaft, wherein a second bearing is disposed within the input subassembly about the axis of rotation; and
  an output subassembly comprising an output shaft that extends through the opening, wherein the output subassembly is supported by the first bearing of the housing and the second bearing of the input subassembly, and each of the first bearing and the second bearing are positioned radially outwardly of the output subassembly.

15. The powertrain assembly of claim 14, further comprising a continuously variable transmission operably coupled to the output shaft of the clutch.

16. The powertrain assembly of claim 15, wherein the continuously variable transmission comprises a drive clutch, and wherein the drive clutch is supported by the output shaft of the clutch.

17. The powertrain assembly of claim 15, wherein the continuously variable transmission comprises a spider assembly, the spider assembly comprising a bushing retained by a first shouldered sleeve and a second shouldered sleeve, wherein the second shouldered sleeve is configured to receive a thread of the first shouldered sleeve to retain the bushing.

18. The powertrain assembly of claim 15, wherein the continuously variable transmission comprises a spider assembly, the spider assembly comprising a bushing retained by a threaded shoulder bolt and a threaded insert configured to receive the threaded shoulder bolt.

19. The powertrain assembly of claim 15, wherein the continuously variable transmission comprises a first driven sheave and a second driven sheave, wherein the first driven sheave and the second driven sheave each have a first region having a first angle and a second region having a second angle different from the first angle.

20. The powertrain assembly of claim 15, wherein the continuously variable transmission comprises a drive clutch and a helically cut sliding spline that rotatably couples a stationary shaft of the continuously variable transmission to a movable sheave of the drive clutch.

21. The powertrain assembly of claim 14, wherein the crankcase and the housing of the clutch cooperate to form a reservoir of lubricant for the clutch.

22. The powertrain assembly of claim 14, wherein the clutch further comprises an oil pathway configured to receive lubricant from the prime mover.

23. The powertrain assembly of claim 22, wherein the oil pathway is further configured to distribute the lubricant to at least one of the first bearing and the second bearing.

24. A powertrain assembly, comprising:
a prime mover, comprising a crankshaft and a crankcase defining an outer profile, and wherein a flange of the crankshaft is positioned within the outer profile; and
a clutch, comprising:
  a housing coupled to the crankcase and including an opening defined about an axis of rotation of the crankshaft, a first bearing positioned within the housing;
  an input subassembly coupled to the flange of the crankshaft within the outer profile, wherein a second bearing is disposed within the input subassembly about the axis of rotation; and
  an output subassembly comprising an output shaft that extends through the opening, wherein the output subassembly is supported by the first bearing of the housing and the second bearing of the input subassembly.

25. The powertrain assembly of claim 24, further comprising a first oil passageway defined between the input subassembly and the output subassembly, wherein the second bearing is positioned within the path of the first oil passageway.

26. The powertrain assembly of claim 25, wherein the crankshaft defines a second oil passageway, and the second oil passageway is fluidly coupled to the first oil passageway.

27. The powertrain assembly of claim 26, wherein the second oil passageway extends along a rotational axis of the crankshaft.

28. A vehicle, comprising:
a frame;
a plurality of ground-engaging members supporting the frame; and
a powertrain supported by the frame and operably coupled to the plurality of ground-engaging members, the powertrain comprising:
  a prime mover including a crankcase and a crankshaft positioned entirely within the crankcase, the crankshaft extending along a rotational axis and defining a crankshaft oil passageway;
  a clutch operably coupled to the crankshaft of the prime mover, the clutch including an input shaft coupled to the crankshaft and an output shaft selectively coupled to the input shaft, and wherein the clutch is supported by at least a first bearing, the clutch defining a clutch oil passageway fluidly coupled to the crankshaft oil passageway and operable to direct fluid over a second bearing disposed between the input shaft and the output shaft and toward the first bearing; and
a continuously variable transmission operably coupled to the clutch, the continuously variable transmission including a continuously variable transmission housing, a drive clutch positioned within the continuously variable transmission housing and a driven clutch positioned within the continuously variable transmission housing, and the drive clutch is supported independent of the continuously variable transmission housing.

29. The vehicle of claim 28, wherein the drive clutch is supported by the first bearing.

30. The vehicle of claim 29, wherein the first bearing is positioned external to the continuously variable transmission housing.

31. The vehicle of claim 28, further comprising a clutch housing, and each of the clutch and the first bearing are positioned within the clutch housing separate from the continuously variable transmission housing.

32. The vehicle of claim 28, wherein the clutch includes a plurality of friction interfaces coupled to the clutch input shaft, the friction interfaces selectively coupled with the clutch output shaft, and wherein a portion of the output shaft is positioned radially intermediate the plurality of friction surfaces and axially aligned along the rotational axis with the plurality of friction surfaces.

33. The vehicle of claim 1, wherein the powertrain further comprises a clutch cover and a transmission cover, wherein the clutch is positioned within the clutch cover and the continuously variable transmission is positioned within the transmission cover.

* * * * *